(12) United States Patent
Rucine et al.

(10) Patent No.: US 11,402,991 B2
(45) Date of Patent: Aug. 2, 2022

(54) SYSTEM AND METHOD FOR NOTE TAKING WITH GESTURES

(71) Applicant: MyScript, Nantes (FR)

(72) Inventors: Nicolas Rucine, Nantes (FR); Thomas Penin, Nantes (FR); Nathalie Delbecque, Nantes (FR); Jean-Nicolas Guiavarc'h, Nantes (FR); Julien Vergne, Nantes (FR); Gildas Lemarie, Nantes (FR); Alicja Wojtczuk, Nantes (FR); Louise Bonnamy, Nantes (FR); Claire Sidoli, Nantes (FR); Joanne Ho, Nantes (FR); Arnoud Boekhoorn, Nantes (FR)

(73) Assignee: MyScript, Nantes (FR)

( * ) Notice: Subject to any disclaimer, the term of this patent is extended or adjusted under 35 U.S.C. 154(b) by 97 days.

(21) Appl. No.: 14/989,217

(22) Filed: Jan. 6, 2016

(65) Prior Publication Data
US 2017/0153806 A1    Jun. 1, 2017

(30) Foreign Application Priority Data

Dec. 1, 2015 (EP) ..................... 15290296

(51) Int. Cl.
*G06F 3/01* (2006.01)
*G06F 3/0483* (2013.01)
(Continued)

(52) U.S. Cl.
CPC .......... *G06F 3/04883* (2013.01); *G06F 3/017* (2013.01); *G06F 40/166* (2020.01);
(Continued)

(58) Field of Classification Search
CPC .... G06F 3/0488; G06F 17/242; G06F 17/211; G06F 3/04883; G06F 17/241; G06F 17/24; G06F 3/017; G06K 9/00402
See application file for complete search history.

(56) References Cited

U.S. PATENT DOCUMENTS 5,220,649 A    6/1993  Forcier
5,784,504 A *  7/1998  Anderson ........... G06F 3/04883
                                                    382/309
(Continued)

FOREIGN PATENT DOCUMENTS

JP    2003-208569 A    7/2003
JP    2013-218592 A   10/2013
JP    2013-246633 A   12/2013

OTHER PUBLICATIONS

International Search Report for Related Application No. PCT/EP2016/002032, dated Feb. 15, 2017, EPO-Internal, WPI Data.
(Continued)

*Primary Examiner* — Shahid K Khan
*Assistant Examiner* — Ahamed I Nazar
(74) *Attorney, Agent, or Firm* — McDermott Will and Emery LLP

(57) ABSTRACT

A system, method and computer program product for use in editing digital documents with handwriting input to a computing device are provided. The computing device is connected to an input device in the form of an input surface. A user is able to provide input by applying pressure to or gesturing above the input surface using either his or her finger or an instrument such as a stylus or pen. The present system and method monitors the input strokes. The computing device further has a processor and at least one application for recognizing the handwriting input under control of the processor. The at least one system application is configured to cause display of, on a display interface of a (Continued)

computing device, first digital ink in accordance with document content, detect handwriting input as one or more editing gestures with respect to the document content, and, cause display of, on the display interface, second digital ink in accordance with handwriting input.

19 Claims, 52 Drawing Sheets

(51) Int. Cl.
G06K 9/00 (2022.01)
G06F 3/04883 (2022.01)
G06F 40/166 (2020.01)
G06F 40/169 (2020.01)
G06F 40/171 (2020.01)
G06V 30/32 (2022.01)

(52) U.S. Cl.
CPC .......... *G06F 40/169* (2020.01); *G06F 40/171* (2020.01); *G06V 30/32* (2022.01)

(56) References Cited

U.S. PATENT DOCUMENTS

| | | | |
|---|---|---|---|
| 6,499,043 B1* | 12/2002 | Forcier | G06F 3/0488 715/273 |
| 7,259,752 B1* | 8/2007 | Simmons | G06F 3/04817 345/173 |
| 7,751,623 B1* | 7/2010 | Simmons | G06F 17/242 345/173 |
| 8,245,130 B1* | 8/2012 | Lloyd | G06F 17/30905 715/234 |
| 8,250,486 B2* | 8/2012 | Lentz | G06F 3/04812 715/711 |
| 8,448,083 B1* | 5/2013 | Migos | G06F 3/04883 345/671 |
| 8,634,645 B2* | 1/2014 | Xing | G06F 17/245 382/181 |
| 9,164,777 B2* | 10/2015 | Prasad | G06F 9/4443 |
| 2002/0059350 A1* | 5/2002 | Iwema | G06F 3/04883 715/234 |
| 2002/0064308 A1* | 5/2002 | Altman | G06F 3/04883 382/187 |
| 2004/0070573 A1* | 4/2004 | Graham | G06F 3/04883 345/179 |
| 2005/0111736 A1* | 5/2005 | Hullender | G06F 3/04883 382/188 |
| 2006/0001656 A1* | 1/2006 | LaViola | G06F 3/04883 345/179 |
| 2006/0018546 A1* | 1/2006 | Lagardere | G06K 9/222 382/186 |
| 2006/0045337 A1* | 3/2006 | Shilman | G06K 9/00402 382/181 |
| 2006/0093219 A1* | 5/2006 | Gounares | G06F 3/0481 382/187 |
| 2008/0019591 A1* | 1/2008 | Iwayama | G06F 3/04883 382/187 |
| 2010/0066691 A1* | 3/2010 | Li | G06F 40/171 345/173 |
| 2014/0079317 A1* | 3/2014 | Hirabayashi | G06F 3/0488 382/165 |
| 2014/0223382 A1* | 8/2014 | Hicks | G06F 3/04883 715/863 |
| 2014/0300609 A1* | 10/2014 | Kang | G06F 3/04883 345/467 |
| 2015/0169975 A1* | 6/2015 | Kienzle | G06T 1/0007 382/189 |
| 2015/0286886 A1* | 10/2015 | Wimmer | G06K 9/52 382/173 |
| 2017/0060819 A1 | 3/2017 | Rucine et al. | |

OTHER PUBLICATIONS

JPO—Official Notice of Reasons for Rejection (Examination Report) for related Japanese Patent Application No. 2018-528680 (translations in English and Japanese), dated Dec. 15, 2020, 8 pgs.

\* cited by examiner

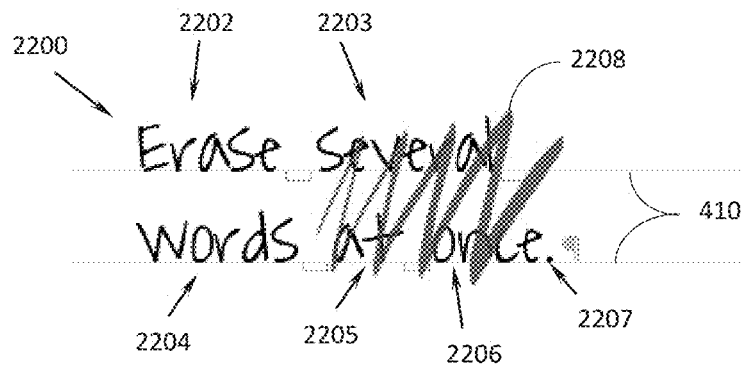
FIG. 22A
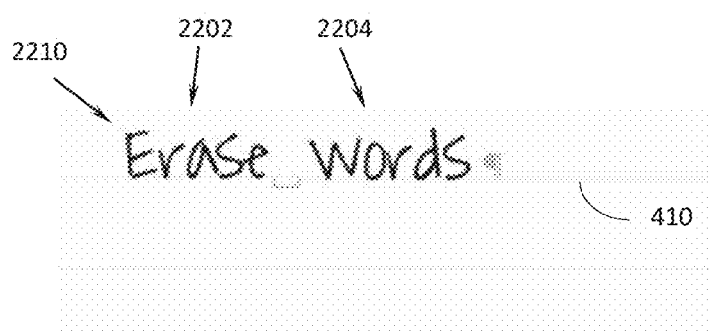
FIG. 22B
FIG. 22C

With the help of appropriate software, the stylus can
replace both your keyboard and mouse.
That's what we show with our new note taking application. From your handwriting it can produce sharable documents with clean layout and formatting.

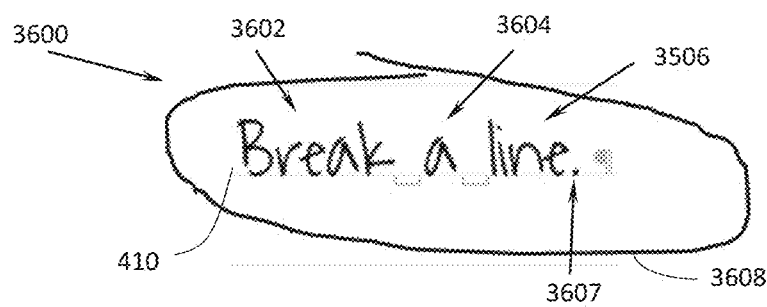
FIG. 36
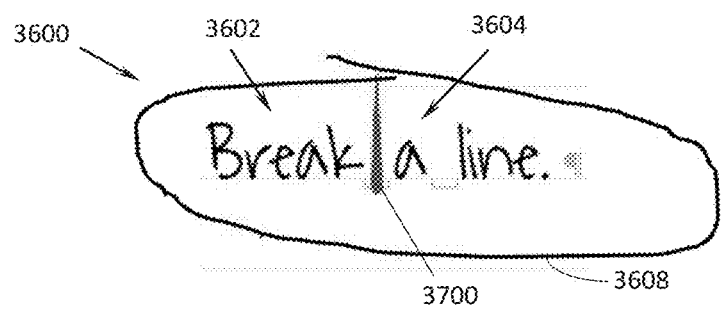
FIG. 37A
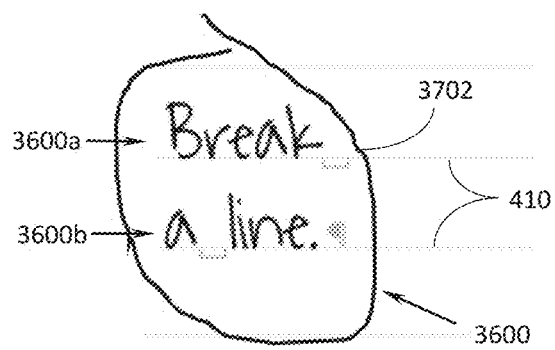
FIG. 37B
BREAK
A LINE
FIG. 38

SYSTEM AND METHOD FOR NOTE TAKING WITH GESTURES

CROSS-REFERENCE TO RELATED APPLICATIONS

This application claims priority to European Application No. 15290296.1 filed on Dec. 1, 2015, which is incorporated herein by reference in its entirety and made a part thereof.

TECHNICAL FIELD

The present description relates generally to the field of digital note taking systems and methods using computing device interfaces. The present description relates more specifically to digital note taking systems and methods capable of recognizing user input handwriting of various gestures in relation to displayed characters, symbols and objects.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for drawing or inputting text. When user input is text the user's handwriting is interpreted using a handwriting recognition system or method.

One application of handwriting recognition in portable computing devices, such as smartphones, phablets and tablets, is in note taking. This particularly occurs in education and business settings where the user of the computing device captures notes, for example, during a lecture or meeting. This is usually done by the user launching a handwritten note taking application on the computing device which accepts and interprets, either locally in the device or remotely via a communications link of the device, handwritten notes input on the touch sensitive surface. Conventionally such handwritten note taking applications are limited in their capabilities to provide a full document creation experience to users from the notes taken, since the focus of these applications has primarily been recognition accuracy rather than document creation. That is, available applications provide recognition of handwriting and conversion of the recognized handwriting into typeset text, with various feedback mechanisms to the user, but that is generally the extent of the interaction with the input.

If the user desires any further interaction with the output text, such as editing the content, manipulating the layout of the notes, or converting or adding the notes into a document, the text generally needs to be imported into a separate document processing application. This in itself is no great problem, however as the original layout of the handwritten notes and the actual input handwriting itself, so-called digital ink, is typically discarded in the import process, the user must refer back to the original notes in order to ascertain the intent in the notes taken. For example, the user may have emphasized certain words or passages in the notes either by annotation or decoration, or through the layout of the notes content itself.

Some available handwriting digital note taking applications provide the ability to edit on the digital ink. However, this is generally done through the input of particular gestures for causing some sort of control, e.g., the launching of menus or running processes. The Applicant has found however that when using handwriting note taking applications users generally are unable or do not desire to learn specific gestures that are not natural or intuitive, or to make editing selections through menus and the like.

Further, gestures are also used for causing some sort of change of content, e.g., editing, style change, formatting. Accordingly, it is necessary for the application to determine the users' intent of using the gesture so that gestures for control and gestures for content input can be distinguished and the appropriate actions taken. The challenge is some interactions have more than one intent or could even constitute content itself.

SUMMARY

The examples of the present invention that are described herein below provide systems and methods for editing digital documents on computing devices.

In one example, the computing device may include a processor and at least one non-transitory computer readable medium for recognizing handwriting input under control of the processor. The non-transitory computer readable medium may be configured to cause display of first digital ink in accordance with document content on a display interface of a computing device, detect handwriting input as one or more editing gestures with respect to the document content, and cause display of second digital ink in accordance with handwriting input on the display interface. The second digital ink may be different than the first digital ink and/or may be a normalized version of the first digital ink. The non-transitory computer readable medium may be configured to cause re-display of, on the display interface, the document content as the third digital ink based on the detected editing gestures. The third digital ink may be different than the first and second digital ink, and may further be a typeset version of the first digital ink.

In another example, the present invention includes a method for editing documents on computing devices. Each computing device may comprise a processor and at least one non-transitory computer readable medium for recognizing handwriting input under control of the processor. The method may include the steps of displaying first digital ink in accordance with document content on a display interface of a computing device, detecting handwriting input as one or more editing gestures with respect to the document content; and displaying second digital ink in accordance with handwriting input on the display interface. The second digital ink may be different than the first digital ink and/or may be a normalized version of the first digital ink. The method may include the step of re-displaying of, on the display interface, the document content as the third digital ink based on the detected editing gestures. The third digital ink may be different than the first and second digital ink, and may further be a typeset version of the first digital ink.

In another example, the present invention includes a non-transitory computer readable medium having a computer readable program code embodied therein. The computer readable program code may be adapted to be executed to implement a method for recognizing input of editing handwriting to a computing device. The computing device may comprise a processor and at least one system non-transitory computer readable medium for recognizing the input under control of the processor. The method may include the steps of displaying first digital ink in accordance with document content on a display interface of a computing device, detecting handwriting input as one or more editing gestures with respect to the document content, and displaying second digital ink in accordance with handwriting input on the display interface. The second digital ink may be different than the first digital ink and/or may be a normalized version of the first digital ink. The method may include the step of re-displaying of, on the display interface, the document content as the third digital ink based on the detected editing gestures. The third digital ink may be different than the first and second digital ink, and may further be a typeset version of the first digital ink.

BRIEF DESCRIPTION OF THE DRAWINGS

The present system and method will be more fully understood from the following detailed description of the examples thereof, taken together with the drawings. In the drawings like reference numerals depict like elements. In the drawings:

FIGS. 22A-22C show examples of editing gestures relating to erasing several words in accordance with the present system and method;

FIG. 28 shows a multi-line paragraph input as handwritten content to the input area;

FIG. 29 shows the paragraph of FIG. 28 with additional handwritten content input and rendered as digital ink in accordance with the present system and method;

FIGS. 31A and 31B show another example of the paragraph of FIG. 28 with additional handwritten content input and rendered as digital ink in accordance with the present system and method;

FIGS. 35A-35D show another example of the paragraph of FIG. 28 with additional handwritten content input and rendered as digital ink in accordance with the present system and method;

FIG. 36 shows another example of an editing gesture relating to breaking a line in accordance with the present system and method;

FIGS. 37A and 37B shows another example of an editing gesture relating to breaking a line in accordance with the present system and method;

FIG. 38 shows the result of typesetting the paragraph of FIGS. 37A and 37B in accordance with the present system and method;

FIG. 43 shows another example of the paragraph of FIG. 28 with additional handwritten content input and rendered as digital ink in accordance with the present system and method;

FIG. 44 shows another example of the paragraph of FIG. 28 with additional handwritten content input and rendered as digital ink in accordance with the present system and method;

DETAILED DESCRIPTION

Figure 1:
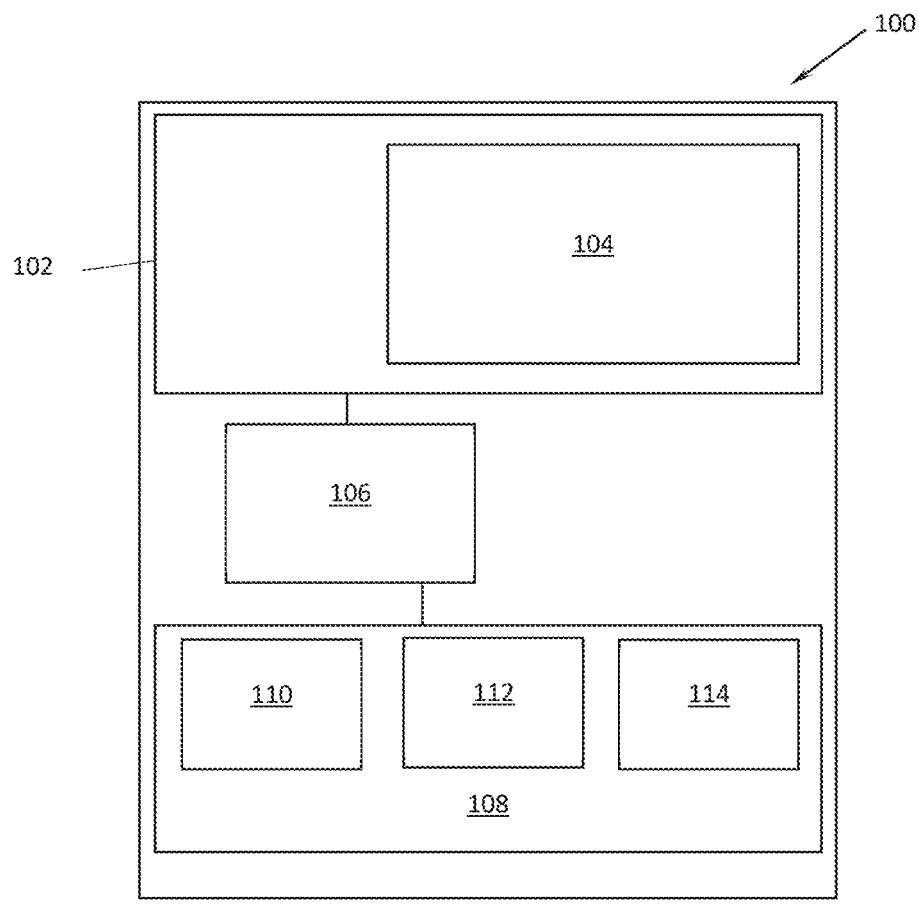
FIG. 1 shows a block diagram of a computing device in accordance with an example of the present system and method.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a physical or virtual surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially available operating system, such as WEBOS, WINDOWS®, MAC and IPHONE OS®, LINUX, and ANDROID. It is understood that other operating systems may also be utilized.

The application 112 includes one or more processing elements related to detection, management and treatment of user input (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programing languages for example but not limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together or be combined as a single application.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, a symbol, with slight variations, the HWR system accommodates a variety of ways in which each object may be entered whilst being recognized as the correct or intended object.

Figure 2:
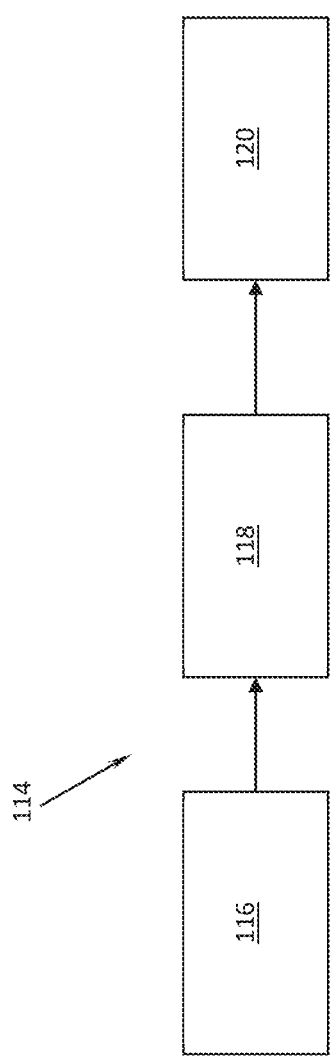
FIG. 2 shows a block diagram of a system for handwriting recognition in accordance with an example of the present system and method.

FIG. 2 is a schematic pictorial of an example of the HWR system 114, in either its local (i.e., loaded on the device 100) or remote (i.e., remotely accessible by the device 100) forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
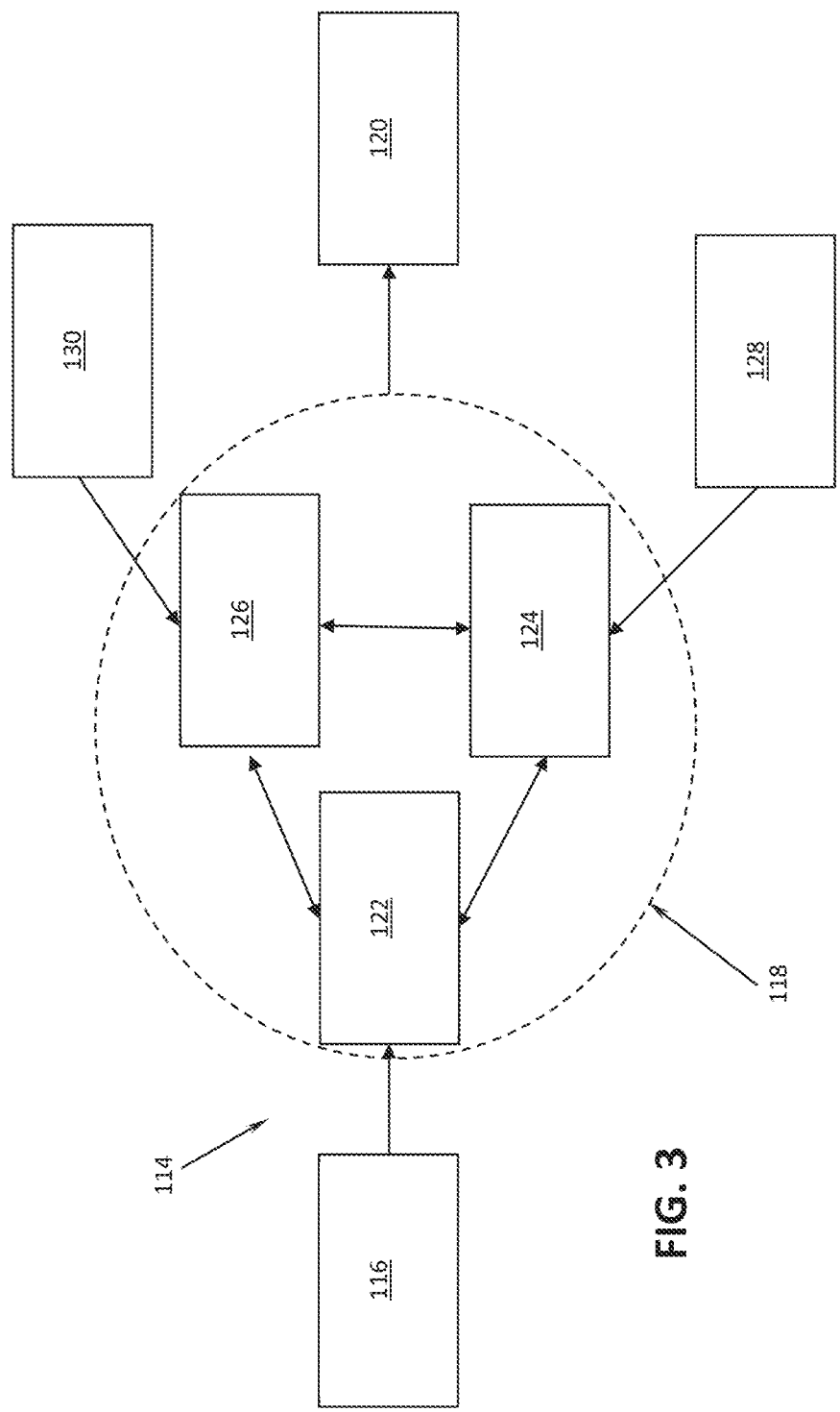
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. The language expert 126 aims at finding the best recognition path. In one example, the language expert 126 does this by exploring a language model such as finite state automaton (FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The present system and method make use of the HWR system 114 in order to recognize handwritten input to the device 100. As mentioned earlier, the application 112 includes application(s) for handling the layout of the recognized user input. Such applications may be provided in an architecture with separate layers for handling different processing. One or more of these layers may be remote to the device 100 accessible via the communications channels mentioned earlier. The layers may include application wrapper(s), platform wrapper(s) and (platform specific) application user interface(s).

The application 112 provided by the present system and method allows users, such as students, academic and working professionals, to take handwritten notes, such as during lectures, meetings and brainstorming sessions, which they can transform into sharable formatted documents on their portable or non-portable computing devices using natural and intuitive operations, such as gestures. The application allows taking of 'clean' notes which can be searched and memorized properly using their computing devices. The present system and method further allow natural writing to be input since the writing is made on (ruled) lines, and paragraphs and other layout elements are respected responsive to orientation (i.e., portrait or landscape) and device display capacity. Synchronization of the captured notes between devices and auto-saving of notes are also supported, as are export options to various formats, such as a text, Latex, HTML, image, pdf, etc. These and other aspects are now described.

The application 112 utilizes a framework for the definition and handling of documents and document elements so as to provide structured content allowing layout definition and preservation. This document model handles different types of document elements, which are best described with HTML5 reference, for example, see W3C HTML5 DOM—Kinds of content: http://www.w3.org/TR/html5/dom.html#kinds-of-content. The document model utilized by the application 112 does not reproduce HTML specifications, rather it takes inspiration from them. A subset of the elements of the document model is flow, sectioning, heading, phrasing, embedded and interactive.

The Applicant has found that users of existing digital note taking applications have issues understanding how text behaves when editing, with text reflow and uncontrolled text/element position. In order to lower the learning curve for use of such applications, handwriting should be closer to what users are familiar with. That is, writing with keyboard in text editing software/web services and editing through keyboard and mouse interaction, with the same model and behaviors. Any digital device user is already accustomed to gesturing on screen to write or edit content. Gesturing is a natural and intuitive pattern on touch and hover devices. A quick solution in the handwritten note taking environment would be to just adapt presently used gestures, such a tap, double tap, press, long press, swipe, pinch, to allow editing in the digital note taking and document creation environment. While these gestures are generally intuitively provided for their existing functions on touch and hover devices, the Applicant has further found that this intuitiveness does not necessarily carry over well to content editing functions based on user feedback. Accordingly, the present system and method provides new classes of gesturing and behaviors for providing content editing functions. These and other features of the present system and method are now described in detail.

Figure 4:
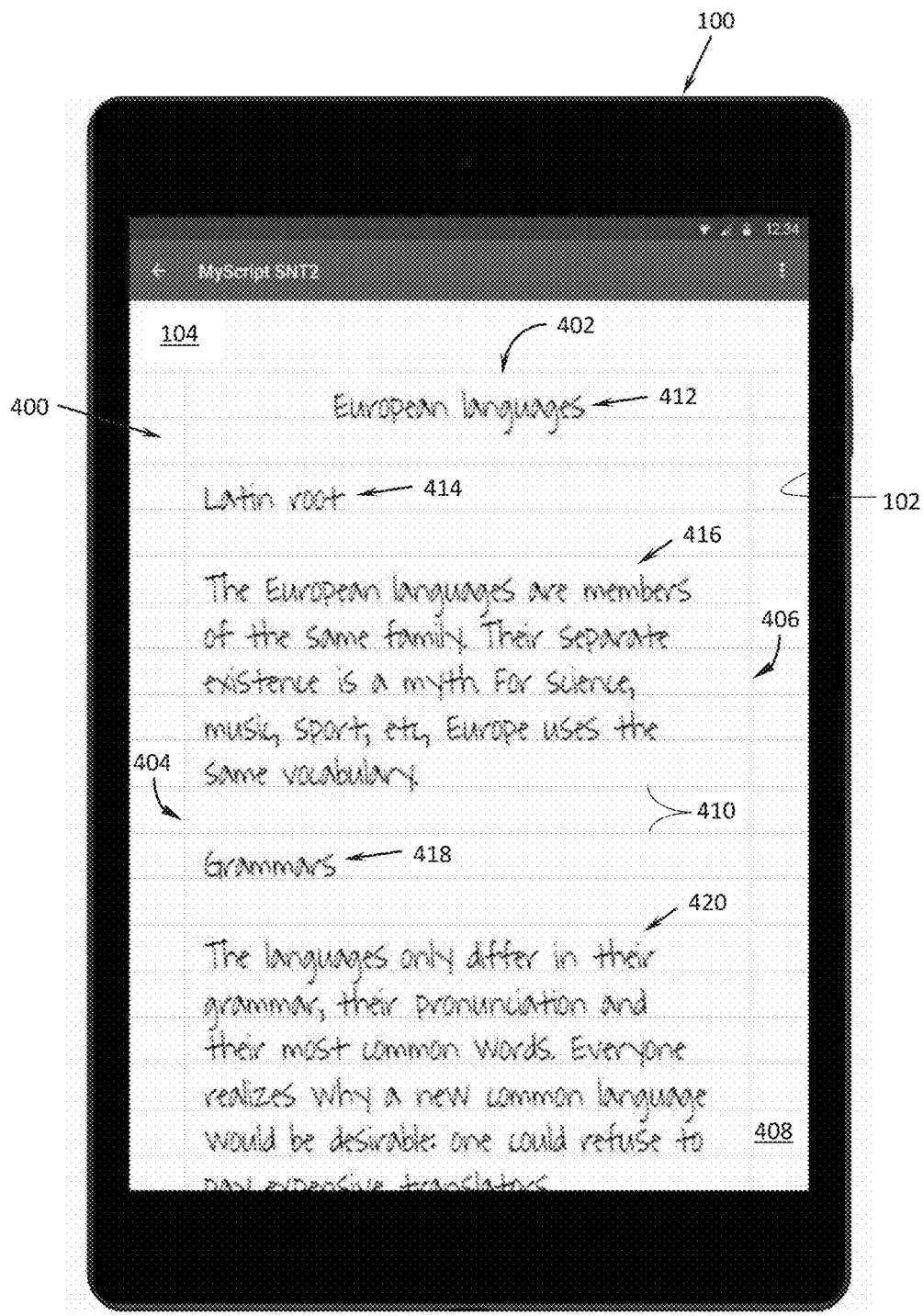
FIG. 4 shows a schematic view of an example visual rendering of a scroll page on a portion of an input surface of the computing device.

FIG. 4 shows a schematic view of an example visual rendering of a note taking page 400 on a portion of the input surface 104 of an example computing device 100. The page 400 is shown in editing view in which content entry and editing is performed. However, other views may be used for document structure editing and notebook navigation. Besides providing user interface (UI) controls (described later) the editing view provides a full-width page that overflows vertically from the display 102 of the device 100. The page 400 is of flexible height, in essence of infinite height, and can be vertically scrolled using well understood touch screen computing device gestures or non-touch screen computing device methods, such as a with a mouse. In order to maximize writing space for users (particularly on smaller devices), an empty scrollable page is defined to occupy at least the whole editing view height.

In the editing view (and other views as appropriate) several page elements are displayed including a top padding 402, a left margin 404 and a right margin 406. The padding and margins define an input area 408 which has a line pattern background 410. The line pattern 410 has horizontal lines separated by a multiple of the vertical rhythm height unit being the density independent pixel (dp). Regardless of the particular device 100, the vertical distance between the horizontal lines 410 is defined by a line pattern unit (LPU) and the vertical rhythm height unit provides a graduated measure of the LPU on a particular device. For example, the LPU may be set at about one centimeter for any device being a certain multiple of the vertical rhythm height unit or users may be allowed to customize the line pattern unit to a different multiple of the vertical rhythm height unit according to their writing style. Alternatively, the vertical rhythm may be based on typeset text size (e.g., the minimum text size) and the LPU is provided as a multiple of this typeset text size. All lines 410 are displayed with the same light and subtle color, e.g., grey, that is visible but faded with respect to the rendering of the content itself. In this way the line pattern is noticeable but unobtrusive so as to guide the handwriting input without distracting from the content entry. The line pattern background 410 is displayed in handwritten text context and serves multiple purposes:

forces users to write onto it so that handwriting recognition is optimized helps users adopt regular vertical rhythm writing leading to same writing size and better block dimensions and positions helps users control line skipping to define paragraphs.

The top padding 402 is displayed on any new page or section and does not contain the line pattern background. This helps users write with proper vertical spacing, i.e., not too close from the interface 104 border and leaves room for other elements, such as section titling and tagging. The top padding 402 is defined by multiples of the LPU, e.g., in the example of FIG. 4 the top padding is two times the LPU. However, it may be desired to allow writing in the top padding for headings, e.g., document and section titles, annotations and the like. Similar bottom padding at the bottom of the input area 408 may also be provided.

The left and right margins 404 and 406 are displayed with vertical lines. In the example of FIG. 4 these lines are similar to the line pattern 410 in color and definition, however these lines may be more boldly displayed if desired. The vertical line margins are positioned from the corresponding left and right 'page' edges by multiples of the vertical rhythm unit. In the example of FIG. 4, the margins 404, 406 are not displayed in the top padding 402 and start from the first line pattern 410 horizontal line. However, the margins may extend into the top padding if desired. Further, the line pattern 410 is not displayed in the margin elements in order to discourage writing in these areas. However, it may be desired to allow writing in the margins for annotations and the like. Alternatively, the margins may only be displayed on hover-over or contact interaction with the horizontal extents of the page 400 or totally omitted, thereby, for example, relying on natural handwriting behaviors of users to not write too close to the screen/UI edges.

The input of handwritten content onto the page 400 is performed through the use of gestures in relation to the input surface 104, e.g., through touch, force and/or proximity depending on the screen technology of the device 100. Gesture detection may be handled differently depending on the ability of the computing device 100 to differentiate a users' finger from a stylus or pen (by which the device defines passive and active styli) or the ability of a stylus to indicate or communicate to the device that it is being used for handwriting or the ability of users to provide such an indication. By default, and in devices which do not differentiate, any single-point touch or hover event within the input area 408 is to be considered as content input or content interaction.

The scroll page can be provided as a constraint-free canvas that allows users to create object blocks (blocks of text, drawings, etc.) anywhere without worrying about sizing or alignment. However, in order to provide professionally formatted documents containing structured content, certain alignment elements or pattern may be defined onto which all content is to be aligned/defined (either at input or along user interaction). This allows blocks to be defined as that rendering of the blocks is responsive to the device size/orientation. An example alignment pattern and responsive display is described in United States Patent Application Publication No. 2017/0060819 titled "System and Method of Digital Note Taking" filed in the name of the present Applicant and Assignee, the entire content of which is incorporated by reference herein.

FIG. 4 further shows handwritten input rendered as digital ink. In particular, in the example of FIG. 4, there is shown five text objects 412, 414, 416, 418 and 420. The text object 412 is a text block containing two words on a single line 410 and defines a document or section title, for example. The text object 414 is a text block containing two words on a single line 410 spaced one line 410 from the block 412 and defines a section title or sub-title, for example. The text object 416 is a text block containing many words over multiple lines 410 with the first (topmost) line 410 spaced one line 410 from the block 414 and defines a (section) paragraph, for example. The text object 418 is a text block containing two words on a single line 410 spaced one line 410 from the bottommost line 410 of the block 416 and defines a section title or sub-title, for example. The text object 420 is a text block containing many words over multiple lines 410 with the topmost line 410 spaced one line 410 from the block 418 and defines a (section) paragraph, for example.

The document model defines sectioning content as content that defines the scope of headings and footers. Heading content defines the header of a section, whether explicitly marked up using sectioning content elements or implied by the heading content itself. A paragraph is typically a run of flow content that forms a block of text with one or more sentences, without any empty lines therebetween. Paragraphs may be any width (from single word to full width) depending on input length and position. At any time, the widest line of a paragraph defines its boundaries with potential consequences on the document model when new content is input. As long as all lines (but the last) are roughly the same width, the document model causes new content to be appended inline to the paragraph when typesetting reflow is performed. As discussed below, paragraphs are mainly created by skipping a line 410 between content input. When text is entered immediately before or after a paragraph without leaving an empty line, all new content is merged into the existing paragraph. All paragraphs may be split or merged with either content editing or gestures (described later).

As can be seen, the content of the text block 420 flows beyond the bottom of the input area 408 as displayed in FIG. 4. However, the content can be viewed (and input) through users scrolling the page 400 by single-point interaction (e.g., one-finger or stylus gesture touching or hovering over the interface 104) or multi-point interaction (e.g., two fingers touching or hovering over the interface 104 at about the same time) either anywhere on the input area or in a dedicated area(s), such as in one or more of the margins. When using a device that is able to differentiate finger from stylus, or a stylus which indicates its use to the device, or the user provides this indication, thus defining an active stylus for content input for example, multi-point interaction is not necessary and scrolling is available with a one-finger vertical scroll gesture anywhere on the interface surface 104, for example.

As mentioned above, the text blocks 412-420 are each separated by an empty line 410, e.g., a spacing of two LPUs. This simple constraint is placed on the input of separate paragraphs (and object blocks) in the vertical flow, in a manner which is easily understood and applied by users so that relative layout between object blocks in the vertical flow of the scroll page 400 can be cleanly maintained and applied to directly input content and dragged & dropped or pushed & dropped blocks. Benefits of this approach will become apparent from the following description of certain examples of editing provided by the present system and method. Alternatively or additionally however, such a constraint may not be required, particularly with the use of gestures to define styling, as described later.

FIGS. 5 to 7, 9, 10, 12, 13, 15, 16, 18 to 22 and 24 to 45 illustrate examples of editing gestures as performed on general example text blocks and FIGS. 8, 11, 14, 17, 23 and 46 to 48 illustrates those example editing gestures as performed on the example input of FIG. 4. In the illustrations of FIGS. 5 to 7, 9, 10, 12, 13, 15, 16, 18 to 22, 24 to 27, 36 to 38, 41, 42 and 45 document processing marks are shown depicting paragraph "¶", line break or carriage return "⏎" and character/word space "☐" for illustrative purposes only, not as displayed handwritten input. In the context of the paragraphing rule described above:

a paragraph is defined when a text block is separated from another text (or other object) block by at least one empty line 410;

a line break is defined when two text blocks are separated from one another through input of an associated gesture (described below) without an empty line 410 therebetween. Line breaks are not part of the explicit input, rather they are implicitly created/deleted by the document model only to take text layout into account and preserve user input. In this way, line breaks serve as layout helpers to express space in-between paragraphs;

a space is defined when characters, words, symbols, etc. within a text block are separated from one another on the same line 410 or over subsequent lines 410.

The symbols are depicted to aid understanding of the results of the detection and recognition of the editing gestures and to provide a contextual comparison to similar operations performed using a keyboard, e.g., the keying of a return or enter key to provide a paragraph "¶" or line break or carriage return "⏎" and the keying of a space bar to provide a space "☐". A line break is a special element that introduces a carriage return into phrasing content or content flow.

Before description of the examples is made, a brief description of an example of how the application 112 and the HWR system 114 of the present system and method detects and recognizes handwritten gestures is now provided. As described earlier, strokes entered on or via the input surface 104 are processed by the HWR system 114 using segmentation, recognition and language models in order to recognize each stroke and groups of strokes as handwritten objects, such as text characters and words. The recognition of gestures uses the same approach to detect strokes of the gestures, e.g., characterized by at least the stroke initiation location, the stroke termination location, and the path connecting the stroke initiation and termination locations, and combines this stroke detection with the determination of other characteristics of the strokes to detect gesture input and the context of that input in order to recognize the particular gesture used. This is done because it is not known at this point whether the newly entered strokes are further handwritten content, such as additional text, or a gesture for enacting some sort of control on already entered (and recognized) content.

Accordingly, the input strokes are processed by the recognizer 118 of the HWR system 114 to determine the probabilities of the strokes being certain input (e.g., text, symbol, shape, a straight line, a zig-zag line, a curly line) and to determine characteristics such as writing direction (e.g., left, right, vertical, horizontal), geometry (e.g., type and numbers of changes in direction, shape) and relation to the LPU. These determined characteristics together with the determined probable stroke types allow a determination of the possibility of the processed strokes being a type of gesture (e.g., an underline, a strikethrough, a scratch-out). The determined possible gesture types are evaluated for context by comparing the strokes of the possible gestures and the proximate recognized objects (e.g., characters, words, paragraphs). This comparison is used to verify that the input strokes are gestures and not further text input, for example, and whether the possible gestures types can apply in the detected case. This is done, for example, by comparing relative geometric features of the strokes of the gesture and objects/text (e.g., base-lines, bounding boxes, overlapping ratios) and/or by consideration of the language of the recognized text. A set of results is then proposed to the application 112 with probability scores and intervals of digital ink on which the probable gesture(s) must be applied. As such, the HWR system 114 only proposes gesture recognition results and does not make any updates to the context itself. In this way, any pre-determined recognition results, e.g., the recognized text for which a gesture has been input, is maintained. The application 112 processes these gesture recognition results in order to apply the modifications on the content or to ignore them.

The evaluation of some geometries can be disabled through UI settings on the application 112. This allows constraint on the availability of certain gestures. For example, the HWR system 114 may be able to recognize a strikethrough deletion gesture in both the left-to-right and right-to-left directions, however it may be desired to only allow strike-through in one of those directions. Such a disablement could be used to ease recognition or to allow the use of further gestures, e.g., a (reverse) strikethrough in the disabled direction may be recognized as an 'undo' of the recognized strikethrough. It is also possible to disable some types of gestures altogether, e.g., all erase gestures. Further, the evaluation of certain characteristics may be used to increase the probability scores. For example, writing flow may be used to increase the probability scores of add, overwrite, insert gestures so that other gestures will not be the best result when input is written continuously, e.g., the editing gestures subsequently follow content input, rather than being applied some time thereafter. This can be used to ease recognition of out of time content input, such as diacritics, e.g., the stroke for the character "t" after writing the full word containing the "t".

Figure 5A:
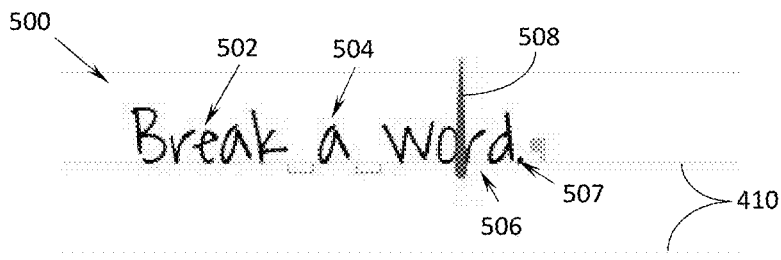
FIGS. 5A and 5B show an example of an editing gesture relating to breaking a word in accordance with the present system and method.

The example editing gestures are now described. FIG. 5A shows a single line paragraph 500 of several words, "Break" 502, "a" 504 and "word" 506, as defined by the spaces therebetween, and a period 507 after the word 506. An editing gesture 508 is detected as input as a top-to-bottom vertical line in a single stroke by a user swiping their finger or stylus tip from the top to the bottom in the displayed position shown, for example. That is, the stroke start position is above the stroke end position, in time order, as depicted by the gradual thickening of the stroke from the top to the bottom. The editing stroke 508 is detected by the HWR system 114 as passing between characters/letters of the word 506, namely the "o" and the "r". This relative location of the editing stroke 508 to the (recognized) text 500, e.g., within a word, provides one of the above-described characteristics of the editing gesture 508 whereas the top-to-bottom writing direction provides another characteristic.

Figure 5B:
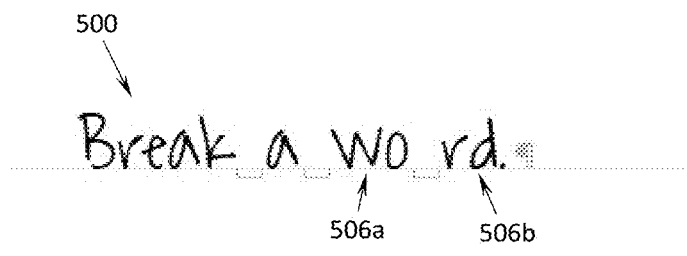

Consideration of these characteristics alone may result in a determination that the editing gesture 508 is intended by the user to break or split the word 506 at the detected location. This recognition result is shown in FIG. 5B in which the word 506 has been broken into two parts 506a and 506b having a space between the "o" and "r". As can be seen, the features of the paragraph 500 are otherwise retained. However, such a simple editing gesture could be confused through the handwriting recognition as being an additionally input character, e.g., the letter "l", if the HWR system 114 allows the recognition of such overwritten characters. In the illustrated case, the probability of this recognition result of the character "l" would most likely be lower than the probability of the editing gesture, 'break', because the language model of the HWR system 114 would return a poor result for the word "wolrd", for example. However, the language model could provide a relatively high probability for the miss-spelling of "world", for example, or the gesture could have been located between the "r" and "d" of the word 506 instead. Such recognition results depend on the language and context of input and as such recognition that is largely independent of such factors is preferred in order to provide a robust and widely applicable system and method.

Accordingly, the consideration of additional characteristics is made by the present system and method. Such a characteristic is the vertical extent of the editing stroke 508 in comparison to the input environment of the page 400. For example, the stroke 508 crosses the line 410 on which the paragraph 500 is written (and also the line 410 thereabove), which is not a typical characteristic of the letter "l", for example, and can therefore be used to relatively decrease the probability of that character being recognized. Alternatively or additionally, such a characteristic is the vertical extent of the editing stroke 508 in comparison to combined characteristics of the proximate objects defining the geometrical relationship therebetween, such as, the mean, average and/or maximum line patterns of the elements of those objects (e.g., base-line, center-line, top-line, ascender-line, descender-line, matra-line, rukar-line, etc.). For example, the editing stroke 508 crosses the base-line of the strokes of the word 506 (and also of the paragraph 500), which is not a typical characteristic of the letter "l", for example, and can therefore be used to relatively decrease the probability of that character being recognized.

The application 112 may be configured to display the input editing stroke(s) as digital ink, either with a shape as, for example, shown in FIG. 5A, or some other appropriate rendering until the recognized editing operation is performed or may just perform the editing operation without such display. The display of the detected editing gesture may be used to provide recognition feedback to users with respect to recognition of the gesture itself and the relative location thereof. Otherwise, the eventual editing operation, e.g., the modified display shown in FIG. 5B, may be used for such feedback.

Figure 6A:
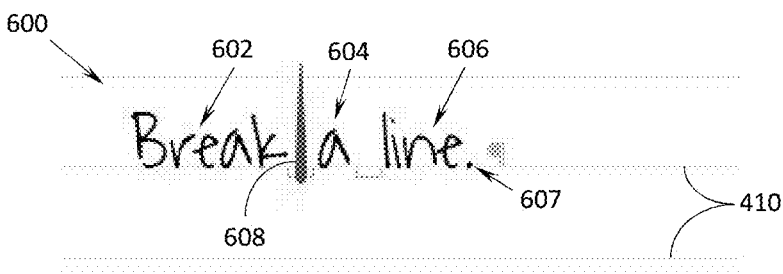
FIGS. 6A and 6B show an example of an editing gesture relating to breaking a line in accordance with the present system and method.
Figure 6B:

FIG. 6A shows a single line paragraph 600 of several words, "Break" 602, "a" 604 and "line" 606, as defined by the spaces therebetween, and a period 607 after the word 606. An editing gesture 608 is detected as input as a top-to-bottom vertical line in a single stroke in the displayed position shown. The editing stroke 608 is detected by the HWR system 114 as passing between the words 602 and 604. Like the example of FIG. 5, this relative location of the editing stroke 608 to the (recognized) text 600, e.g., in a space between words, provides one of the above-described characteristics of the editing gesture 608 whereas the top-to-bottom writing direction provides another characteristic. Consideration of these characteristics alone may result in a determination that the editing gesture 608 is intended by the user to break or split the single line of the paragraph 600 at the detected location into two lines. This recognition result is shown in FIG. 6B in which the paragraph 600 has been broken into two lines 600a and 600b of text with the word 602 on the original (first) line 410 of the paragraph 600 as the line 600a and the words 604 and 606 and period 607 on the next (second) line 410 directly beneath the first line 410 of the paragraph 600 as the line 600b having a space between the word 602 and the word 604. As can be seen, the features of the paragraph 600 are otherwise retained. As described above in relation to FIG. 5, the consideration of additional characteristics, such as the vertical extent of the editing stroke 608 in comparison to the input environment of the page 400 and/or combined characteristics of the proximate objects may be further used by the present system and method to further verify such a recognition result.

As discussed above in relation to FIG. 6, the paragraph 600 is split over two lines with the provision of a space between the lines. Alternatively, however the split may be performed with the provision of a line break. The difference between these situations is that upon a change in the display conditions, such as responsive display (e.g., the window size of the UI for the application 112 or the aspect or screen size of the device 100 is changed) or further editing of the content or typesetting of the digital ink into typeset ink, the provision of a space between lines of a paragraph will allow reflow of the digital or typeset ink, e.g., words of paragraphs are flowed to adjacent lines to respect word spacing convention, whereas the provision of a line break preserves the flow as input, such that reflow is not allowed across the broken lines.

Figures 7A, 7B:
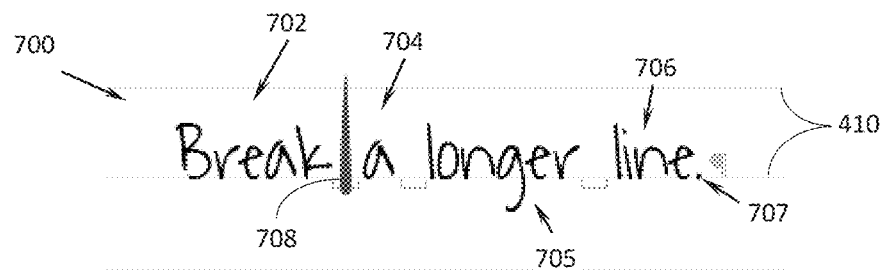
FIGS. 7A and 7B show another example of an editing gesture relating to breaking a line in accordance with the present system and method.

FIG. 7A shows an example in which a line break instead of space is provided upon the breaking of a line. In FIG. 7A, a single line paragraph 700 of several words, "Break" 702, "a" 704, "longer" 705, and "line" 706, as defined by the spaces therebetween, and a period 707 after the word 706, has been input. An editing gesture 708 is detected as input as a top-to-bottom vertical line in a single stroke in the displayed position shown. The editing stroke 708 is detected by the HWR system 114 as passing between the words 702 and 704. Like the example of FIG. 6, this relative location of the editing stroke 608 to the (recognized) text 700, e.g., in a space between words, provides one of the above-described characteristics of the editing gesture 708 whereas the top-to-bottom writing direction provides another characteristic. Consideration of these characteristics alone may result in a determination that the editing gesture 708 is intended by the user to break or split the single line of the paragraph 700 at the detected location into two lines. This recognition result is shown in FIG. 7B in which the paragraph 700 has been broken into two lines 700a and 700b having a line break between the word 702 and the word 704, such that the word 702 remains on the original (first) line 410 and the remaining words 704, 705 and 706 and the period 707 are moved the next (second) line 410 below the first line 410. As can be seen, the features of the paragraph 700 are otherwise retained. As described above in relation to FIG. 6, the consideration of additional characteristics, such as the vertical extent of the editing stroke 708 in comparison to the input environment of the page 400 and/or combined characteristics of the proximate objects may be further used by the present system and method to further verify such a recognition result.

The determination of whether to provide a space or line break in scenarios such as in FIGS. 6 and 7 could be provided through consideration of further characteristics of the input, such as the paragraph dimensions and/or gesture position, such as the overall width of the paragraph 600 being reduced in FIG. 6 leading to a consideration that the user's intent was to input an additional object block next to the paragraph 600 (e.g., an image block), such that allowance of reflow is appropriate, whereas in FIG. 7 the second line 410 is provided with more content than the first line 410 after the breaking operation (see FIG. 7B) leading to the consideration that the user intended a layout change of the paragraph 700, such that a line break is appropriate. It is understood that additional and/or alternative characteristics may be used, and may be settable via the UI by users.

FIG. 8 shows an example line break operation performed on the example input of FIG. 4. In FIG. 8, a break gesture 800 is detected as input as a top-to-bottom vertical line in a single stroke in the displayed position shown. The editing stroke 800 is detected by the HWR system 114 as passing between elements 422 and 424 on a line 426 of the paragraph 416, being the period 422 and capitalized word 424. Like the examples of FIGS. 5 to 7, this relative location of the editing stroke 800 to the (recognized) paragraph 416, e.g., in a space between sentences, provides one of the above-described characteristics of the editing gesture 800 whereas the top-to-bottom writing direction provides another characteristic. Consideration of these characteristics alone may result in a determination that the editing gesture 800 is intended by the user to break or split the paragraph 416 at the detected location. Depending on context of this recognition and/or settings of the application 112, this recognition result may cause the provision of a space or a line break at the detected break position, as discussed above. The provision of either of these layout operations may cause different actions on other parts of the content.

Figure 8A:
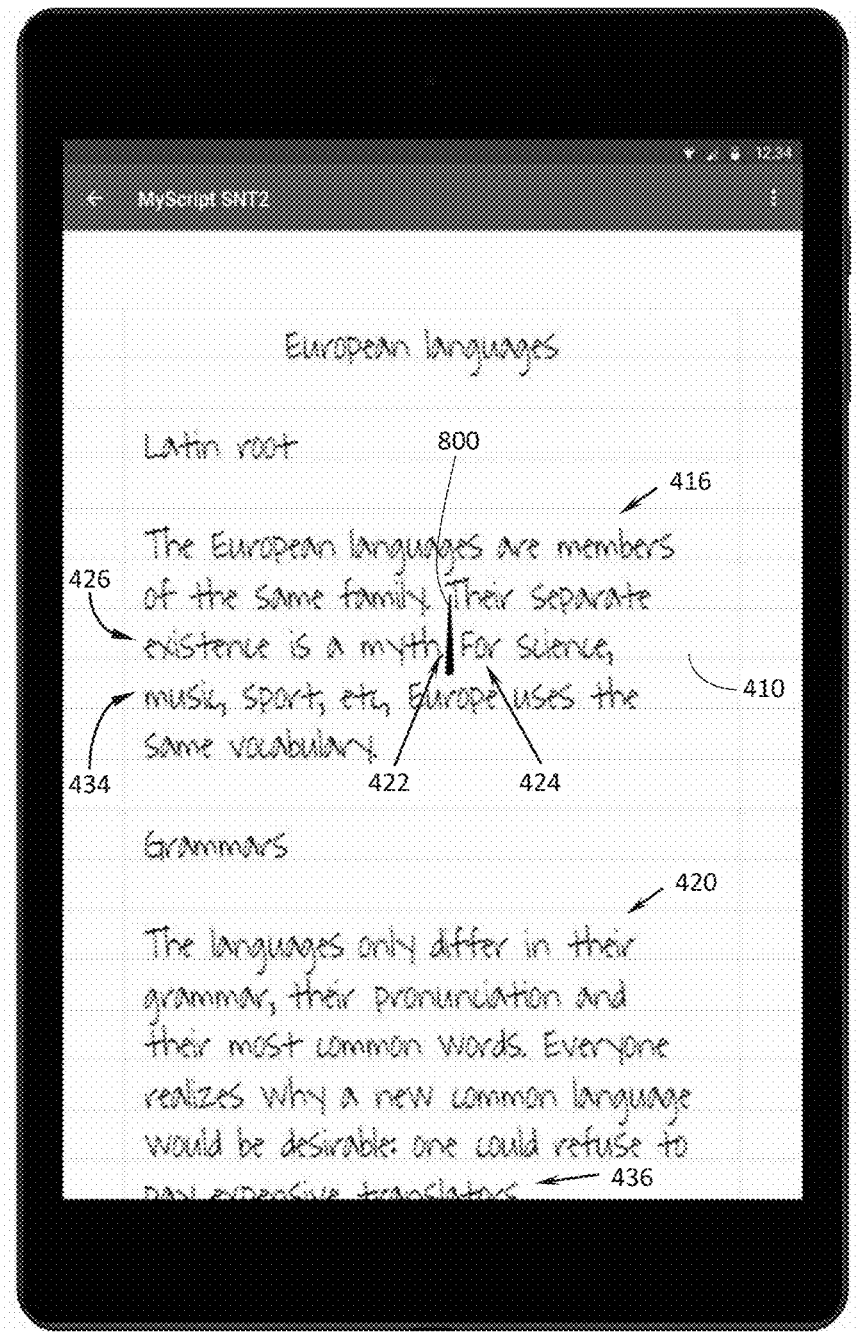
FIGS. 8A-8C show a schematic view of an example visual rendering of a scroll page on a portion of an input surface of the computing device that includes an example of an editing gesture relating to breaking a line in accordance with the present system and method.
Figure 8B:
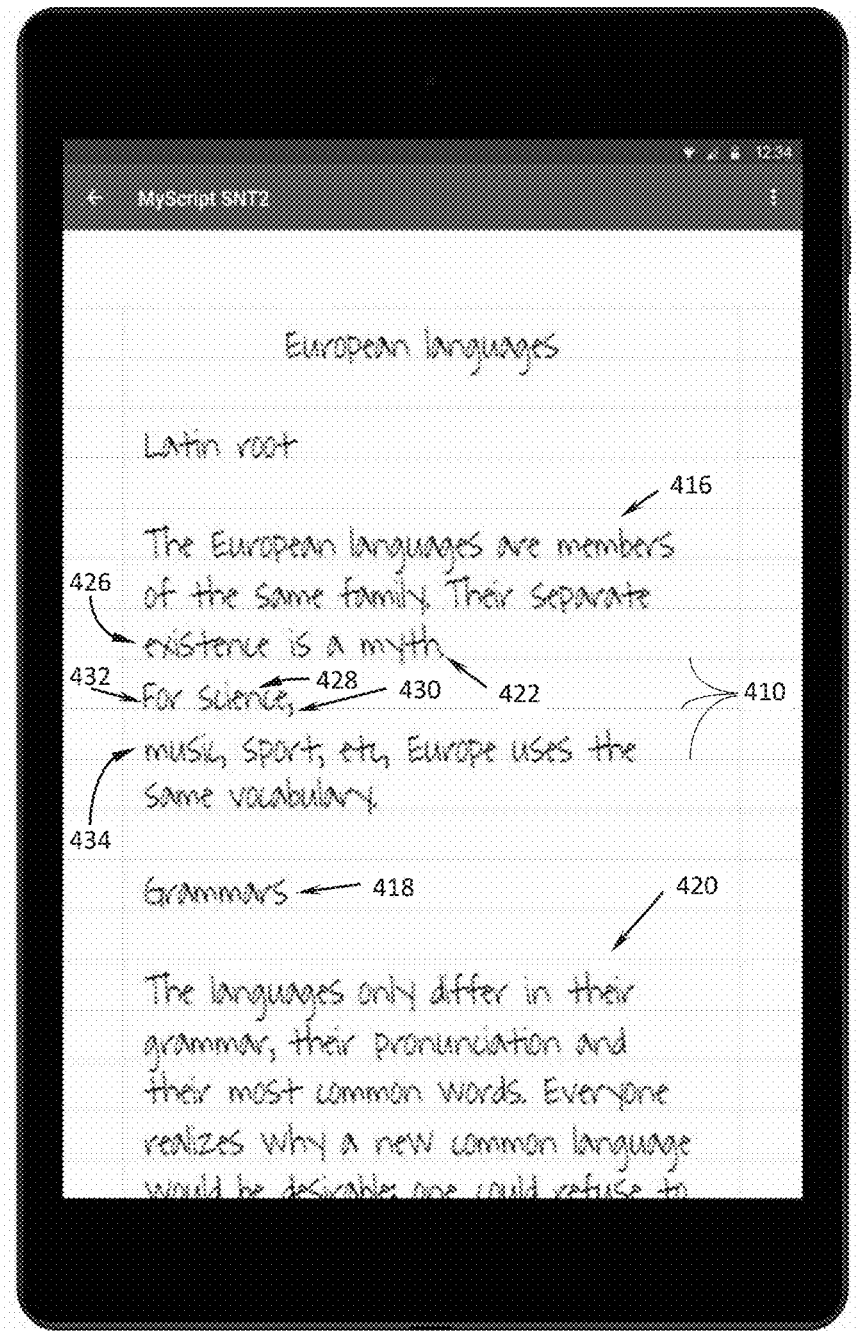

For example, if the application 112 provides a line break in determination of the recognition result, which means that text reflow is not allowed, then any downstream content of the broken paragraph may similarly be non-reflowed during the break operation. This is shown in FIG. 8B in which the paragraph 416 has been broken so that the period 422 remains on the original (first) line 410 (together with the preceding words) and the word 424 (and subsequent word 428 and comma 430) is moved onto the subsequent (second) line 410 below as a new line 432 of the paragraph 416, with a line break (not shown) provided between the lines 426 and 432. Consequently, the text of the paragraph 416 on the second line 410 (a line 434) in the original layout of the input 400 shown in FIG. 8A is moved to the next (third) line 410 below the second line 410, with consequential and similar movement of all remaining lines of the paragraph 416 and the heading 418 and paragraph 420, as shown in FIG. 8B (e.g., it can be seen that a last line 436 of text of the paragraph 420 as displayed in FIG. 8A is scrolled out of the display 104).

Figure 8C:
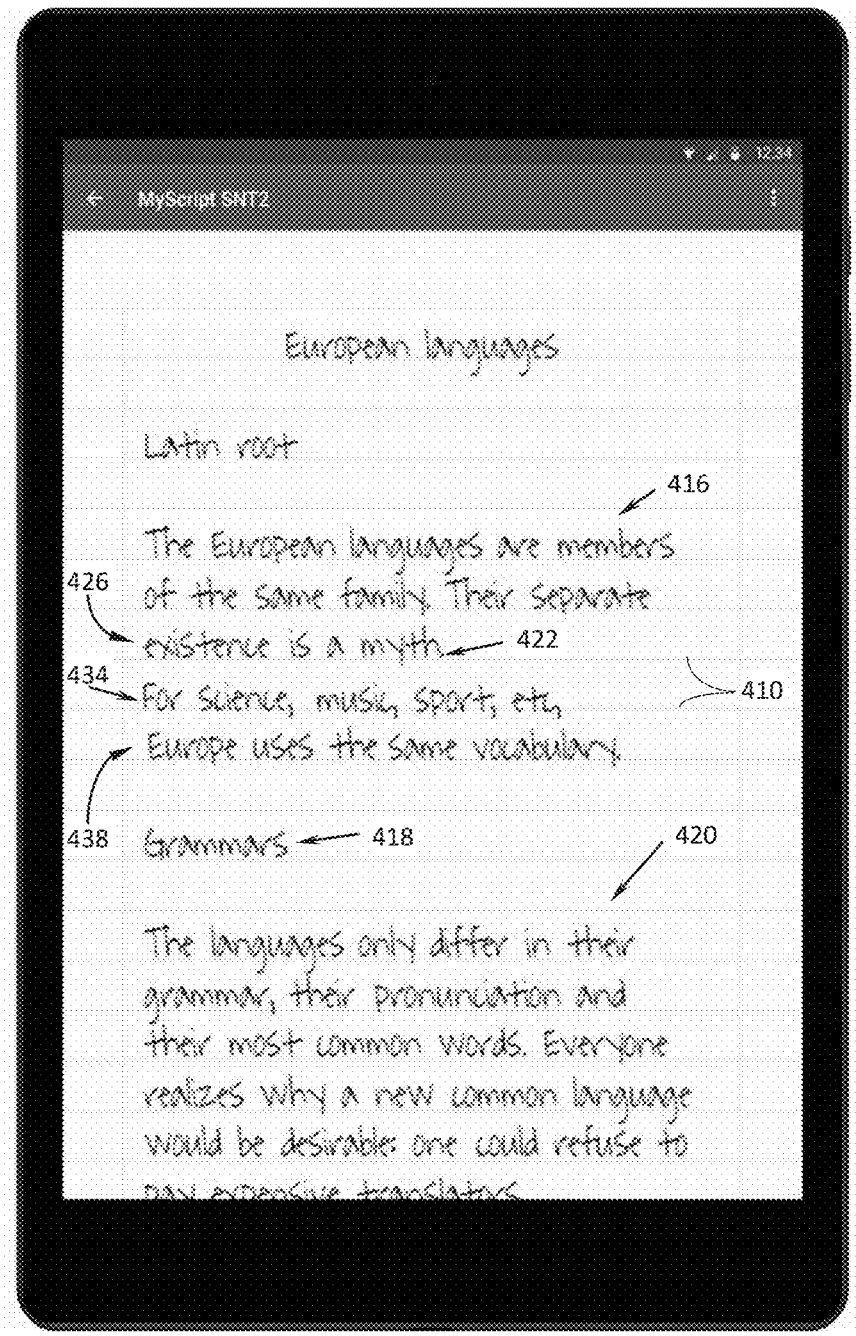

On the other hand, if the application 112 provides a space in determination of the recognition result, which means that text reflow is allowed, then any downstream content of the broken paragraph may similarly be reflowable during the break operation. This is shown in FIG. 8C in which the paragraph 416 has been split so that the period 422 remains on the first line 410 (together with the preceding words) and the word 424 (and subsequent word 428 and comma 430) is moved onto the second line 410 below, with a space (not shown) provided between the line 426 and the content on the second line 410. However, unlike the example of FIG. 8B, the moved content does not create a new line, instead this content (i.e., the words 424 and 428 and comma 430) is reflowed onto the next line 434 of the paragraph 416 with consequential reflow of some of the content originally in the line 434 onto the third line 410 (a line 438 of the paragraph 416) and reflow of some of the content originally in the line 438 to accommodate the reflowed upper content. As can be seen, no further reflow of the downstream content (e.g., the heading 418 and paragraph 420) is required in this case, as the reflowed line 438 of the paragraph 416 accommodates the reflowed and original content.

The above described examples illustrate the breaking of a line of text within a single- or multi-line paragraph using the described top-to-bottom single stroke break gesture. It is considered that this gesture is relatively intuitive to break elements of object blocks for the vertical flow scenario of the left-to-right language input illustrated in the examples. However, it is understood that a single stroke gesture in a different direction, particularly with horizontal flow languages, multiple stroke gestures, such as a two stroke gesture tracing the line break or carriage return symbol, or non-directional gestures, such as a tap, can also be used. Similar break gestures can also be used in the context of breaking a paragraph rather than a line.

Figure 9A:
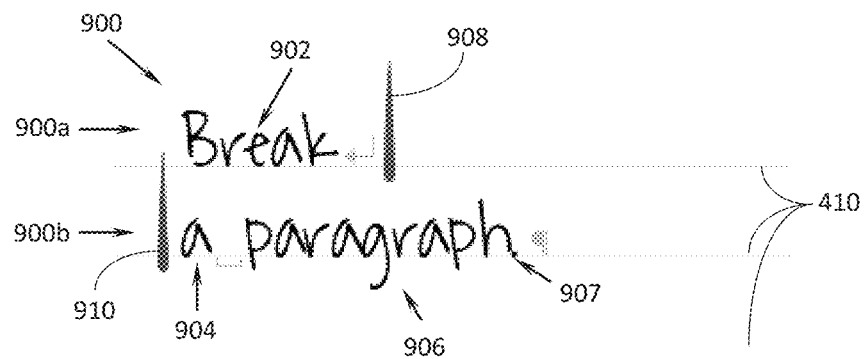
FIGS. 9A and 9B show an example of an editing gesture relating to breaking a paragraph in accordance with the present system and method.

FIG. 9A shows a multi-line paragraph 900 of several words, "Break" 902 in a first line 900a of the paragraph 900 (on the first line 410) and "a" 904 and "paragraph" 906, and a period 907 after the word 906, in a second line 900b of the paragraph 900 (on the second line 410 directly beneath the first line 410), having a line break therebetween. An editing gesture 908 is detected at the line break of the line 900a (e.g., to the right of the word 902) or an editing gesture 910 is detected at the beginning of the line 900b (e.g., to the left of the word 904), with either input as a top-to-bottom vertical line in a single stroke. In either case the editing stroke 908 or 910 is detected by the HWR system 114 as passing between the lines 900a and 900b of the paragraph 900.

Figure 9B:
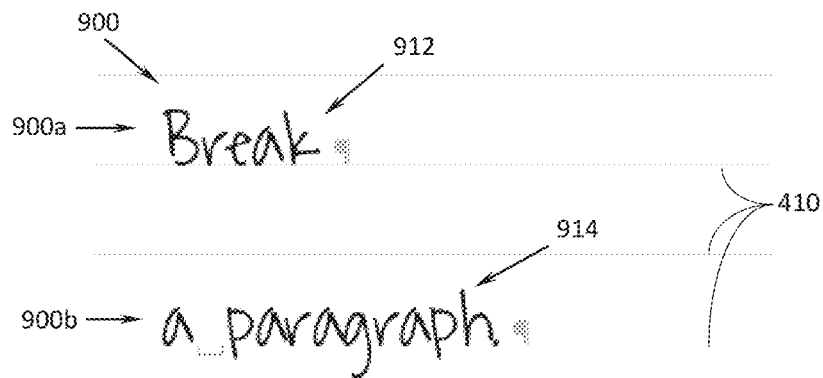

Like the examples of FIGS. 5 to 8, this relative location of the editing stroke 908 or 910 to the (recognized) text 900, e.g., at a line break, provides one of the above-described characteristics of the editing gesture 908 or 910 whereas the top-to-bottom writing direction provides another characteristic. Consideration of these characteristics alone may result in a determination that the editing gesture 908 or 910 is intended by the user to break or split the single paragraph 900 at the detected location into two paragraphs. This recognition result is shown in FIG. 9B in which the paragraph 900 has been broken into two single line paragraphs 912 and 914 with the (first) paragraph 912 containing the word 902 of the original (first) line 900a of the paragraph 900 (on the original first line 410) and the (second) paragraph 914 containing the words 904 and 906 and the period 907 of the original (second) line 900b of the paragraph 900 on the next (third) line 410 directly below the second line 410, such that the second line 410 is now empty, e.g., free of content between the lines of the paragraph 900, and the line break is replaced with a paragraph marker. As described above in relation to FIGS. 5 to 8, the consideration of additional characteristics, such as the vertical extent of the editing strokes 908 or 910 in comparison to the input environment of the page 400 and/or combined characteristics of the proximate objects may be further used by the present system and method to further verify such a recognition result.

Figure 10A:
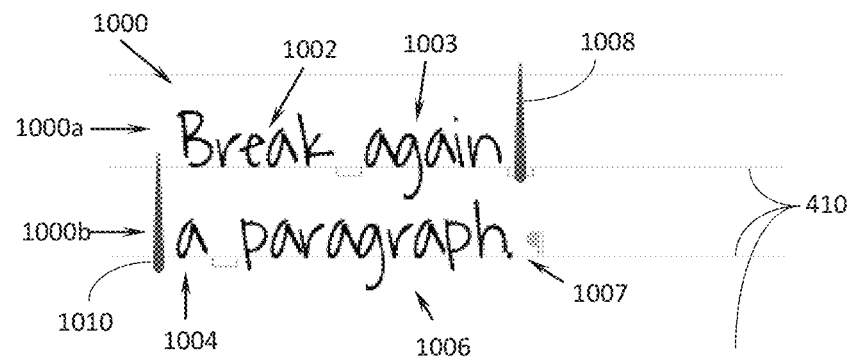
FIGS. 10A-10D show another example of an editing gesture relating to breaking a paragraph in accordance with the present system and method.

As discussed above in relation to FIG. 9, the multi-line paragraph 900 is split into two paragraphs over an existing line break. Such a split may also be performed over an existing space, as shown in FIG. 10. FIG. 10A shows a multi-line paragraph 1000 of several words, "Break" 1002 and 'again' 1003 in a first line 1000a of the paragraph 1000 (on the first line 410) and "a" 1004 and "paragraph" 1006, and a period 1007 after the word 1006, in a second line 1000b of the paragraph 1000 (on the second line 410 directly beneath the first line 410), having a space therebetween. An editing gesture 1008 is detected at the space after the word 1003 of the line 1000a (e.g., to the right of the word 1003) or an editing gesture 1010 is detected at the beginning of the line 1000b (e.g., to the left of the word 1004), with either input as a top-to-bottom vertical line in a single stroke. In either case the editing stroke 1008 or 1010 is detected by the HWR system 114 as passing between the lines 1000a and 1000b of the paragraph 1000.

Figure 10B:
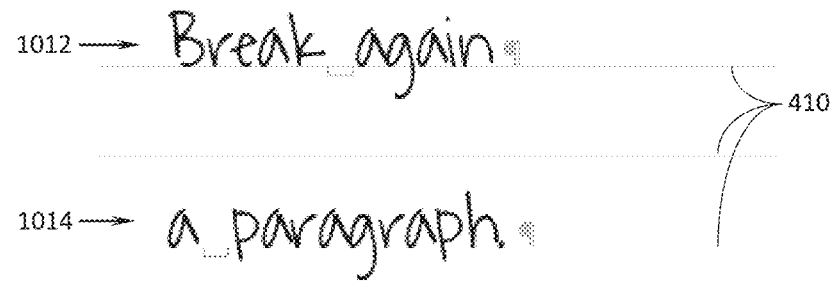
Figure 10C:
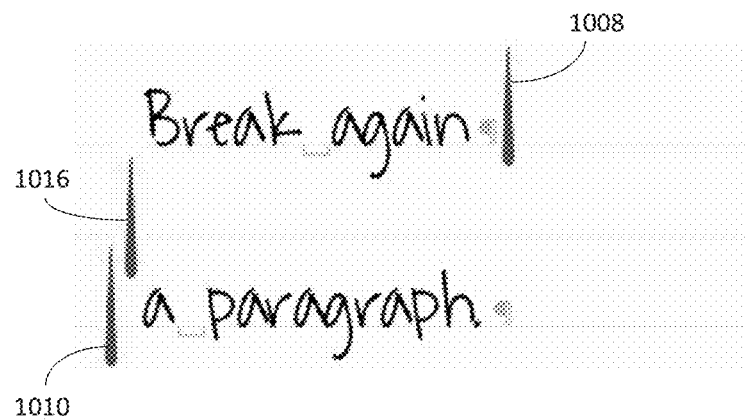

Like the example of FIG. 9, this relative location of the editing stroke 1008 or 1010 to the (recognized) text 1000, e.g., at an end space, provides one of the above-described characteristics of the editing gesture 1008 or 1010 whereas the top-to-bottom writing direction provides another characteristic. Consideration of these characteristics alone may result in a determination that the editing gesture 1008 or 1010 is intended by the user to break or split the single paragraph 1000 at the detected location into two paragraphs. This recognition result is shown in FIG. 10B in which the paragraph 1000 has been broken into two single line paragraphs 1012 and 1014 with the (first) paragraph 1012 containing the words 1002 and 1003 of the original (first) line 1000a of the paragraph 1000 (on the original first line 410) and the (second) paragraph 1014 containing the words 1004 and 1006 and the period 1007 of the original (second) line 1000b of the paragraph 1000 on the next (third) line 410 directly below the second line 410, such that the second line 410 is now empty, and the end space of the line 1000a is replaced with a paragraph marker. Accordingly, a similar recognition result to that of the example of FIG. 9B is obtained. As described above in relation to FIG. 9, the consideration of additional characteristics, such as the vertical extent of the editing strokes 1008 or 1010 in comparison to the input environment of the page 400 and/or combined characteristics of the proximate objects may be further used by the present system and method to further verify such a recognition result.

Further space between separate paragraphs, whether they have been formed by splitting a single paragraph as in the examples of FIGS. 9 and 10 or initially input in that manner, can be provided using similarly located break gestures. FIG. 10C shows the separate paragraphs 1012 and 1014 of FIG. 10B with the editing gesture 1008 detected at the paragraph marker after the word 1003 of the paragraph 1012 (e.g., to the right of the word 1003) or the editing gesture 1010 detected at the beginning of the paragraph 1014 (e.g., to the left of the word 1004) or an editing gesture 1016 detected in the empty space between the paragraphs 1012 and 1014 (in the second line 410), with either of these gestures input as a top-to-bottom vertical line in a single stroke. In either case the editing stroke 1008, 1010 or 1016 is detected by the HWR system 114 as passing between the paragraphs 1012 and 1014.

Figure 10D:
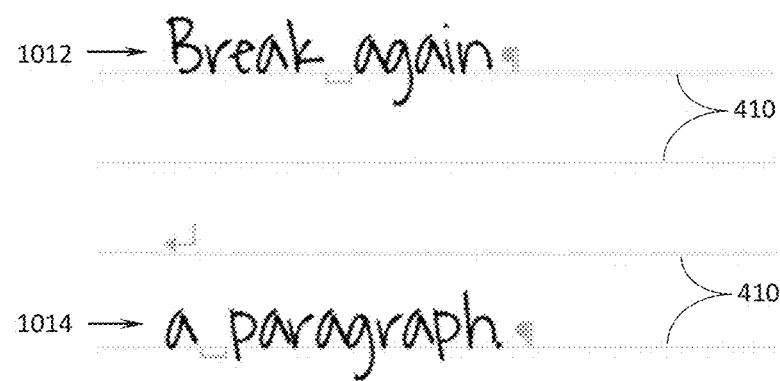

As for FIG. 10A, this relative location of the editing stroke 1008, 1010 or 1016 to the (recognized) text 1012 and 1014, e.g., between the paragraphs, provides one of the above-described characteristics of the editing gesture 1008, 1010 or 1016 whereas the top-to-bottom writing direction provides another characteristic. Consideration of these characteristics alone may result in a determination that the editing gesture 1008, 1010 or 1016 is intended by the user to add a further space between the paragraph 1012 and 1014 at the detected location. This recognition result is shown in FIG. 10D in which the (second) paragraph 1014 is moved to the next (fourth) line 410 directly below the third line 410, such that both the second and third lines 410 are now empty, and within the third line 410 a line break marker is recorded. The provision of this line break, which may be selectable through the application 112, can be used to provide control of movement of downstream content if content is added to the second or third lines 410, for example, e.g., if content is added to the second line, this is considered as content added to the paragraph 1012 such that the third line 410 is retained without movement of the paragraph 1014. As described above, the consideration of additional characteristics, such as the vertical extent of the editing strokes 1008, 1010 or 1016 in comparison to the input environment of the page 400 and/or combined characteristics of the proximate objects may be further used by the present system and method to further verify such a recognition result.

FIG. 11 shows an example space addition operation performed on the example input of FIG. 4. In FIG. 11, a space gesture 1100 is detected as input as a top-to-bottom vertical line in a single stroke in the displayed position shown. The editing stroke 1100 is detected by the HWR system 114 as passing between the paragraphs 416 and 418 on the empty (first) line 410 therebetween and above the (second) line 410 on which the paragraph 418 is provided. Like the example of FIGS. 10C and 10D, this relative location of the editing stroke 1100 to the (recognized) paragraphs 416 and 418, e.g., in a space between the paragraphs, provides one of the above-described characteristics of the editing gesture 1100 whereas the top-to-bottom writing direction provides another characteristic. Consideration of these characteristics alone may result in a determination that the editing gesture 1100 is intended by the user to add a further space between the paragraphs 416 and 418 at the detected location.

Figure 11A:
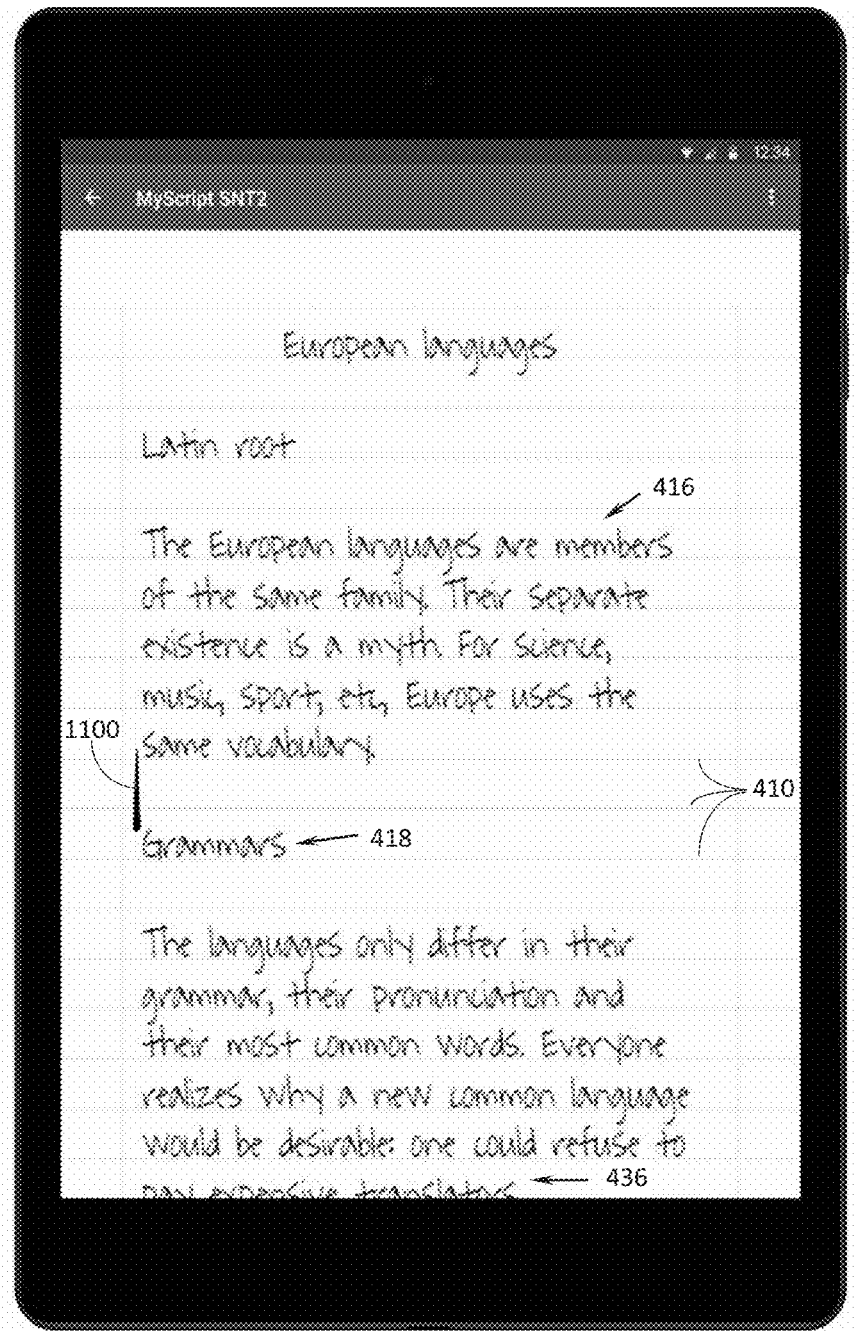
FIGS. 11A and 11B show a schematic view of an example visual rendering of a scroll page on a portion of an input surface of the computing device that includes an example of an editing gesture relating to breaking a paragraph in accordance with the present system and method.
Figure 11B:
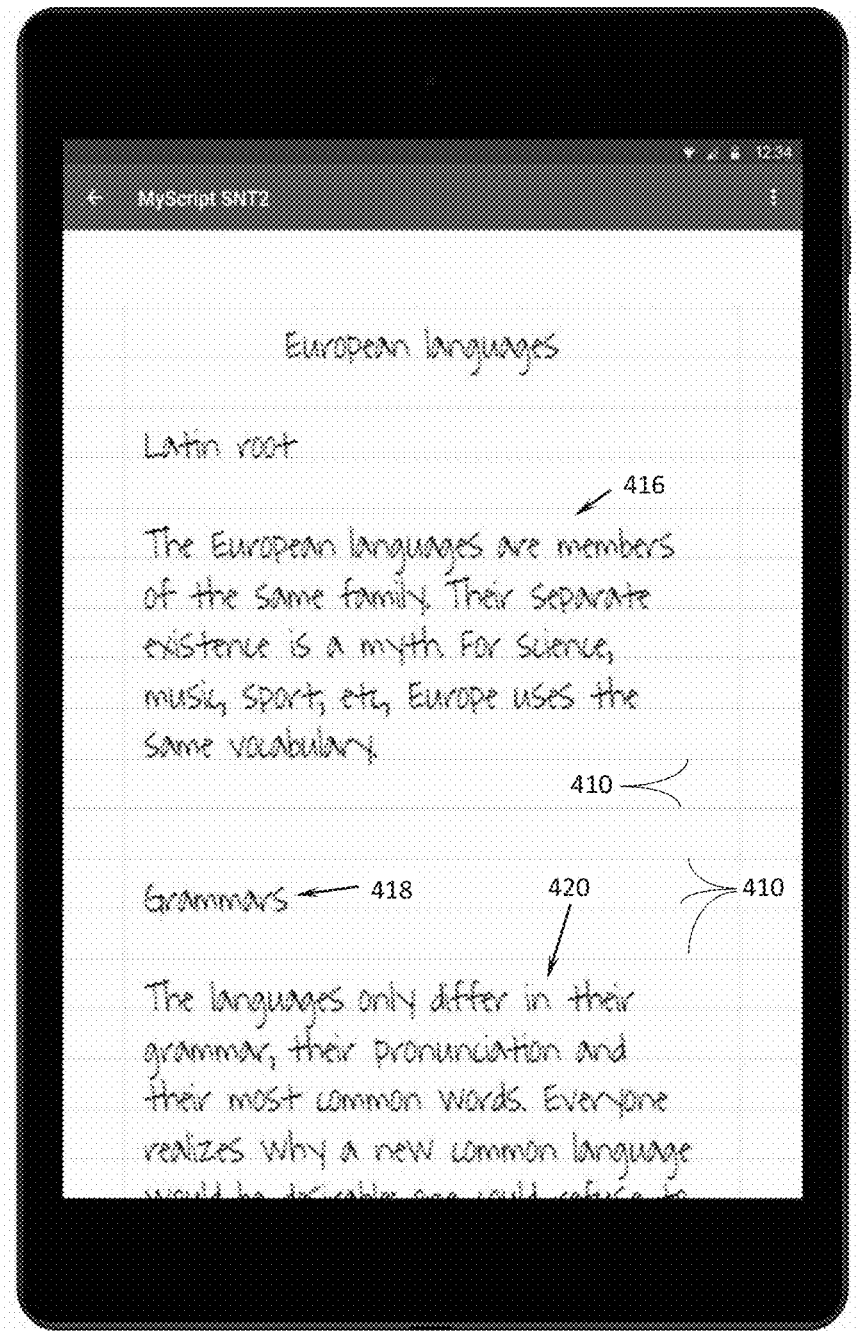

This recognition result is shown in FIG. 11B in which the paragraph 418 has been moved onto the subsequent (third) line 410 below the second line 410. Consequently, the paragraph 420 on the (fourth) line 410 below the third line 410 in the original layout of the input 400 shown in FIG. 11A is moved to the next (fifth) line 410 below the fourth line 410 (e.g., it can be seen that the last line 436 of text of the paragraph 420 as displayed in FIG. 11A is scrolled out of the display 104). Depending on context of this recognition and/or settings of the application 112, this recognition result may cause the provision of a line break at the detected break position with the consequential actions on other parts of the content, as discussed above.

The above described examples illustrate the breaking of a single- or multi-line paragraph into separate paragraphs or spacing of separate paragraphs using the described top-to-bottom single stroke break or space gesture. It is considered that this gesture is relatively intuitive to break object blocks into separate blocks or to space object blocks for the vertical flow scenario of the left-to-right language input illustrated in the examples. However, it is understood that a single stroke gesture in a different direction, particularly with horizontal flow languages, multiple stroke gestures, such as a two stroke gesture tracing the line break or carriage return symbol, or non-directional gestures, such as a tap, can also be used.

Figure 12A:
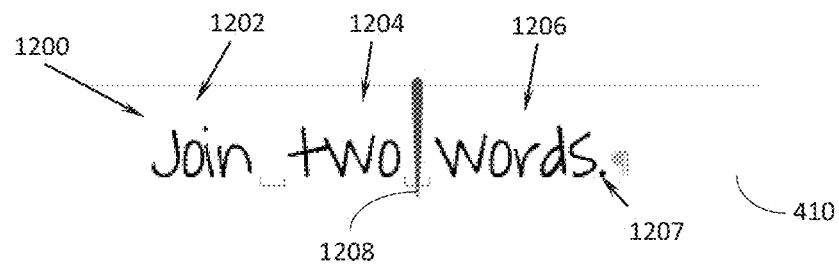
FIGS. 12A-12C show an example of an editing gesture relating to joining two words in accordance with the present system and method.

The afore-described editing gestures were for performing breaking, splitting or spacing operations in relation to handwritten content. Other editing operations are also possible. FIG. 12A shows a single line paragraph 1200 of several words, "Join" 1202, "two" 1204 and "words" 1206, as defined by the spaces therebetween, and a period 1207 after the word 1206. An editing gesture 1208 is detected as input as a bottom-to-top vertical line in a single stroke by a user swiping their finger or stylus tip from the bottom to the top in the displayed position shown, for example. That is, the stroke start position is below the stroke end position, in time order, as depicted by the gradual thickening of the stroke from the bottom to the top. The editing stroke 1208 is detected by the HWR system 114 as passing in the space between the words 1204 and 1206. This relative location of the editing stroke 1208 to the (recognized) text 1200, e.g., in a space between words, provides one of the above-described characteristics of the editing gesture 1208 whereas the bottom-to-top writing direction provides another characteristic.

Figure 12B:
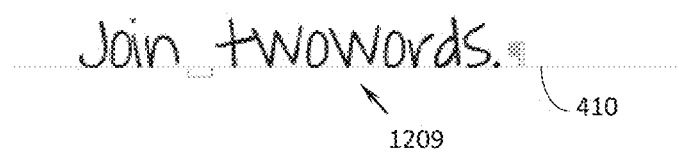

Consideration of these characteristics alone may result in a determination that the editing gesture 1208 is intended by the user to join the words 1204 and 1206 together or delete the space at the detected location, and as such the recognition result is as that shown in FIG. 12B in which the words 1204 and 1206 have been joined into a new word 1209, namely at the "o" of the word 1204 and the "w" of the word 1206. As can be seen, the features of the paragraph 1200 are otherwise retained. However, such a simple editing gesture could be confused through the handwriting recognition as being an additionally input character, e.g., the letter "l". In the illustrated case, the probability of this recognition result of the character "l" would perhaps likely be lower than the probability of the editing gesture, 'join', because the language model the HWR system 114 would return a poor result for an "l" character written in the bottom-to-top stroke order, for example. However, the language model could provide a relatively similar probability for the word "twolwords" if the input is an "l" or the word "twowords" if the input is the editing gesture, 'join', for example. Such recognition results depend on the language and context of input and as such recognition that is largely independent of such factors is preferred in order to provide a robust and widely applicable system and method.

Accordingly, the consideration of additional characteristics is made by the present system and method. Like with the top-to-bottom vertical editing gesture, such a characteristic is the vertical extent of the editing stroke 1208 in comparison to the input environment of the page 400. For example, the stroke 1208 crosses the line 410 on which the paragraph 1200 is written (and also the line 410 thereabove), which is not a typical characteristic of the letter "l", for example, and can therefore be used to relatively decrease the probability of that character being recognized. Alternatively or additionally, such a characteristic is the vertical extent of the editing stroke 1208 in comparison to combined characteristics of the proximate objects defining the geometrical relationship therebetween, such as, the mean, average and/or maximum line patterns of the elements of those objects (e.g., base-line, center-line, top-line, ascender-line, descender-line, matra-line, rukar-line, etc.). For example, the editing stroke 1208 crosses the base-line of the strokes of the words 1204 and 1206 (and also of the paragraph 1200), which is not a typical characteristic of the letter "l", for example, and can therefore be used to relatively decrease the probability of that character being recognized.

Figure 12C:
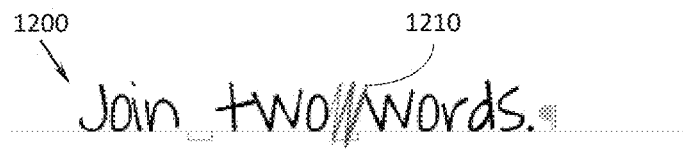

The recognition of such a join or space delete gesture may be further enhanced by allowing or requiring a different gesture type. FIG. 12C shows the single line paragraph 1200 with an editing gesture 1210 detected as input as a vertical zig-zag line in a single, multi-directional stroke by a user swiping their finger or stylus tip up and down several times in the displayed position shown, for example. The editing stroke 1210 is detected by the HWR system 114 as passing in the space between the words 1204 and 1206. This relative location of the editing stroke 1210 to the (recognized) text 1200, e.g., in a space between words, provides one of the above-described characteristics of the editing gesture 1210 whereas the zig-zagging provides another characteristic.

Consideration of these characteristics alone may result in a determination that the editing gesture 1210 is intended by the user to join the words 1204 and 1206 together or delete the space at the detected location, and as such the recognition result is as that shown in FIG. 12B. In this way, a zig-zag or scratch-out gesture is used rather than the relatively simple, unidirectional editing gesture described in relation to FIG. 12A. However, the zig-zag gesture 1210 could also be confused through the handwriting recognition as being an additionally input character, e.g., the letter "w". In the illustrated case, the probability of this recognition result of the character "w" would perhaps likely be lower than the probability of the editing gesture, 'join', because the language model the HWR system 114 would return a poor result for a "w" character written with the depicted slant which is much different to the slant of the other characters of the recognized text 1200, for example. However, the language model could provide a relatively similar probability for the word "twowwords" if the input is a "w" or the word "twowords" if the input is the editing gesture, 'join', for example. Such recognition results depend on the language and context of input and as such recognition that is largely independent of such factors is preferred in order to provide a robust and widely applicable system and method.

Accordingly, the consideration of additional characteristics is made by the present system and method. Like the bottom-to-top join or space delete gesture, such a characteristic is the vertical extent of the editing stroke 1210 in comparison to the input environment of the page 400. For example, the stroke 1210 crosses the line 410 on which the paragraph 1200 is written, which is not a typical characteristic of the letter "w", for example, and can therefore be used to relatively decrease the probability of that character being recognized. Alternatively or additionally, such a characteristic is the vertical extent of the editing stroke 1210 in comparison to combined characteristics of the proximate objects defining the geometrical relationship therebetween, such as, the mean, average and/or maximum line patterns of the elements of those objects (e.g., base-line, center-line, top-line, ascender-line, descender-line, matra-line, rukar-line, etc.). For example, the editing stroke 1210 crosses the base-line of the strokes of the words 1204 and 1206 (and also of the paragraph 1200), which is not a typical characteristic of the letter "w", for example, and can therefore be used to relatively decrease the probability of that character being recognized.

The application 112 may be configured to display the input editing stroke(s) as digital ink, either with a shape as, for example, shown in FIG. 12A or FIG. 12C, or some other appropriate rendering until the recognized editing operation is performed or may just perform the editing operation without such display. The display of the detected editing gesture may be used to provide recognition feedback to users with respect to recognition of the gesture itself and the relative location thereof. Otherwise, the eventual editing operation, e.g., the modified display shown in FIG. 12B, may be used for such feedback.

Figure 13A:
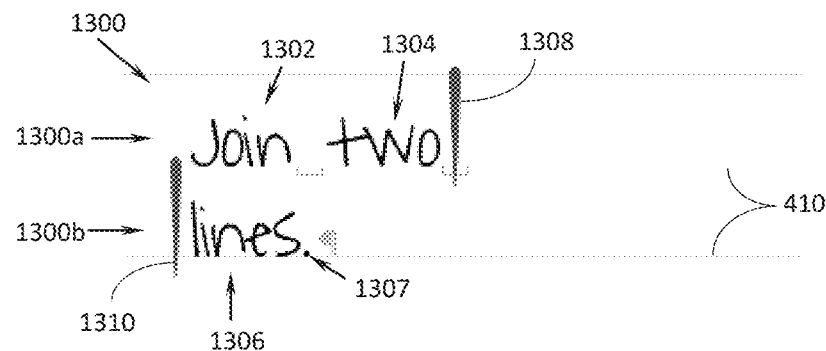
FIGS. 13A-13E show an example of an editing gesture relating to joining two lines in accordance with the present system and method.
Figure 13B:
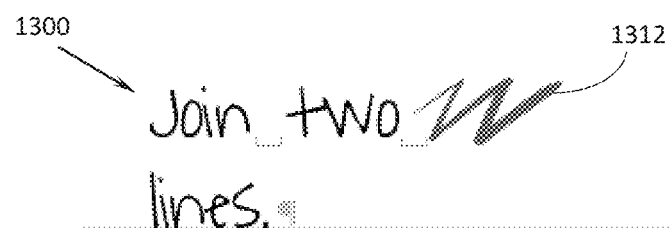

Similar join or space (or line break) delete gestures can be used to join separate text lines of a paragraph. For example, FIG. 13A shows a multi-line paragraph 1300 of several words, "Join" 1302 and "two" 1304 in a first line 1300*a* of the paragraph 1300 (on the first line 410) and "lines" 1306, and a period 1307 after the word 1306, in a second line 1300*b* of the paragraph 1300 (on the second line 410 directly beneath the first line 410), having a space therebetween. An editing gesture 1308 is detected at the end space of the line 1300*a* (e.g., to the right of the word 1304) or an editing gesture 1310 is detected at the beginning of the line 1300*b* (e.g., to the left of the word 1306), with either input as a bottom-to-top vertical line in a single stroke. Similarly, in FIG. 13B an editing gesture 1312 detected as input as a vertical zig-zag line in a single, multi-directional stroke is detected at the end space of the line 1300*a* of the paragraph 1300. In either case the editing stroke 1308, 1310 or 1312 is detected by the HWR system 114 as passing between the lines 1300*a* and 1300*b* of the paragraph 900. This relative location of the editing strokes to the (recognized) text 1300, e.g., in a space between lines, provides one of the above-described characteristics of the editing gestures whereas the bottom-to-top writing direction or zig-zagging provides another characteristic.

Figure 13C:
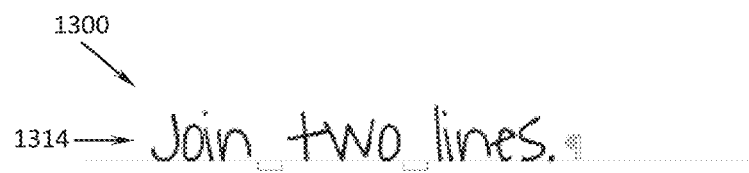
Figure 13D:
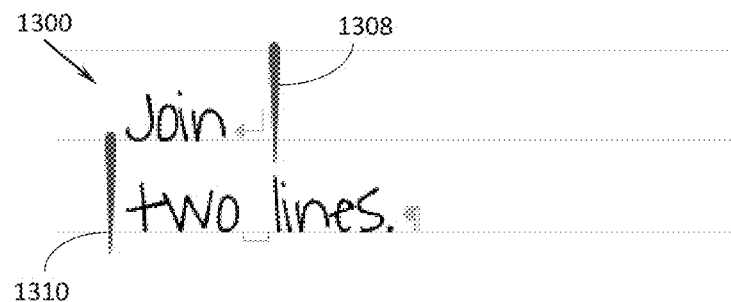
Figure 13E:
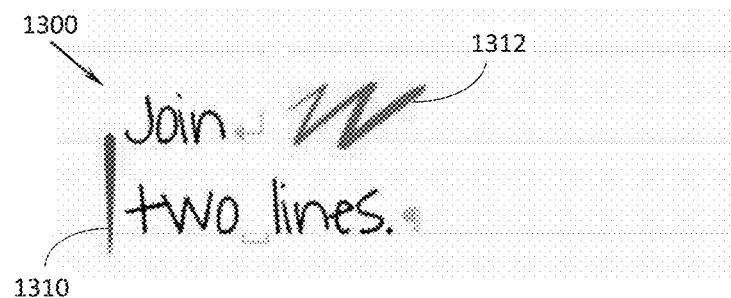

Consideration of these characteristics alone may result in a determination that the editing gesture is intended by the user to join the lines 1300*a* and 1300*b* together or delete the space at the detected location, and as such the recognition result is as that shown in FIG. 13C in which the lines 1300*a* and 1300*b* have been joined into a new line 1314 containing all of the content of the paragraph 1300. A similar recognition result is obtained from the joining examples shown in FIGS. 13D and 13E, in which the bottom-to-top editing gesture 1308 or 1310 or the zig-zag gesture 1312 are used across a line break, instead of an end space between the two lines 1300*a* and 1300*b* of the paragraph 1300.

Figure 14:
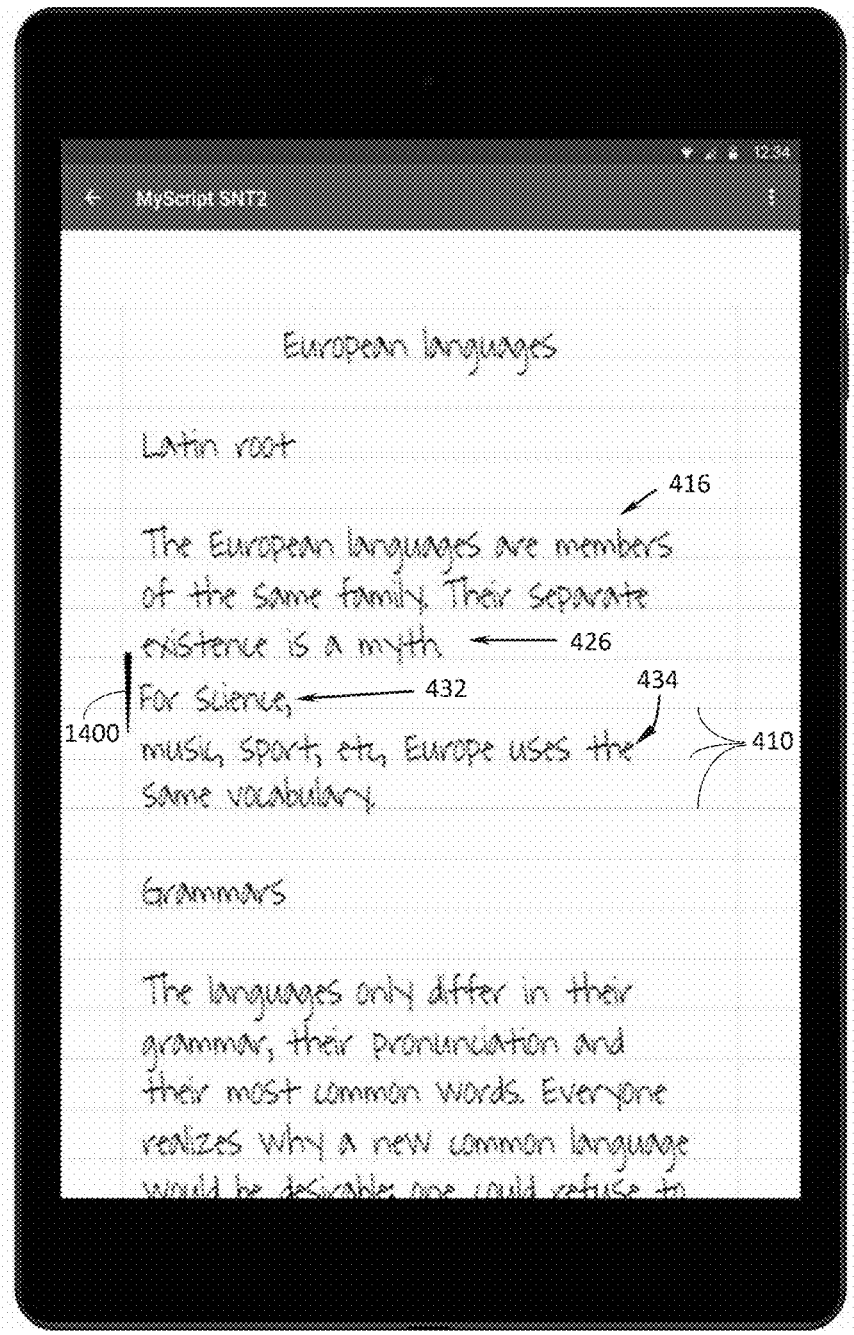
FIG. 14 shows an example of an editing gesture relating to joining two lines in accordance with the present system and method.

FIG. 14 shows an example line join or space delete operation performed on the example recognition result of FIG. 8B, in which a line break (not shown) is provided between the lines 426 and 432 of the broken paragraph 416. In FIG. 14, a join gesture 1400 is detected as input as a bottom-to-top vertical line in a single stroke in the displayed position shown. The editing stroke 1400 is detected by the HWR system 114 as passing between the period 422 and the word 424 respectively on the lines 426 and 432 of the paragraph 416. Like the earlier examples, this relative location of the editing stroke 1400 to the (recognized) paragraph 416, e.g., on a line break between lines of a paragraph, provides one of the above-described characteristics of the editing gesture 1400 whereas the bottom-to-top writing direction provides another characteristic. Consideration of these characteristics alone may result in a determination that the editing gesture 1400 is intended by the user to join the lines 426 and 432 of the paragraph 416 at the detected location with removal of the line break therebetween. Consequently, the word 424 (and the subsequent word 428 and comma 430) is moved onto the (first) line 410 having the period 422 from the (second) line 410 directly below the first line 410, the text of the paragraph 416 on third and fourth lines 410 are moved to the second and third lines, respectively, and the heading 418 and paragraph 420 are similarly moved up one line 410 each, such that the display returns to that of FIG. 4.

The above described examples illustrate the joining of a line of text or deletion of space within a single- or multi-line paragraph using the described bottom-to-top single stroke join or delete space gesture or the zig-zag multi-directional single- or multi-stroke scratch-out gesture. It is considered that these gestures are relatively intuitive to join or to delete space between elements of object blocks for the vertical flow scenario of the left-to-right language input illustrated in the examples. However, it is understood that a single stroke gesture in a different direction, particularly with horizontal flow languages, multiple stroke gestures, or non-directional gestures, such as a tap, can also be used. Similar join or space (or line break) delete gestures can be used to join or remove space (or line breaks) between separate paragraphs.

Figure 15A:
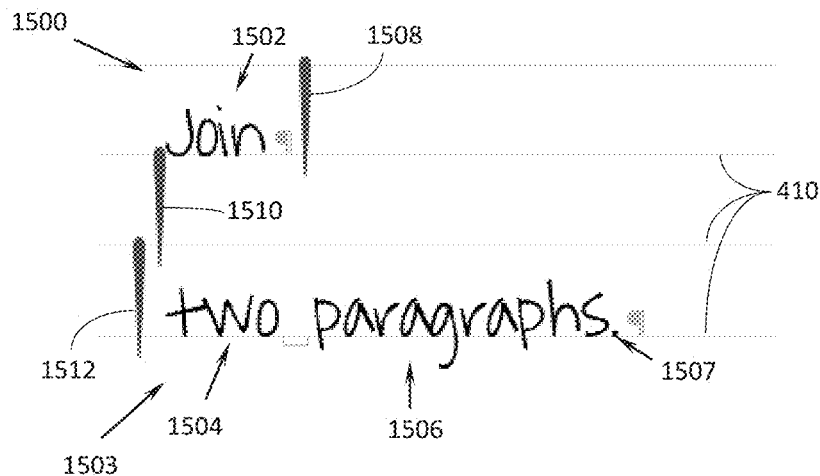
FIGS. 15A-15C show an example of an editing gesture relating to joining two paragraphs in accordance with the present system and method.
Figure 15B:
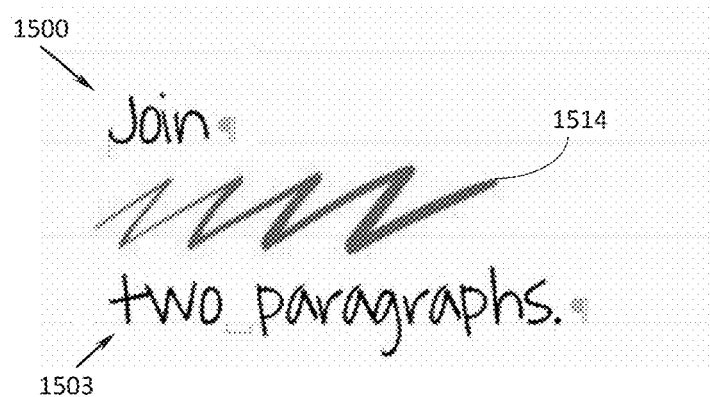

FIG. 15A shows a (first) single line paragraph 1500 of one word, "Join" 1502 on the (first) line 410, the empty (second) line 410 directly under the first line 410, and a (second) single line paragraph 1503 of several words, "two" 1504 and "paragraphs" 1506, and a period 1507 after the word 1506, on the (third) line 410 directly under the second line 410. Any of an editing gesture 1508 at the end of the first paragraph 1500 (e.g., to the right of the word 1502), an editing gesture 1510 at the empty second line 410 between the paragraphs 1500 and 1503, and an editing gesture 1512 at the beginning of the second paragraph 1503 (e.g., to the left of the word 1504) are detected, with each input as a bottom-to-top vertical line in a single stroke. Similarly, in FIG. 15B an editing gesture 1514 detected as input as a vertical zig-zag line in a single, multi-directional stroke is detected at empty second line 410 between the paragraphs 1500 and 1503. In either case the editing stroke 1508, 1510, 1512 or 1514 is detected by the HWR system 114 as being between the first and second paragraphs 1500 and 1503. This relative location of the editing strokes to the (recognized) text 1500 and 1503, e.g., in an empty line between paragraphs, provides one of the above-described characteristics of the editing gestures whereas the bottom-to-top writing direction or zig-zagging provides another characteristic.

Figure 15C:
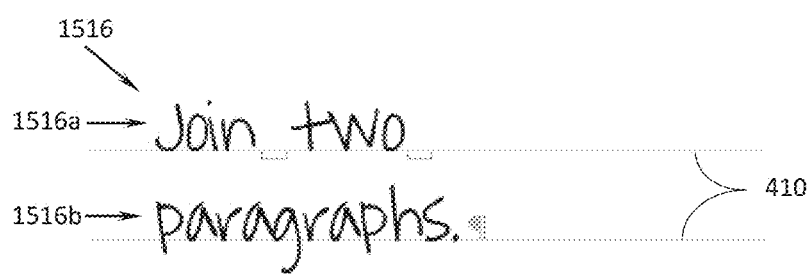

Consideration of these characteristics alone may result in a determination that the editing gesture is intended by the user to join the paragraphs 1500 and 1503 together at the detected location or delete the empty line therebetween, and as such the recognition result is as that shown in FIG. 15C in which the paragraphs 1500 and 1503 have been joined into a new (third) paragraph 1516 containing the content of the first paragraph 1500 and the word 1504 of the second paragraph 1503 in a first line 1516a (on the first line 410) and the word 1506 and period 1507 of the second paragraph 1503 in a second line 1516b (on the second line 410), with a space therebetween (e.g., the end space of the line 1516a). As such, the content of the joined paragraphs is reflowed so as to produce a single paragraph, since this is considered to be the intent of the user in joining the paragraphs. Alternatively however, a line break could be provided such that reflow does not occur. In that case, a similar recognition result is obtained as in the joining examples shown in FIGS. 13D and 13E, in which the bottom-to-top editing gesture 1508, 1510 or 1512 or the zig-zag gesture 1514 are used across a line break, instead of an end space between the paragraphs 1500 and 1503.

Figure 16A:
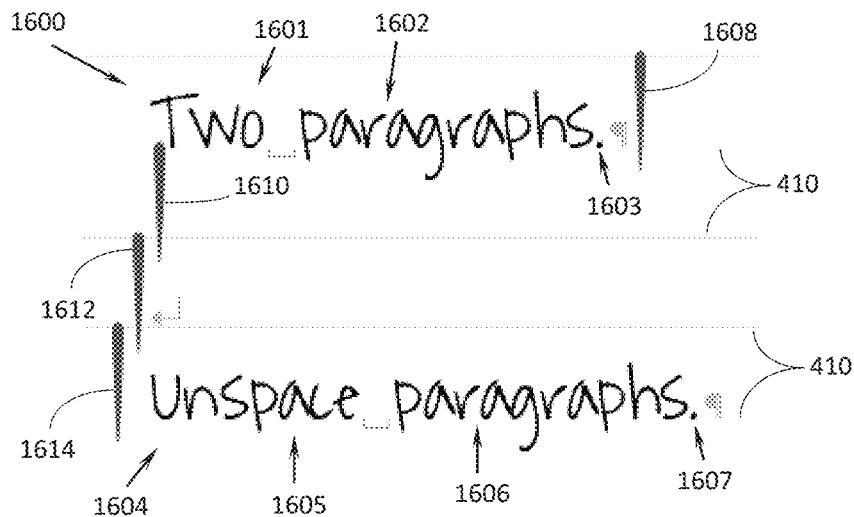
FIGS. 16A and 16B show an example of an editing gesture relating to unspacing two paragraphs in accordance with the present system and method.

Similar join or space (or line break) delete gestures can be used to remove additional space (line breaks) between separate paragraphs. For example, FIG. 16A shows a (first) single line paragraph 1600 of several words, "Two" 1601 and "paragraphs" 1602, and a period 1603 after the word 1602, on the (first) line 410, two empty (second and third) lines 410 directly under the first line 410, with a line break on the third line 410 (similar to the example of FIG. 10D), and a (second) single line paragraph 1604 of several words, "Unspace" 1605 and "paragraphs" 1606, and a period 1607 after the word 1606, on the (fourth) line 410 directly under the third line 410. Any of an editing gesture 1608 at the end of the first paragraph 1600 (e.g., to the right of the period 1603), an editing gesture 1610 at the empty second line 410 or an editing gesture 1612 at the empty third line 410 between the paragraphs 1600 and 1604, and an editing gesture 1614 at the beginning of the second paragraph 1604 (e.g., to the left of the word 1605) are detected, with each input as a bottom-to-top vertical line in a single stroke. The editing stroke 1608, 1610, 1612 or 1614 is detected by the HWR system 114 as being between the first and second paragraphs 1600 and 1604 separated by two empty lines 410. This relative location of the editing strokes to the (recognized) text 1600 and 1604, e.g., in an empty line between paragraphs, provides one of the above-described characteristics of the editing gestures whereas the bottom-to-top writing direction provides another characteristic.

Figure 16B:
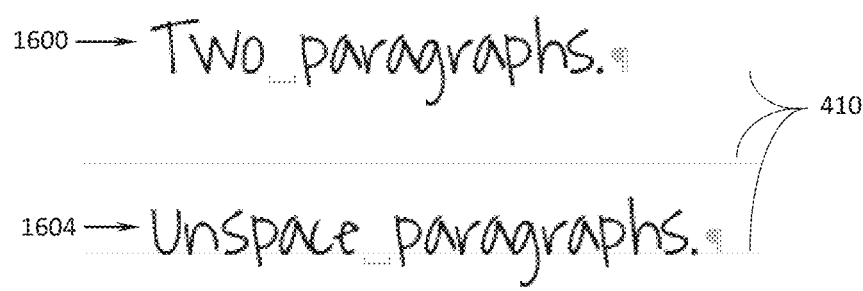

Consideration of these characteristics alone may result in a determination that the editing gesture is intended by the user to remove one of the empty lines between the paragraphs 1600 and 1604 at the detected location, and as such the recognition result is as that shown in FIG. 16B in which the second paragraph 1604 is moved onto the third line 410, with the consequential removal of the line break and characteristics of the two paragraphs otherwise retained. Although, not specifically shown, it is understood that a similar recognition result can be obtained with detection of a scratch-out gesture between the paragraphs 1600 and 1604.

Figure 17A:
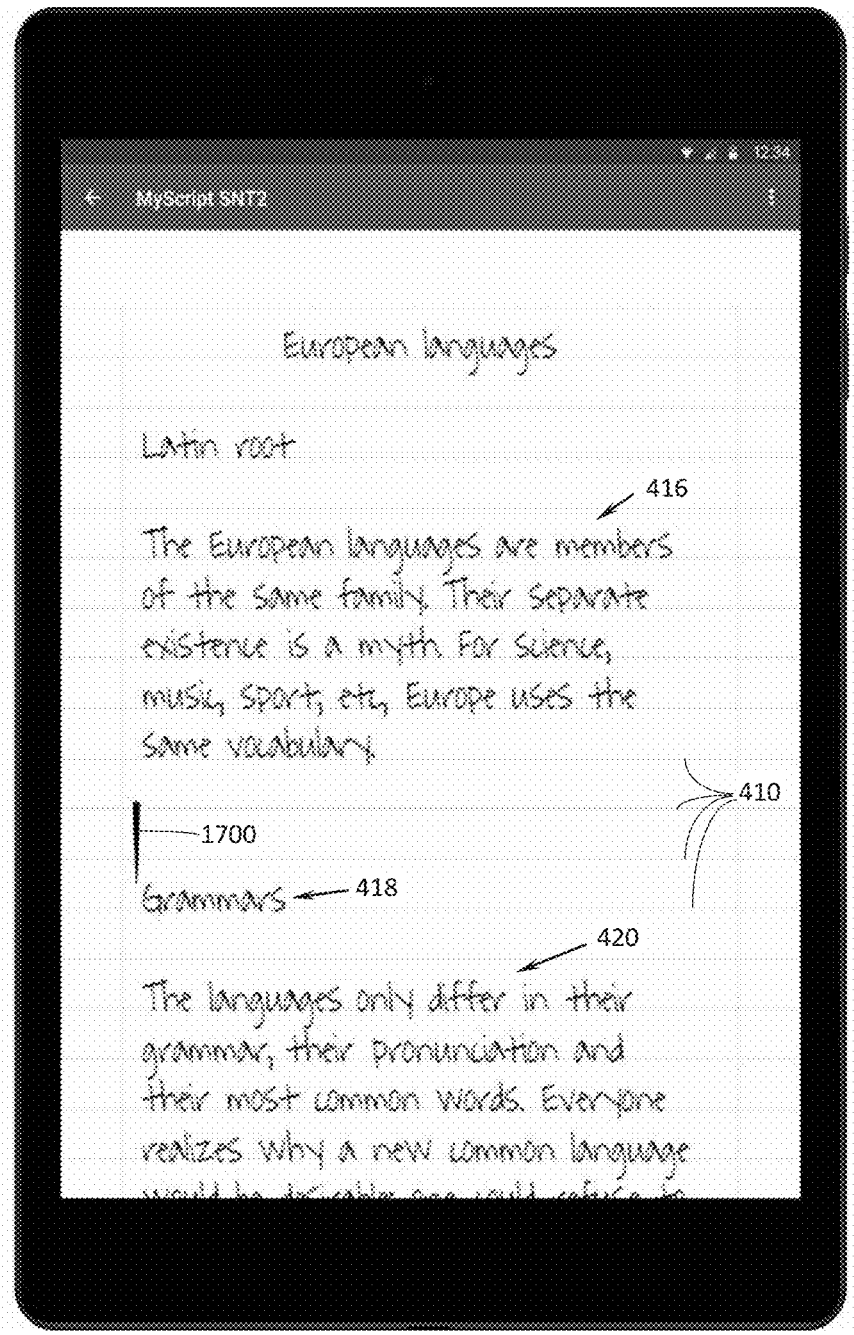
FIGS. 17A-17D show a schematic view of an example visual rendering of a scroll page on a portion of an input surface of the computing device that includes an example of an editing gesture relating unspacing paragraphs in accordance with the present system and method.

FIG. 17A shows an example operation to delete an empty line between paragraphs performed on the example recognition result of FIG. 11B. In FIG. 17A, a space delete gesture 1700 is detected as input as a bottom-to-top vertical line in a single stroke in the displayed position shown. The editing stroke 1700 is detected by the HWR system 114 as being at one of the two empty lines 410 (the third line 410) between the paragraphs 416 and 418. Like the earlier examples, this relative location of the editing stroke 1700 to the (recognized) paragraphs 416 and 418, e.g., on an empty line between separate paragraphs, provides one of the above-described characteristics of the editing gesture 1700 whereas the bottom-to-top writing direction provides another characteristic. Consideration of these characteristics alone may result in a determination that the editing gesture 1700 is intended by the user to delete one of the empty lines 410 between the paragraphs 416 and 418 at the detected location with removal of the line break (not shown) therebetween. Consequently, the heading 418 is moved onto the previously empty (third) line 410 and the paragraph 420 is consequentially similarly moved up one line 410, such that the last line 436 of the paragraph 420 reappears and the display returns to that of FIG. 4.

Figure 17B:
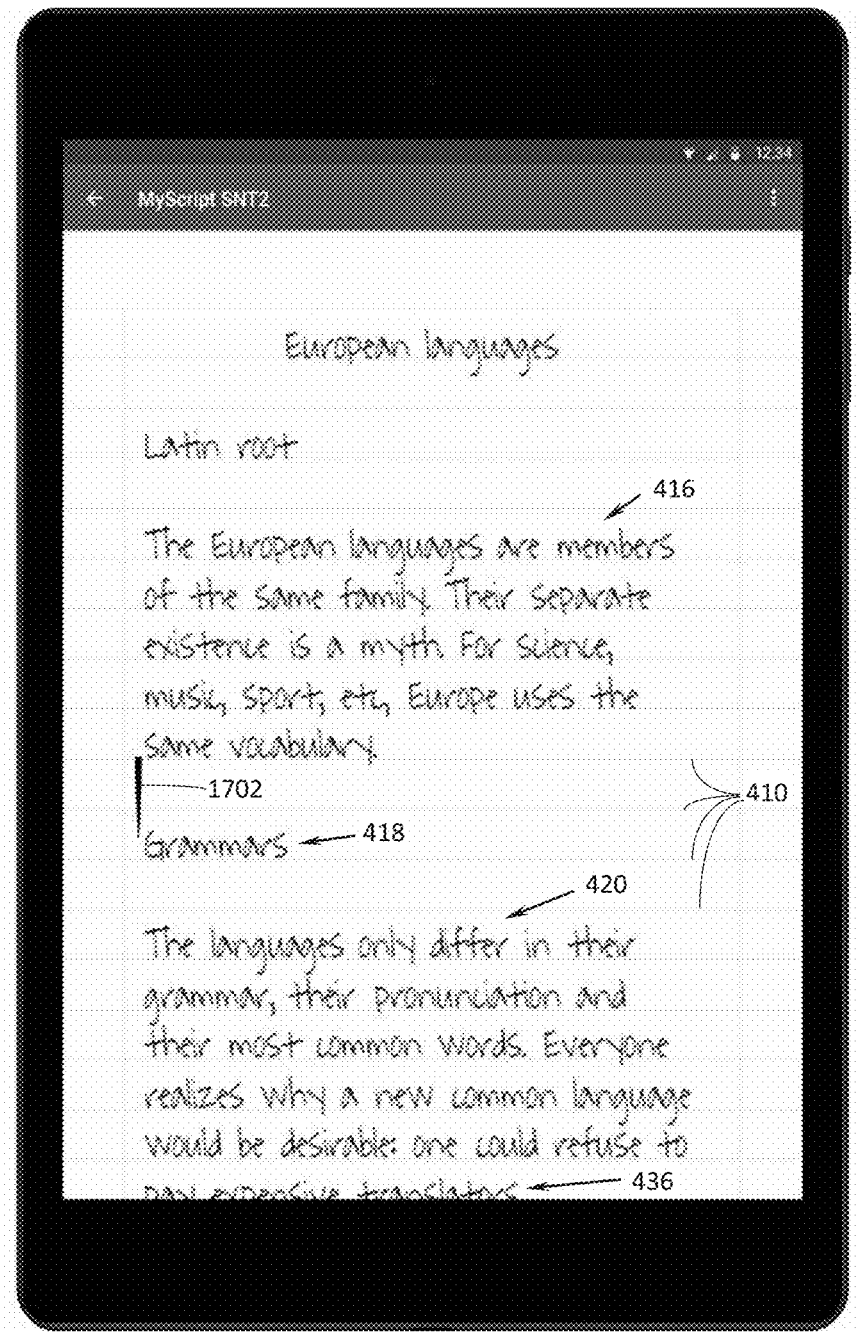

FIG. 17B shows an example operation to join, or delete the remaining empty line between, the paragraphs 416 and 418. In FIG. 17B, a join or space delete gesture 1702 is detected as input as a bottom-to-top vertical line in a single stroke in the displayed position shown. The editing stroke 1702 is detected by the HWR system 114 as being at the empty line 410 (the second line 410) between the paragraphs 416 and 418. Like the earlier examples, this relative location of the editing stroke 1702 to the (recognized) paragraphs 416 and 418, e.g., on an empty line between separate paragraphs, provides one of the above-described characteristics of the editing gesture 1702 whereas the bottom-to-top writing direction provides another characteristic. Consideration of these characteristics alone may result in a determination that the editing gesture 1702 is intended by the user to join, or delete the empty line 410 between, the paragraphs 416 and 418 at the detected location.

Figure 17C:
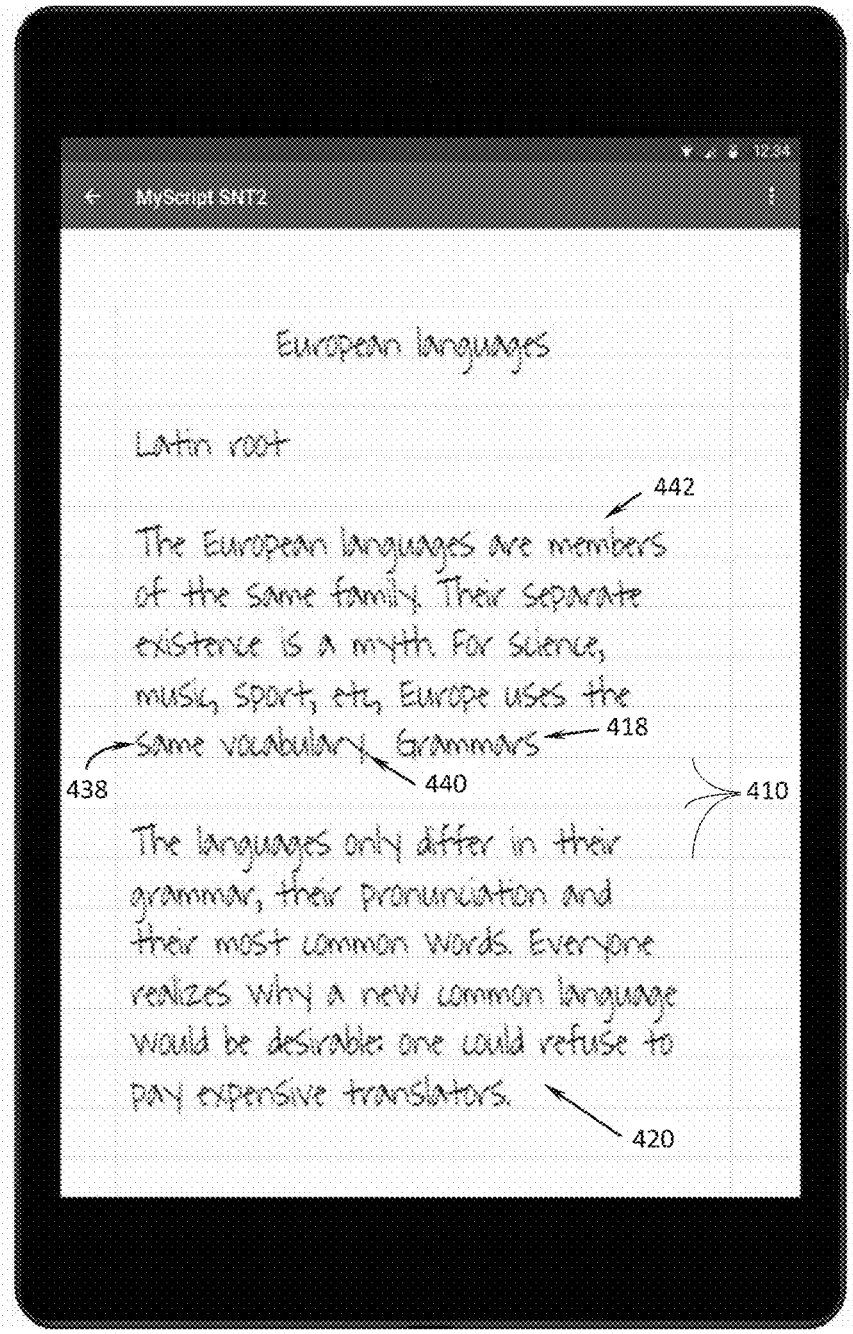
Figure 17D:
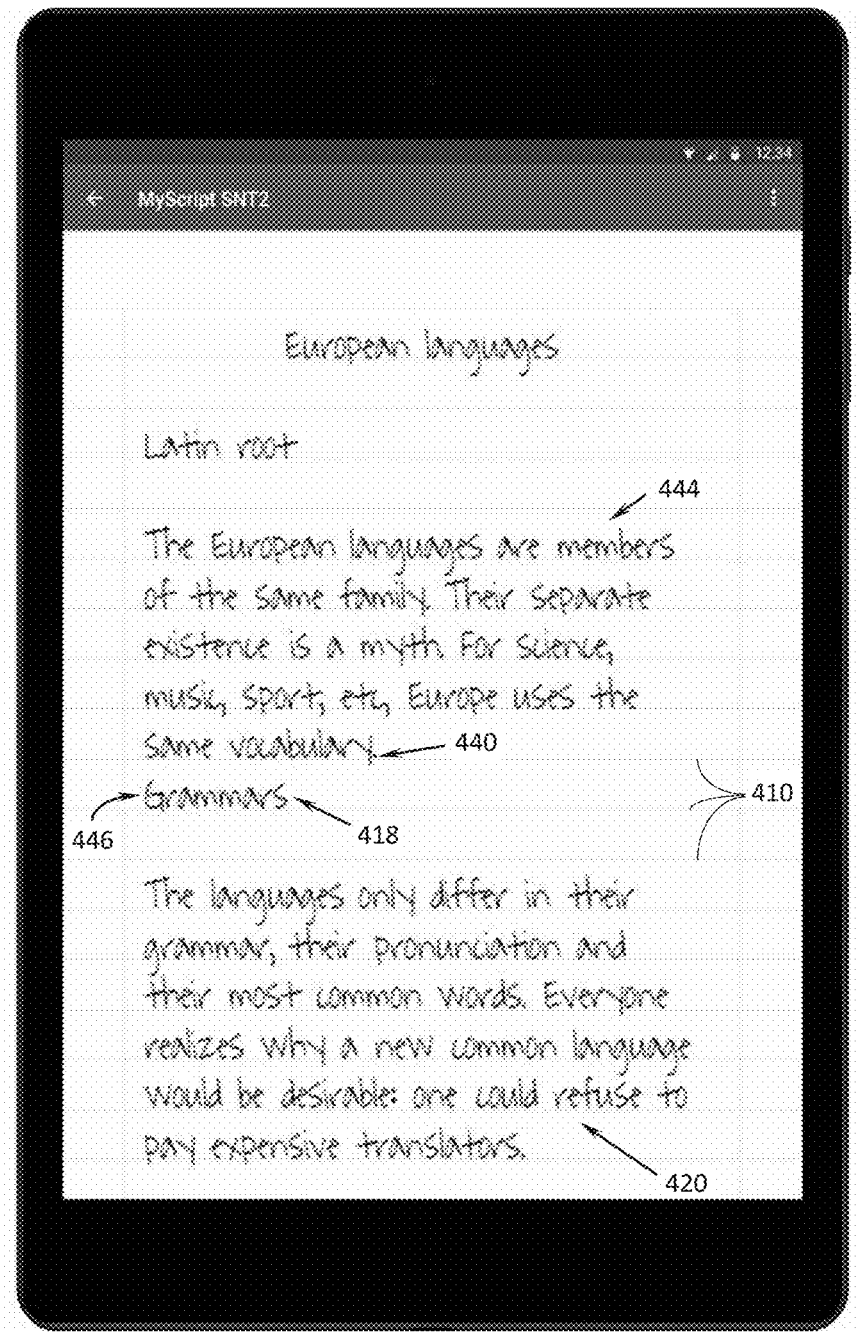

This recognition result is shown in FIG. 17C in which the single word of the paragraph 418 is reflowed onto the last line 438 of the paragraph 416, e.g., after a period 440, to form a new paragraph 442. Consequentially, the paragraph 420 is moved up two lines 410 (to the third line 410), leaving the empty (second) line 410 between the paragraphs 420 and 442, similar to the recognition result example of FIG. 15C. Depending on context of this recognition and/or settings of the application 112, this recognition result may cause the provision of a line break at the detected join/delete position rather than reflow as in FIG. 17C. This alternative recognition result is shown in FIG. 17D in which the paragraph 418 is moved onto the previously empty (second) line 410 directly beneath the last line 438 of the paragraph 416 (on the first line 410) to form a new paragraph 444 having the single word of the paragraph 418 on a new last line 446 with a line break (not shown) between the period 440 on the line 438 and the line 446. Consequentially, the paragraph 420 is moved up one line 410 (to the fourth line 410).

The above described examples illustrate the joining of single- or multi-line paragraphs into a single paragraph or deletion of space between separate paragraphs using the described bottom-to-top single stroke join or delete space gesture or the zig-zag multi-directional single- or multi-stroke scratch-out gesture. It is considered that these gestures are relatively intuitive to join object blocks or to delete space between object blocks for the vertical flow scenario of the left-to-right language input illustrated in the examples. However, it is understood that a single stroke gesture in a different direction, particularly with horizontal flow languages, multiple stroke gestures, or non-directional gestures, such as a tap, can also be used.

Figure 18A:
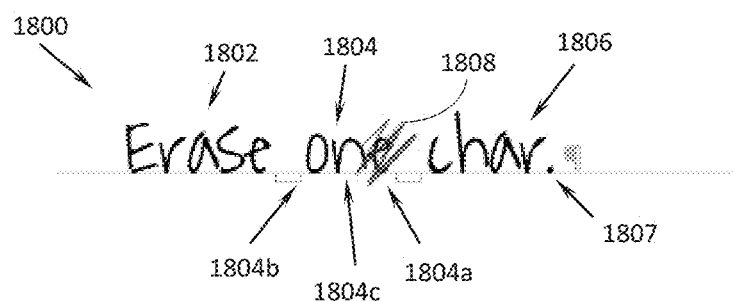
FIGS. 18A-18D show examples of editing gestures relating to erasing one character in accordance with the present system and method.

The afore-described editing gestures were for performing breaking, splitting or spacing operations and joining or space deletion operations in relation to handwritten content. Other editing operations are also possible. FIG. 18A shows a single line paragraph 1800 of several words, "Erase" 1802, "one" 1804 and "char" 1806, as defined by the spaces therebetween, and a period 1807 after the word 1806. An editing gesture 1808 is detected as input as a slanted zig-zag line in a single, multi-directional stroke by a user swiping their finger or stylus tip in a side-to-side slant several times in the displayed position shown, for example. The editing stroke 1808 is detected by the HWR system 114 as being (substantially) on or over a (entire) character, "e" 1804a, of the word 1804. This relative location of the editing stroke 1808 to the (recognized) text 1800, e.g., on a single character, provides one of the above-described characteristics of the editing gesture 1808 whereas the zig-zagging provides another characteristic.

Figure 18B:
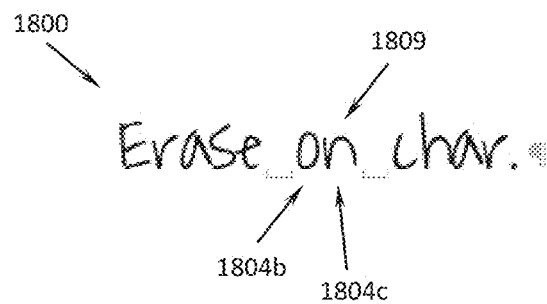

Consideration of these characteristics alone may result in a determination that the editing gesture 1808 is intended by the user to delete the character 1804a of the word 1804, and as such the recognition result is as that shown in FIG. 18B in which the character 1804a is deleted leaving characters, "o" 1804b and "n" 1804c of the word 1804, forming a new word, "on" 1809. As can be seen, the features of the paragraph 1800 are otherwise retained. This (slanted) zig-zag gesture 1808 is considered as being relatively robust with respect to recognition by the HWR system 114 as a scratch-out deletion gesture, for at least the reasons discussed earlier (e.g., with consideration of the slant, crossing of base-line, higher probability of the word "on" than "onw", etc.). However, a certain amount of precision may be required for use of such a gesture so that more than one character is not erroneously deleted. Accordingly, alternative or additional gestures may be provided for such character deletion operations.

Figure 18C:
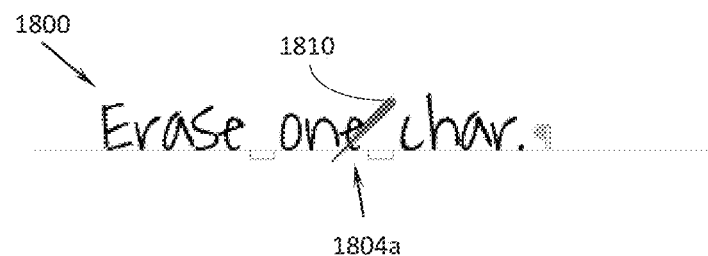
Figure 18D:
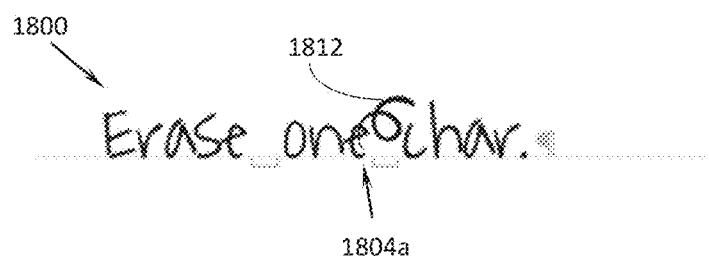

FIG. 18C shows the single line paragraph 1800 with an editing gesture 1810 detected as input as a bottom-to-top slanted line in a single stroke by a user swiping their finger or stylus tip from the bottom to the top from left to right in a slanted direction, for example. That is, the stroke start position is below, and to the right of, the stroke end position, in time order, as depicted by the gradual thickening of the stroke from the bottom to the top and from left to right. FIG. 18D shows the single line paragraph 1800 with an editing gesture 1812 detected as input as a bottom-to-top curly line in a single stroke by a user swiping their finger or stylus tip from the bottom to the top in a spiral to the right, for example. That is, the stroke start position is below, and to the left of, the stroke end position, in time order, as depicted by the gradual thickening of the stroke from the bottom to the top and from left to right. The editing stroke 1810 and the editing stroke 1812 is detected by the HWR system 114 as passing (substantially) over the (entire) character 1804a of the word 1804. This relative location of the editing strokes 1810 and 1812 to the (recognized) text 1800, e.g., on a single character, provides one of the above-described characteristics of the editing gestures 1810 and 1812 whereas the left to right and bottom-to-top writing direction of the editing gesture 1810 and the curly writing direction of the editing gesture 1812 each provide another characteristic.

Consideration of these characteristics alone may result in a determination that the editing gestures 1810 and 1812 are each intended by the user to delete the character 1804a of the word 1804, and as such the recognition result is as that shown in FIG. 18B. The (slanted) bottom-to-top gesture 1810 is considered as being relatively robust with respect to recognition by the HWR system 114 as a deletion gesture, for at least the reasons discussed earlier (e.g., with consideration of the slant, crossing of base-line, good probability of the word "on", etc.). Further, the (curly) bottom-to-top gesture 1810 is considered as being relatively robust with respect to recognition by the HWR system 114 as a "pig-tail" deletion gesture, for at least the reasons discussed earlier (e.g., with consideration of the slant, curled shape, good probability of the word "on", etc.). However, like the scratch-out gesture, a certain amount of precision may be required for use of such gestures so that more than one character is not erroneously deleted.

The application 112 may be configured to display the input editing stroke(s) as digital ink, either with a shape as, for example, shown in FIG. 18A, 18B or 18C, or some other appropriate rendering until the recognized editing operation is performed or may just perform the editing operation without such display. The display of the detected editing gesture may be used to provide recognition feedback to users with respect to recognition of the gesture itself and the relative location thereof. Otherwise, the eventual editing operation, e.g., the modified display shown in FIG. 18B, may otherwise be used for such feedback.

Figure 19A:
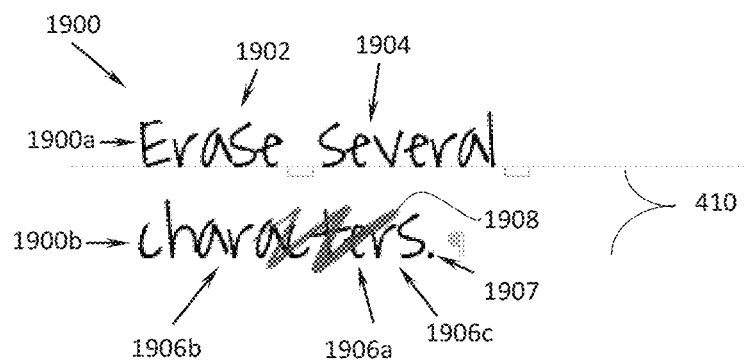
FIGS. 19A-19C show examples of editing gestures relating to erasing several characters in accordance with the present system and method.

Similar deletion gestures can be used to delete multiple characters of a word. For example, FIG. 19A shows a multi-line paragraph 1900 of several words, "Erase" 1902 and "several" 1904 in a first line 1900a of the paragraph 1900 (on the first line 410) and "characters" 1906, and a period 1907 after the word 1906, in a second line 1900b of the paragraph 1900 (on the second line 410 directly beneath the first line 410), having a space therebetween. An editing gesture 1908 is detected (substantially) on or over a (entire) series of characters 1906a of the word 1906 input as a vertical zig-zag line in a single, multi-directional stroke. Similarly, in FIG. 19B an editing gesture 1910 detected as input as a left-to-right vertical line in a single stroke is detected (substantially) over the (entire) series of characters 1906a of the word 1906. In either case the editing stroke 1908 or 1910 is detected by the HWR system 114 as passing over the series of characters 1906a of the word 1906. This relative location of the editing strokes to the (recognized) text 1900, e.g., on a series of characters, provides one of the above-described characteristics of the editing gestures whereas the zig-zagging or left-to-right (horizontal) writing direction provides another characteristic.

Figure 19B:
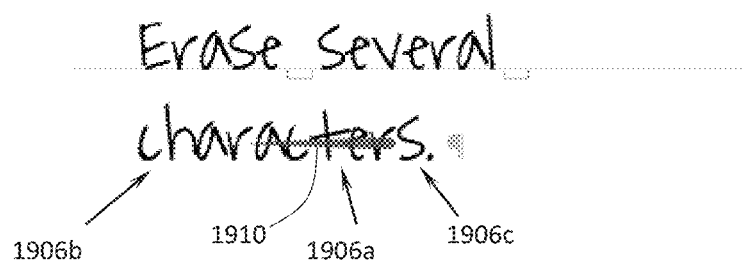
Figure 19C:
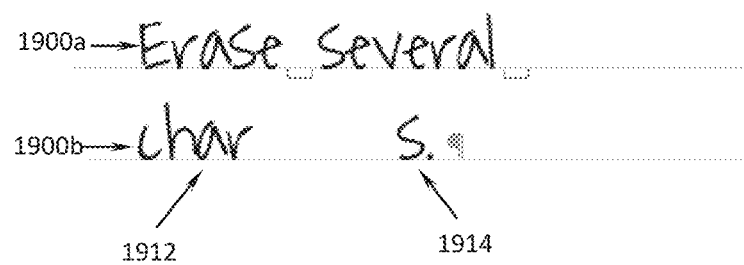

Consideration of these characteristics alone may result in a determination that the editing gesture is intended by the user to delete the series of characters 1906a of the word 1906, and as such the recognition result is as that shown in FIG. 19C in which the multiple characters 1906a are deleted leaving the series of characters, "char" 1906b, and the character, "s" 1906c of the word 1906, respectively forming two new words 1912 and 1914. As can be seen, the features of the paragraph 1900 are otherwise retained and the removed characters are replaced with space(s) rather than reflowing the character 1906*c* to join the characters 1906*b* in the word 1906. This is done in this example because it is considered that the user intended to delete the multiple characters in order to add new characters. It is understood however that different considerations can be made or set, such as joining the remaining characters of the partially deleted word.

The zig-zag gesture 1908 is considered as being relatively robust with respect to recognition by the HWR system 114 as a scratch-out deletion gesture, for at least the reasons discussed earlier (e.g., with consideration of the slant, crossing of base-line, passage over several characters requiring less precision). Further, the horizontal gesture 1910 is considered as being relatively robust with respect to recognition by the HWR system 114 as a strike-through deletion gesture, as it passes over several characters requiring less precision, is a well known editing gesture for deletion, and has relatively low probability of being recognized as a character by the HWR system 114 in relation to the recognized text 1900, since it is probably relatively too long to be a hyphen or dash character, for example.

The application 112 may be configured to display the input editing stroke(s) as digital ink, either with a shape as, for example, shown in FIG. 19A or 19B, or some other appropriate rendering until the recognized editing operation is performed or may just perform the editing operation without such display. The display of the detected editing gesture may be used to provide recognition feedback to users with respect to recognition of the gesture itself and the relative location thereof. Otherwise, the eventual editing operation, e.g., the modified display shown in FIG. 19C, may be used for such feedback.

Figure 20A:
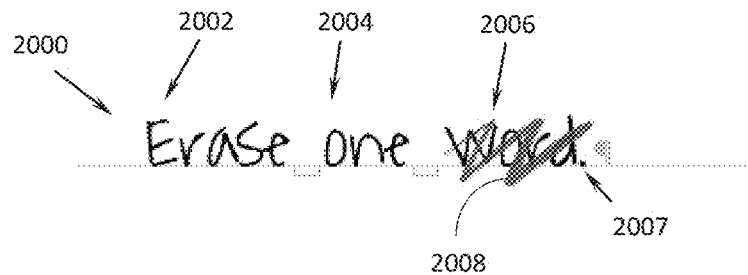
FIGS. 20A-20C show examples of editing gestures relating to erasing one word in accordance with the present system and method.
Figure 20B:

Similar deletion gestures can be used to delete one or more words from a line (or paragraph). For example, FIG. 20A shows a single-line paragraph 2000 of several words, "Erase" 2002, "one" 2004 and "word" 2006, defined by spaces therebetween and followed by a period 2007. An editing gesture 2008 is detected (substantially) on or over the (entire) word 2006 and the period 2007 input as a vertical zig-zag line in a single, multi-directional stroke. Similarly, in FIG. 20B an editing gesture 2010 detected as input as a left-to-right horizontal line in a single stroke is detected (substantially) over the (entire) word 2006 and the period 2007. In either case the editing stroke 2008 or 2010 is detected by the HWR system 114 as passing over the word 2006 and the period 2007. This relative location of the editing strokes to the (recognized) text 2000, e.g., on a word, provides one of the above-described characteristics of the editing gestures whereas the zig-zagging or left-to-right (horizontal) writing direction provides another characteristic.

Figure 20C:
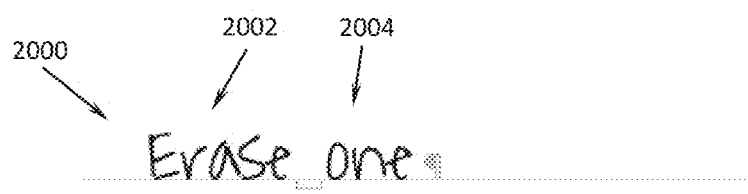

Consideration of these characteristics alone may result in a determination that the editing gesture is intended by the user to delete the word 2006 and the period 2007, and as such the recognition result is as that shown in FIG. 20C in which the word 2006 and the period 2007 are deleted leaving the words 2002 and 2004.

Figure 21A:
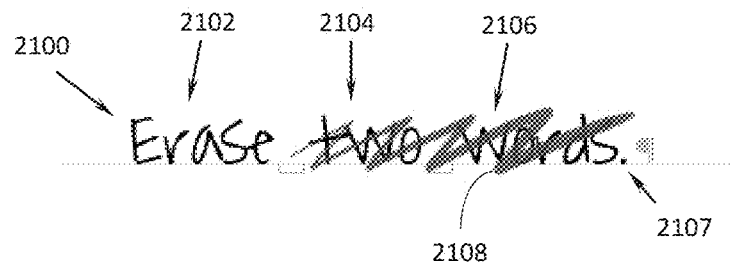
FIGS. 21A-21C show examples of editing gestures relating to erasing two words in accordance with the present system and method.
Figure 21B:
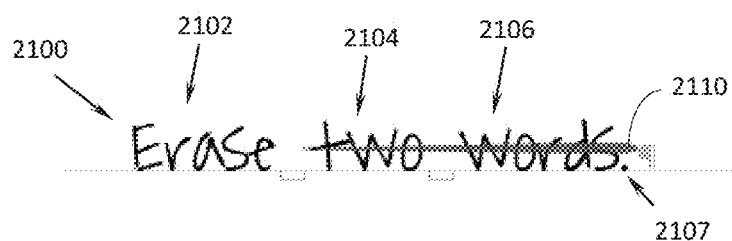

Further, FIG. 21A shows a single-line paragraph 2100 of several words, "Erase" 2102, "two" 2104 and "words" 2106, defined by spaces therebetween and followed by a period 2107. An editing gesture 2108 is detected (substantially) on or over the (entire) words 2104 and 2106 and the period 2107 input as a vertical zig-zag line in a single, multi-directional stroke. Similarly, in FIG. 21B an editing gesture 2110 detected as input as a left-to-right horizontal line in a single stroke is detected (substantially) over the (entire) words 2104 and 2106 and the period 2107. In either case the editing stroke 2108 or 2110 is detected by the HWR system 114 as passing over the words 2104 and 2106 and the period 2107. This relative location of the editing strokes to the (recognized) text 2100, e.g., on a word, provides one of the above-described characteristics of the editing gestures whereas the zig-zagging or left-to-right (horizontal) writing direction provides another characteristic.

Figure 21C:
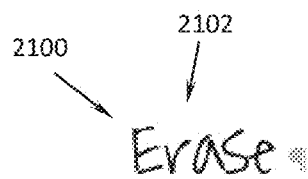

Consideration of these characteristics alone may result in a determination that the editing gesture is intended by the user to delete the words 2104 and 2106 and the period 2107, and as such the recognition result is as that shown in FIG. 21C in which the words 2104 and 2106 and the period 2107 are deleted leaving the word 2102.

Similar deletion gestures can be used to delete words from multi-line paragraphs. For example, FIG. 22A shows a multi-line paragraph 2200 of several words, "Erase" 2202 and "several" 2203 in a first line 2200*a* of the paragraph 2200 (on the first line 410) and "words" 2204, "at" 2205 and "once" 2206 defined by spaces therebetween and followed by a period 2207, in a second line 2200*b* of the paragraph 2200 (on the second line 410 directly below the first line 410), having a space therebetween. An editing gesture 2208 is detected (substantially) on or over the (entire) words 2203, 2205 and 2206 and the period 2207 input as a vertical zig-zag line in a single, multi-directional stroke. The editing stroke 2208 is detected by the HWR system 114 as passing over the words 2203, 2205 and 2206 and the period 2207. This relative location of the editing stroke to the (recognized) text 2200, e.g., on several words on separate lines, provides one of the above-described characteristics of the editing gestures whereas the zig-zagging provides another characteristic.

Consideration of these characteristics alone may result in a determination that the editing gesture is intended by the user to delete the words 2203, 2205 and 2206 and the period 2207, and as such the recognition result is as that shown in FIG. 22B in which the words 2203, 2205 and 2206 and the period 2207 are deleted leaving the words 2202 and 2204, on their respective lines 2200*a* and 2200*b* with a space therebetween. This is done in this example because it is considered that the user intended to delete the multiple words in order to add new words to the multi-line paragraph. It is understood however that different considerations can be made or set. For example, FIG. 22C shows an alternative recognition result in which the word 2204 is reflowed onto the first line 410 after the word 2202 with a space therebetween forming a new single-line paragraph 2210. As before, the scratch-out and strike-through gestures are considered as being relatively robust for recognition.

Figure 23A:
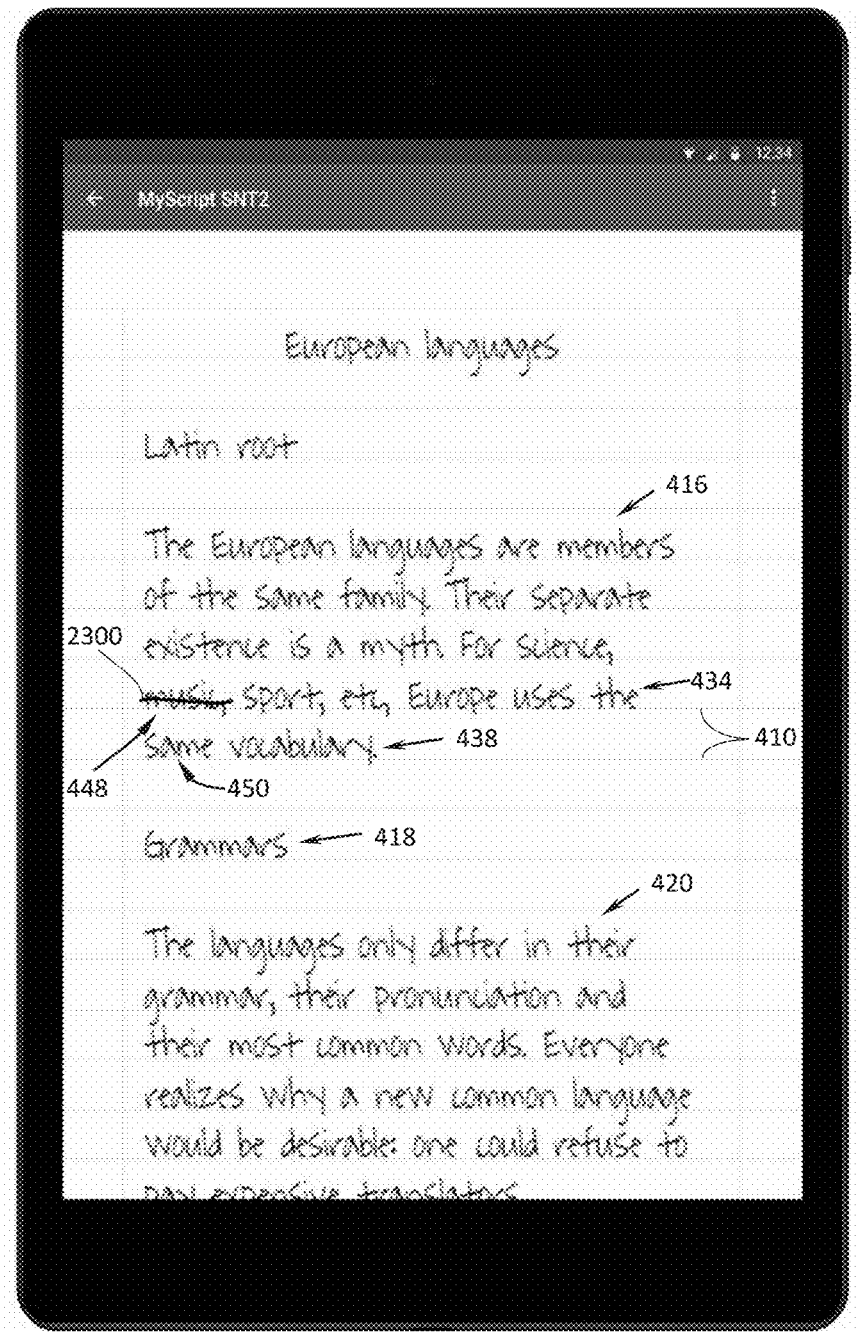
FIGS. 23A-23B show a schematic view of an example visual rendering of a scroll page on a portion of an input surface of the computing device that includes an example of an editing gesture relating erasing words in accordance with the present system and method.

FIG. 23 shows an example operation to delete a word performed on the input example of FIG. 4. In FIG. 23A, a strike-through deletion gesture 2300 is detected as input as a left-to-right horizontal line in a single stroke in the displayed position shown. The editing stroke 2300 is detected by the HWR system 114 as being (substantially) on or over a (entire) word 448 in the line 434 of the paragraph 416. Like the earlier examples, this relative location of the editing stroke 2300 to the (recognized) paragraph 416, e.g., on a word of the paragraph, provides one of the above-described characteristics of the editing gesture 2300 whereas the left-to-right (horizontal) writing direction provides another characteristic. Consideration of these characteristics alone may result in a determination that the editing gesture 2300 is intended by the user to delete the word 448 of the paragraph 416.

Figure 23B:
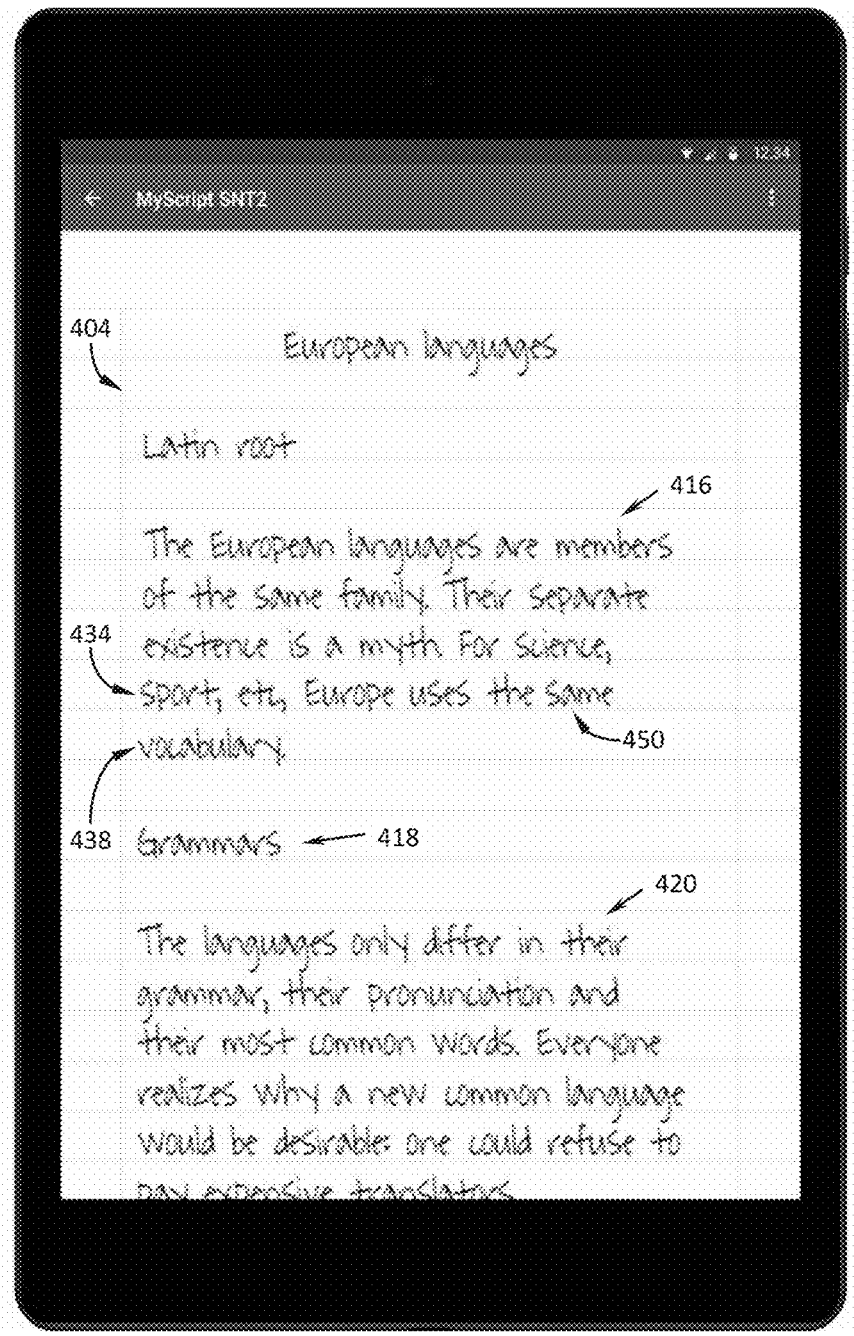

This recognition result is shown in FIG. 23B in which the word 446 is omitted with consequential reflow of the remaining words on the line 434 (to the left margin 404), reflow up of a word 450 from the line 438 to the line 434 after the other (reflowed) words, and reflow of the remaining word and period on the line 438 (to the left margin 404). This reflow is performed as a space (not shown) was present between the lines 434 and 438. As can be seen, as content remains on the line 438 of the edited paragraph 416, the downstream content (i.e., paragraphs 418 and 420) is not moved.

Figure 24A:
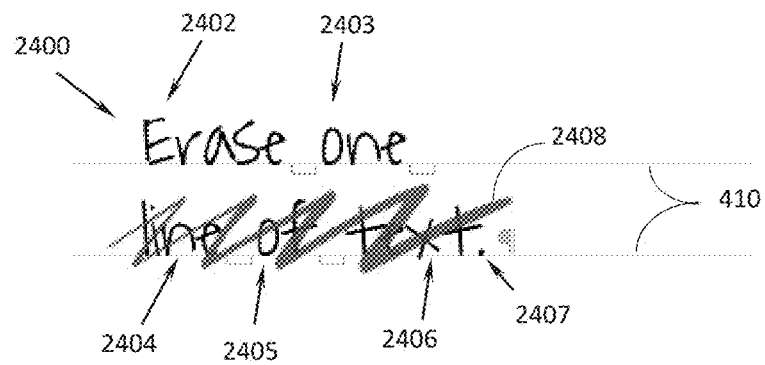
FIGS. 24A-24C show examples of editing gestures relating to erasing one line of text in accordance with the present system and method.
Figure 24B:
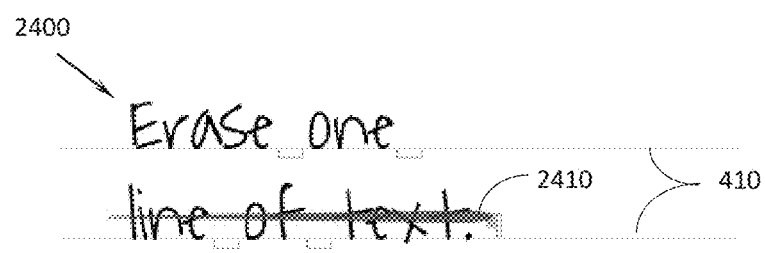

Similar deletion gestures can be used to delete one or more lines of text from multi-line paragraphs. For example, FIG. 24A shows a multi-line paragraph 2400 of several words, "Erase" 2402 and "one" 2403 in a first line 2400a of the paragraph 2400 (on the first line 410) and "line" 2404, "of" 2405 and "text" 2406 defined by spaces therebetween and followed by a period 2407, in a second line 2400b of the paragraph 2400 (on the second line 410 directly below the first line 410), having a space therebetween. An editing gesture 2408 is detected (substantially) on or over the (entire) line 2400b of the paragraph 2400, e.g., the words 2404, 2405 and 2406 and the period 2407, input as a vertical zig-zag line in a single, multi-directional stroke. Similarly, in FIG. 24B an editing gesture 2410 detected as input as a left-to-right horizontal line in a single stroke is detected (substantially) over the (entire) line 2400b. In either case the editing stroke 2408 or 2410 is detected by the HWR system 114 as passing over the line 2400b. This relative location of the editing stroke to the (recognized) text 2400, e.g., on all words on a line, provides one of the above-described characteristics of the editing gestures whereas the zig-zagging or left-to-right (horizontal) writing direction provides another characteristic.

Figure 24C:
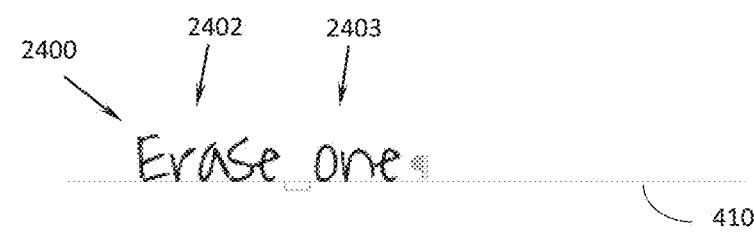

Consideration of these characteristics alone may result in a determination that the editing gesture is intended by the user to delete the line 2400b (containing the words 2404, 2405 and 2406 and the period 2407), and as such the recognition result is as that shown in FIG. 24C in which the second line is omitted leaving the first line 2400a with the words 2402 and 2403.

Figure 25A:
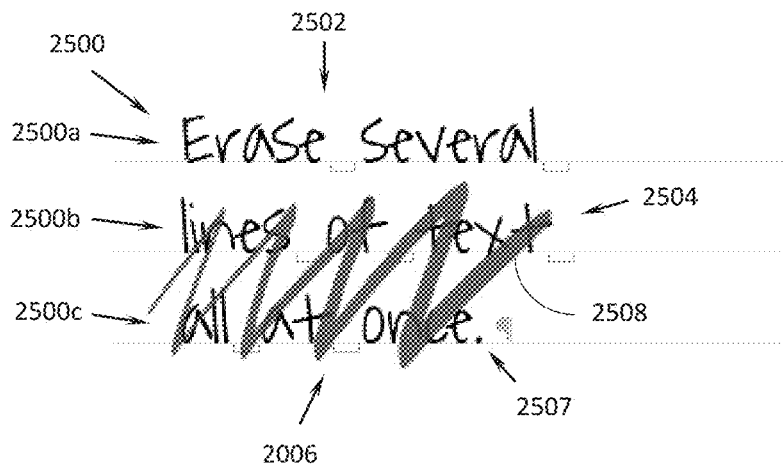
FIGS. 25A-25C show examples of editing gestures relating to erasing several lines of text in accordance with the present system and method.
Figure 25B:
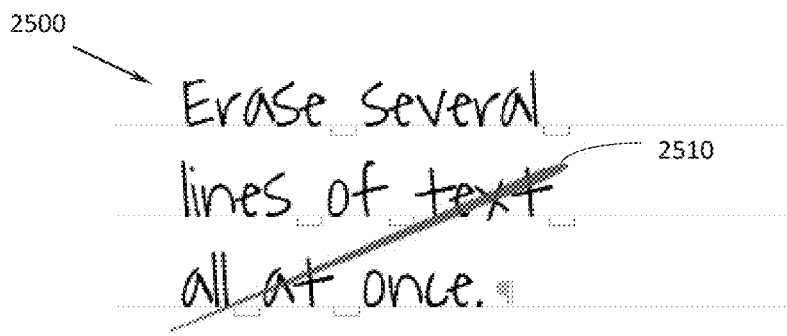

Further, FIG. 25A shows a multi-line paragraph 2500 of several lines, a (first) line 2500a, a (second) line 2500b and a (third) line 2500c each respectively containing a series of words 2502, 2504 and 2506 defined by spaces therebetween and followed by a period 2507 in the third line 2500c, each having a space therebetween. An editing gesture 2508 is detected (substantially) on or over the (entire) first and second lines 2500b and 2500c of the paragraph 2500, e.g., the series of words 2504 and 2506 and the period 2507, input as a vertical zig-zag line in a single, multi-directional stroke. Similarly, in FIG. 25B an editing gesture 2510 detected as input as a left-to-right and bottom-to-top (slanted) line in a single stroke is detected (substantially) over the (entire) first and second lines 2500b and 2500c of the paragraph 2500. In either case the editing stroke 2508 or 2510 is detected by the HWR system 114 as passing over both of the lines 2500b and 2500c. This relative location of the editing stroke to the (recognized) text 2500, e.g., on several words on separate lines, provides one of the above-described characteristics of the editing gestures whereas the zig-zagging or left-to-right/ bottom-to-top (slanted) writing direction provides another characteristic.

Figure 25C:
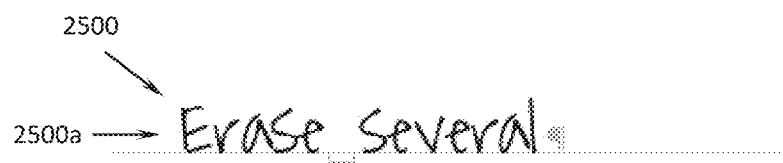
Figure 26A:
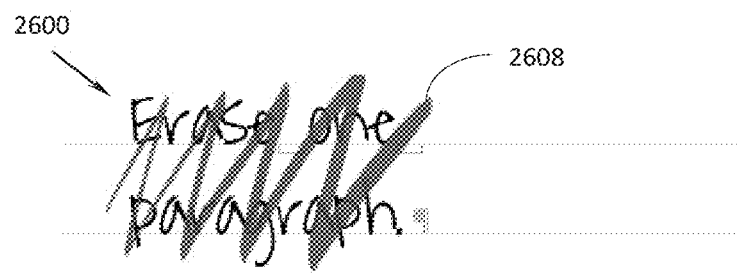
FIGS. 26A and 26B show examples of editing gestures relating to erasing one paragraph in accordance with the present system and method.
Figure 26B:
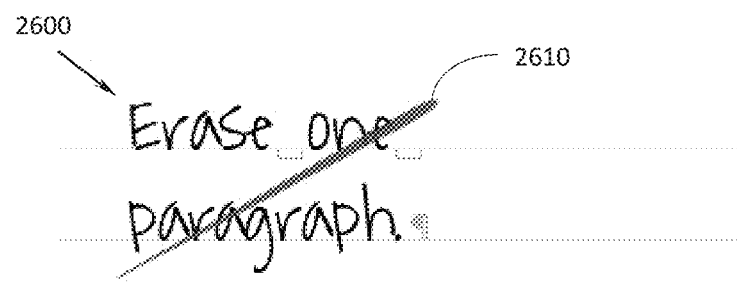
Figure 27A:
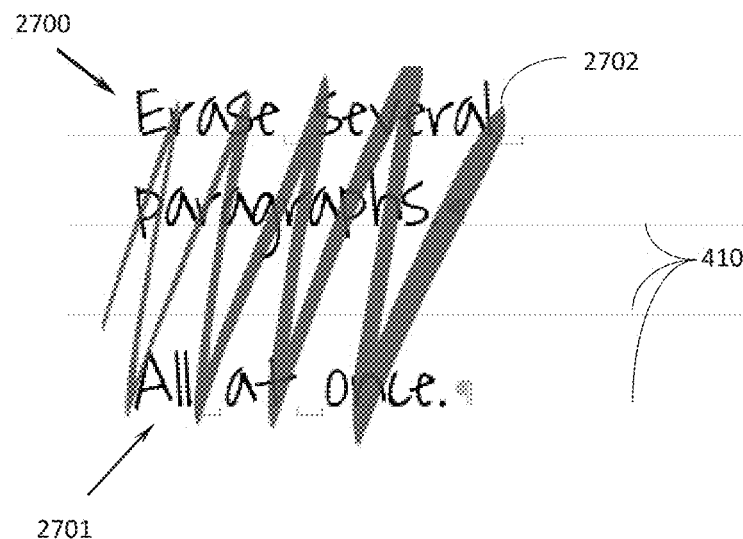
FIGS. 27A and 27B show examples of editing gestures relating to erasing several paragraphs in accordance with the present system and method.
Figure 27B:
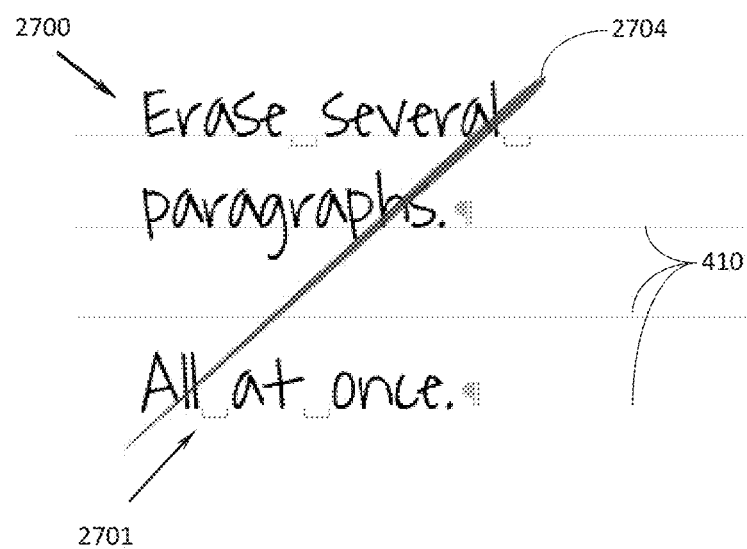

Consideration of these characteristics alone may result in a determination that the editing gesture is intended by the user to delete the second and third lines 2500b and 2500c (containing the series of words 2504 and 2506 and the period 2507), and as such the recognition result is as that shown in FIG. 25C in which the second and third lines are omitted leaving the first line 2500a with the series of words 2502. As before, the scratch-out and slanted strike-through gestures are considered as being relatively robust for recognition.

Similar deletion gestures can be used to delete one or more single- and/or multi-line paragraphs. For example, FIGS. 26A and 26B respectively show a multi-line paragraph 2600 on which scratch-out and slanted strike-through deletion gestures 2602 and 2604, respectively, are input (substantially) on or over the (entire) paragraph 2600 as detected by the HWR system 114 leading to the determination that each of the editing gestures is intended by the user to delete the entire paragraph 2600. Further, FIGS. 27A and 27B respectively show a multi-line paragraph 2700 and a single line paragraph 2701 (e.g., separated by one empty one of the lines 410) on which scratch-out and slanted strike-through deletion gestures 2702 and 2704, respectively, are input (substantially) on or over the (entire) paragraphs 2700 and 2701 (and the empty line 410 therebetween) as detected by the HWR system 114 leading to the determination that each of the editing gestures is intended by the user to delete both of the paragraphs 2700 and 2701.

The above described examples illustrate the deletion of single characters (letters, symbols, etc.) from words and lines of text, deletion of single or plural words from one or more lines of text, deletion of single or plural lines of text from one or more single- or multi-line paragraphs, and deletion of one or more single- or multi-line paragraphs using the described (relatively straight) bottom-to-top and left-to-right single slanted stroke deletion gesture, bottom-to-top and left-to-right single curled stroke deletion gesture, left-to-right multi-direction single slanted stroke deletion gesture, and (relatively straight) left-to-right single horizontal deletion gesture. It is considered that these gestures are relatively intuitive to delete elements of object blocks or object blocks themselves for the vertical flow scenario of the left-to-right language input illustrated in the examples. However, it is understood that a single stroke gesture in different directions and form, particularly with horizontal flow languages, multiple stroke gestures, or non-directional gestures, such as a tap, can also be used.

Figures 28, 29:
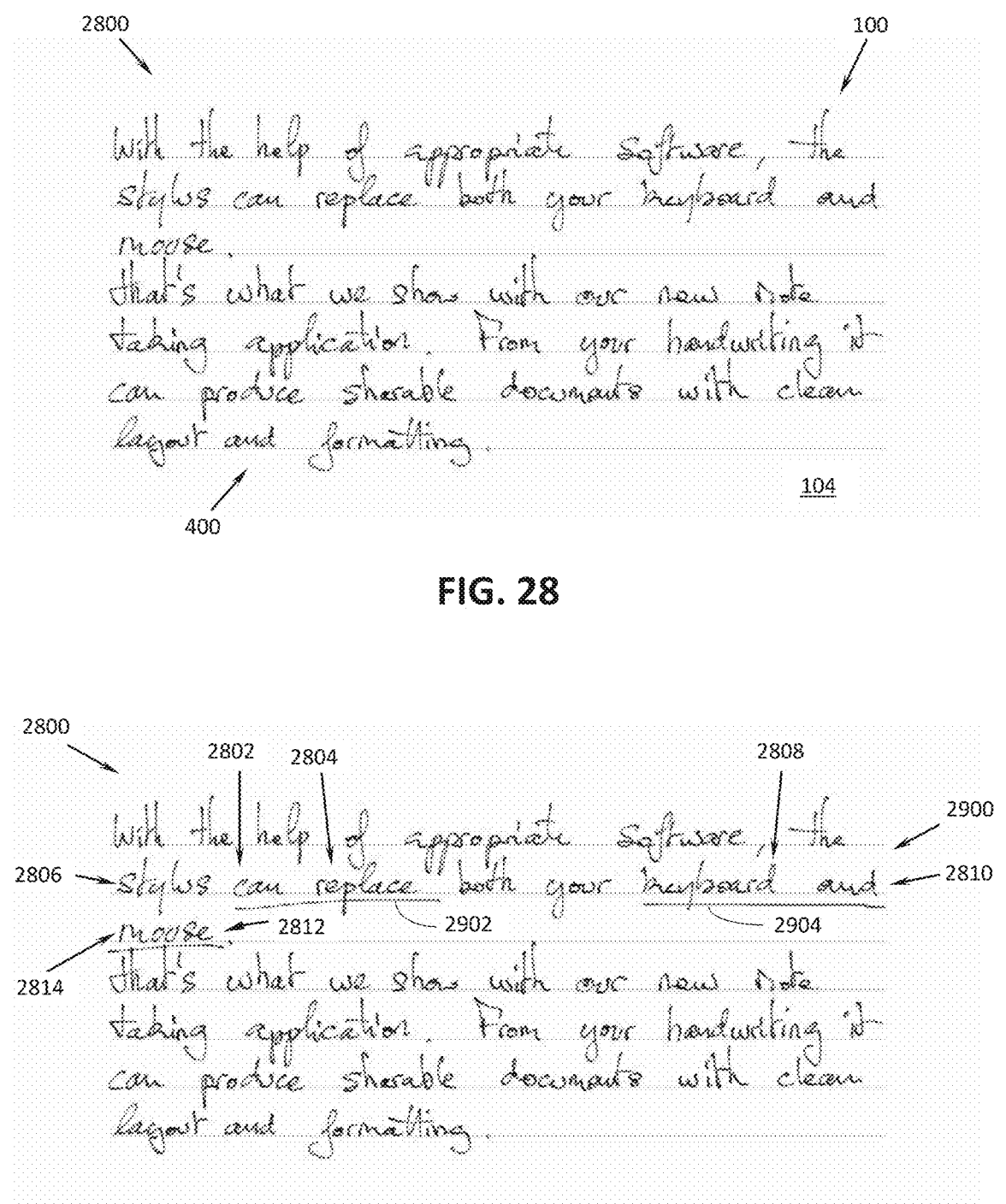

The afore-described editing gestures were for performing breaking, splitting, spacing, joining, and deletion operations in relation to handwritten content. Other editing operations are also possible. FIG. 28 shows a multi-line paragraph 2800 input as handwritten content to the input area 408 generally on the lines of the line pattern 410 and rendered as digital ink on the interface surface 104 of the device, for example. FIG. 29 shows the paragraph 2800 of FIG. 28 with additional handwritten content input and rendered as digital ink 2900. The additional content 2900 includes an underline 2902 written beneath plural words, "can" 2802 and "replace" 2804 on a (first) line 2806 of the paragraph 2800 and an underline 2904 written beneath several words, "keyboard" 2808 and "and" 2810 on the first line 2806 and a word "mouse" 2812 on a subsequent (second) line 2814 of the paragraph 2800. The additional content 2900 may be treated as content by the HWR system 114 through recognition of the content being underlines with respect to the recognized text of the paragraph 2800. The present system and method however provides a mechanism for such "content" to be considered as gestures for editing, as follows.

In the pen and paper context, users might use underlines, or other decorations such as double underlines, circles, ellipses, boxes, coloring, for a part(s) or a whole paragraph to emphasis certain text therein or the whole paragraph itself, or even sections of a document. Accordingly, as the application 112 of the present system and method renders handwritten input, particular the input of note taking, as digital ink and allows continued interaction (such as editing) with that digital ink as handwriting for document creation and sharing, the handwritten decorations are maintained as users have input them, or are beautified as described in detail later. This maintains the intent of the users in providing the decorations whilst the notes/documents are retained in the handwritten (digital ink) form.

The present system and method through the HWR system 114 also provides a mechanism to digitize or convert the handwritten input through the typesetting or fontification of the digital ink into typeset ink. This function is particularly provided to allow the creation of at least near-final documents for communication and sharing, e.g., conversion of a handwritten note which has been edited and formatted in digital ink into a typeset document which could have been produced using keyboard (and associated gesturing devices) alone. In such typeset documents however the use of decorations like those in handwriting may not provide the same emphasizing effect or be suitable for a professional looking document outcome. Accordingly, the present system and method determines additional information to be applied to such decoration input. This is done, for example, so as to allow conversion of these decorations into style changes within the typeset documents and to assist in distinguishing between pure content and editing gestures.

Figure 30:
FIG. 30 shows the result of typesetting the paragraph of FIG. 28 with the additional input of FIG. 29 in accordance with the present system and method.

For example, FIG. 30 shows the result of typesetting the paragraph 2800 with the decoration 2900 of FIG. 29 into a typeset paragraph 3000. As can be seen, the application 112 causes conversion of the digital ink underlines 2902 and 2904 to a bold font for typeset ink versions of the associated words 2802, 2804, 2808, 2810 and 2812 of the paragraph 2800. In this way, proper emphasis of the underlined words is retained in the typeset document thereby retaining the users' intent. It is understood the styling of bold font is only an example, and other fontification can be provided, as discussed later. Further, the original decoration style may also be maintained if suitable, e.g., with the underlines 2902 and 2904 rendered as typeset underlines. Further, different decorations may be used to apply different styling (discussed later). Such typesetting of input decorations or style changes may be settable via the UI of the application 112.

In order to properly recognize the decoration input and the association of that input with the content (e.g., digital ink words, paragraphs), the HWR system 114 detects the geometrical and spatial relationships between the existing (recognized) content and newly input (probable) decoration input. Decorations such as shapes, underlines, etc., are easily recognized from the various models of the HWR system 114, in particular the language model. The associations are determined through the relative locations of such recognized decorations and proximate content in relation to the type of decoration recognized. For example, an underline is a generally horizontal line, generally underneath one or more characters, words or lines of a paragraph, where the underline is related to those elements which it is under.

An issue that arises with the use of handwritten gestures for editing of content, is that similar gestures may be provided for content selection and application control. For example, circling content, e.g., one or more words, could be intended by a user to select that content for interaction, such as copy or cut and paste, or drag & drop or push & drop operations. Another issue that arises with the use of handwritten gestures for editing of content, is that similar input may be provided for content itself, particularly if non-text input is supported. For example, a circle may be input by a user as a circle in a diagram or drawing. Accordingly, it is necessary for the application 112 to be able to distinguish between such events in order to determine and properly adhere to the users' intent.

In available digital note taking applications, separate pens or styli are provided to enable explicit distinction of these events. For example, one pen may be used for text input and simple text editing, such as overwrite, strike-though, etc. on the digital ink, another pen is used for drawing or non-text input, and another pen is used for selection of content and complex content editing, such as decoration. The text, drawing and selection pens are provided with encoding or the like which is detectable by the device and application to differentiate the pens from one another. Alternatively, one or more of these pens may be provided with the ability to exhibit more than one of these attributes, through selection or switching, e.g., through pressing of a button on the pen. The Applicant has found however that users do not appreciate having to use different hardware or to manipulate that hardware for special functions.

The present system and method therefore enables all content and interaction input to be performed using a single input device, such as a user's finger/hand or stylus, without function selection thus handling content, decoration and selection with a single tool. The application 112 differentiates between these to determine user intent. This is done by initially treating all suitable input recognized as probable decoration input as decoration by default and all input recognized as non-text input as non-text by default. The recognition of non-text is provided by the recognition system implemented by the present system and method, for example, in the manner described in U.S. patent application Ser. No. 14/955,155 titled "System and Method of Handwriting Recognition in Diagrams" filed in the name of the present Applicant and Assignee, the entire content of which is incorporated by reference herein.

With respect to the default decoration classification, if subsequent or further (with a suitable time delay of about one to three strokes and/or about 50 ms to about 500 ms) interaction with the content determined to be associated with the recognized decoration is detected by the application 112, the treatment is changed to that of selection input. For example, when input is detected and recognized as a circle about one or more words, the circle is classified as a decoration by the HWR system 114, such that whatever styling or editing has been set or is settable for circle decoration is to be applied upon typesetting. Then if a gesture, such as a single or multi-point gesture (e.g., a tap or double tap) is detected as the next input on or about the circle and/or the words surrounded thereby, the input is treated as a selection and the decoration classification is removed by the application 112. Alternatively, if the next input is further content written or other gesture in a non-associated part of the content, the decoration classification is retained. Manual designation of such gesture input may also be provided, e.g., through the UI, for users.

A further issue that arises with the use of handwritten gestures to provide decoration of digital ink content which is editable, is the proper rendering of the decorations when editing or change of device orientation, window size display or device display occurs which triggers re-display of the digital ink content, such as with reflow and paragraph resizing, etc. This is described in detail below.

Figures 31A, 31B:
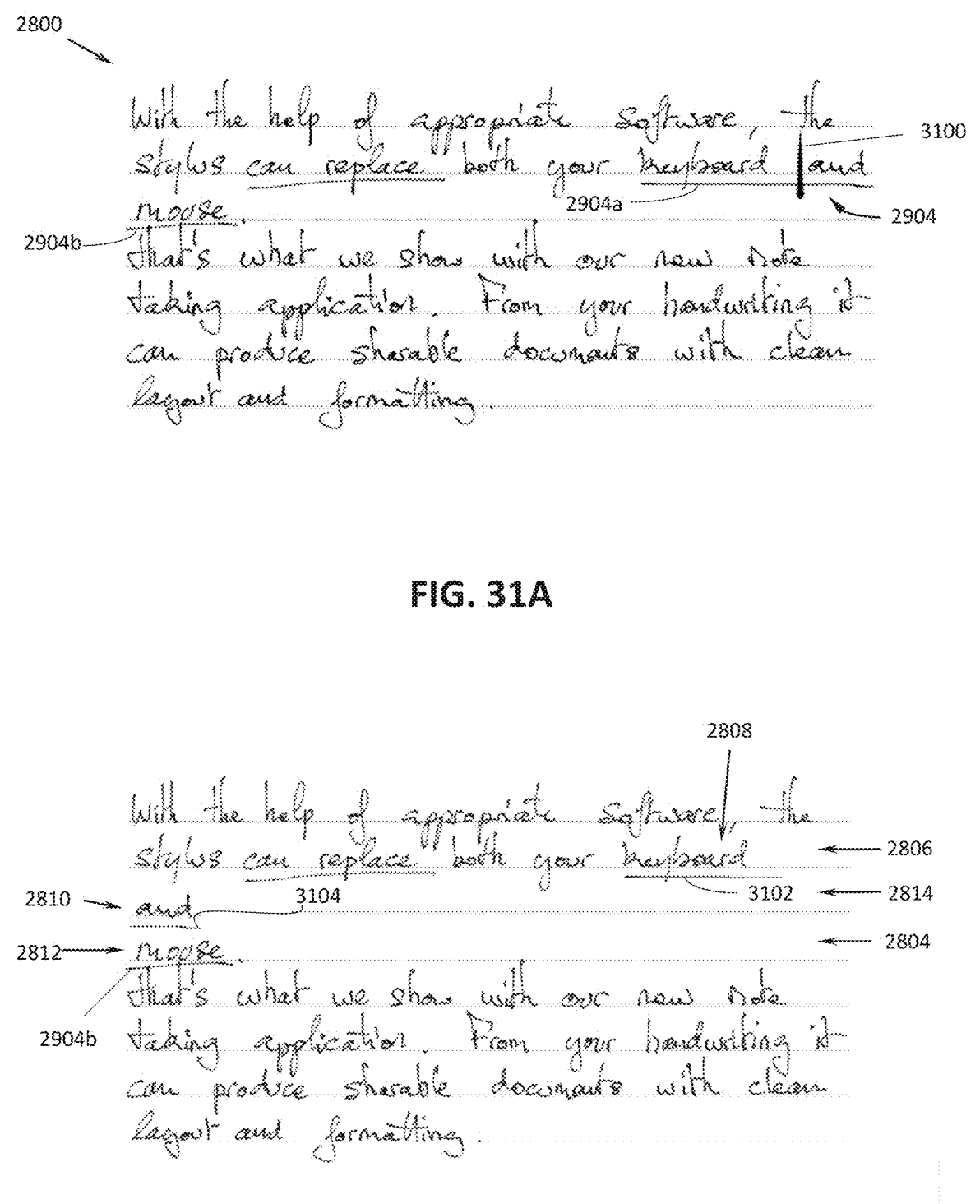

FIG. 31A shows the paragraph 2800 with the decoration 2900 of FIG. 29. An editing gesture 3100 is detected as input as a top-to-bottom vertical line in a single stroke in the displayed position shown. The editing stroke 3100 is detected by the HWR system 114 as passing between the words 2808 and 2810. Like the example of FIG. 6, this relative location of the editing stroke 3100 to the (recognized) text 2800 and decoration 2900, e.g., in a space between words, results in a determination that the editing gesture 3100 is intended by the user to break or split the first line 2806 of the paragraph 2800 at the detected location into two lines. This recognition result is shown in FIG. 31B in which the word 2810 is moved to the second line 2814, with consequential movement of the word 2812 onto a subsequent (third) line 2816 of the paragraph 2800 and movement of downstream content onto the next lines. This is done because the paragraph 2800 has a line break (not shown) between the lines 2814 and 2816. Alternatively, the split word 2810 may be reflowed onto the line 2814 with consequential reflow of the word 2812 on that line 2814. In either case, since the words 2808, 2810 and 2812 are associated with the underline 2904 editing of the underline 2904 is also required.

The underline 2904 is actually input in two sections or portions, a (first) portion 2904a on the line 2806 and a (second) portion 2904b on the line 2814. The underline portion 2904b is simply moved along with the associated word 2812, as shown in FIG. 31B. However, the underline portion 2904a is associated with both of the words 2808 and 2810 and is therefore broken by the editing gesture 3100. Accordingly, the underline portion 2904a is segmented (for example by the segmenter of the HWR system 114) into a (first) segment 3102 and a (second) segment 3104. The first segment 3102 contains all of the digital ink of the underline portion 2904a to the left of the location at which the editing gesture 3100 crosses the underline portion 2904a, and is therefore retained on the line 2806 of the paragraph 2800, with retention of the relative position to the word 2808. The second segment 3104 contains all of the digital ink of the underline portion 2904a to the right of the location at which the editing gesture 3100 crosses the underline portion 2904a, and is therefore moved onto the line 2814 of the paragraph 2800, with retention of the relative position to the word 2810.

As can be seen, the resultant display of the first segment 3102 of the underline portion 2904a may not be completely satisfactory to the user, since the underline now projects past the underlined word 2808. In the present example, this may not be overly problematic, but it can be understood that situations may arise when the segmented decoration is not satisfactorily displayed, examples of which are described later. It is possible to configure the segmentation of the decoration so as to omit parts of the digital ink so that the edited display is more satisfactory. For example, the first segment 3102 could be 'cut' so that the right most extent does not project past the last character of the underlined word 2808. However, the proper extent of such omission may be difficult to ascertain and apply in a general manner to different types of content and decoration. This is particularly the case when the handwriting rendered as the digital ink is not very neat, e.g., it is sketchy, wobbly, wavy, etc., such that cutting the digital ink in an arbitrary position which is not related to the form of the digital ink itself, could cause issues with the legibility of the resultant edited digital ink.

An alternative operation is to re-scale the digital ink rather than cut. However, such rescaling could also cause issues with the resultant scaled digital ink being too small or too large, or imperfections in the handwriting being emphasized. A possible process for scaling digital ink in a sensible fashion is described in U.S. patent application Ser. No. 14/955,174 titled "System and Method for Handwritten Diagram Connectors" filed in the name of the present Applicant and Assignee, the entire content of which is incorporated by reference herein.

The present system and method further provides an intermediary step between the digital ink and full fontification into typeset ink. This intermediary step is beautification. In the beautification process the application 112 and/or HWR system 114 determines extremum, average and mean characteristics of the digital ink and applies smoothing and normalization similar to the preprocessing 116 of the HWR system 114. The result is beautified digital ink which retains the 'raw' quality of handwriting with increased legibility and regularity. Such beautification may be a selectable setting of the application 112. With respect to the above discussed issues with editing the 'raw' digital ink of decorations, the present system and method is able to apply beautification to the decorations, either together with the digital ink content or individually, to minimize the noted issues. This is because, the beautified decorations are regular by nature, and so can be cut, resized, scaled, etc., in controllable, known and expected ways. Examples of editing operations on beautified decorations are now described.

Figure 32:
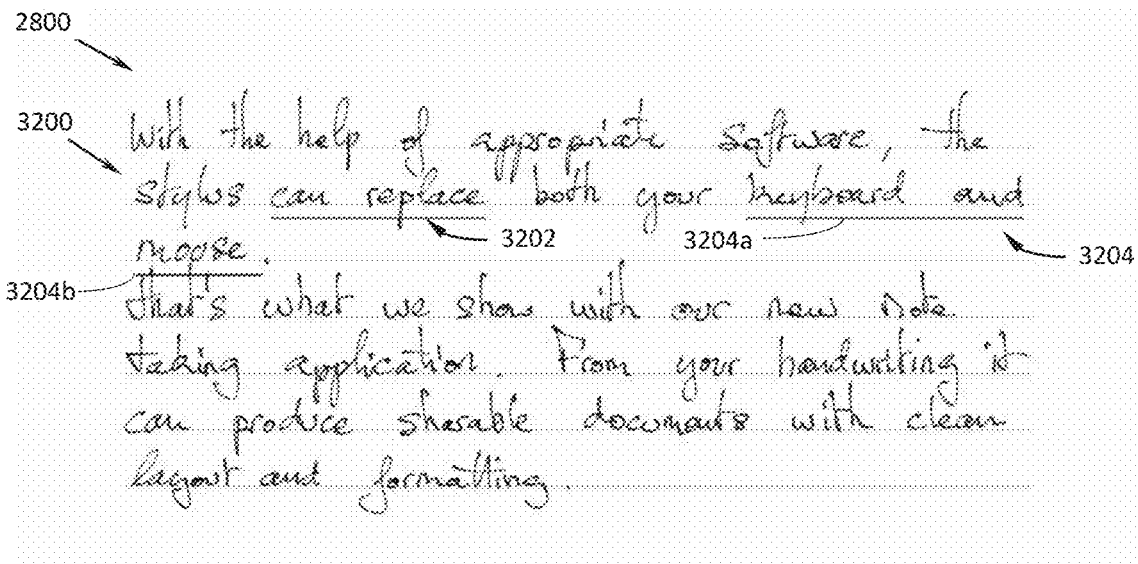
FIG. 32 shows another example of the paragraph of FIG. 28 with additional handwritten content input and rendered as digital ink in accordance with the present system and method.

FIG. 32 shows the paragraph 2800 as depicted in FIG. 29 but with the decoration 2900 rendered in beautified digital ink decoration 3200. Accordingly, the underline 2902 is converted into a 'near' typeset underline 3202 and the underline 2904 is converted into a 'near' typeset underline 3204, in the associated portions 3204a and 3204b. Alternatively, the beautified version may be of full typeset quality. For the present example, i.e., relatively thin underlines, the difference between these versions may be marginal. However, for more stylistic decorations, such as two-dimensional shapes with sketch-like strokes, the beautified digital ink is considered to more closely reflect the intended handwritten form of the document for continued working prior to finalizing as a fully digitized document.

Figure 33A:
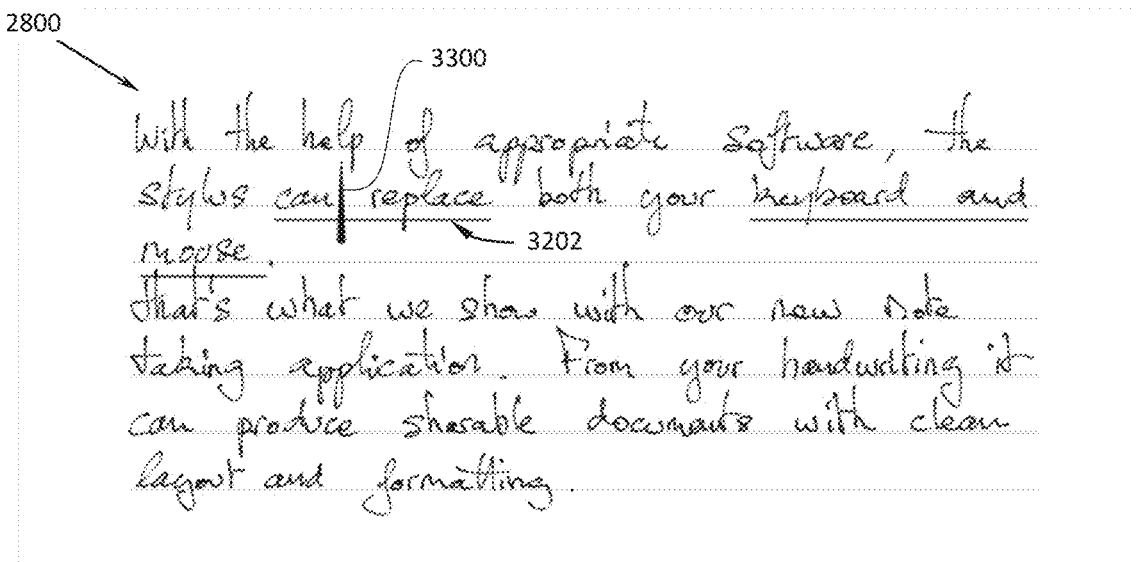
FIGS. 33A and 33B show another example of the paragraph of FIG. 28 with additional handwritten content input and rendered as digital ink in accordance with the present system and method.
Figures 33B, 34:
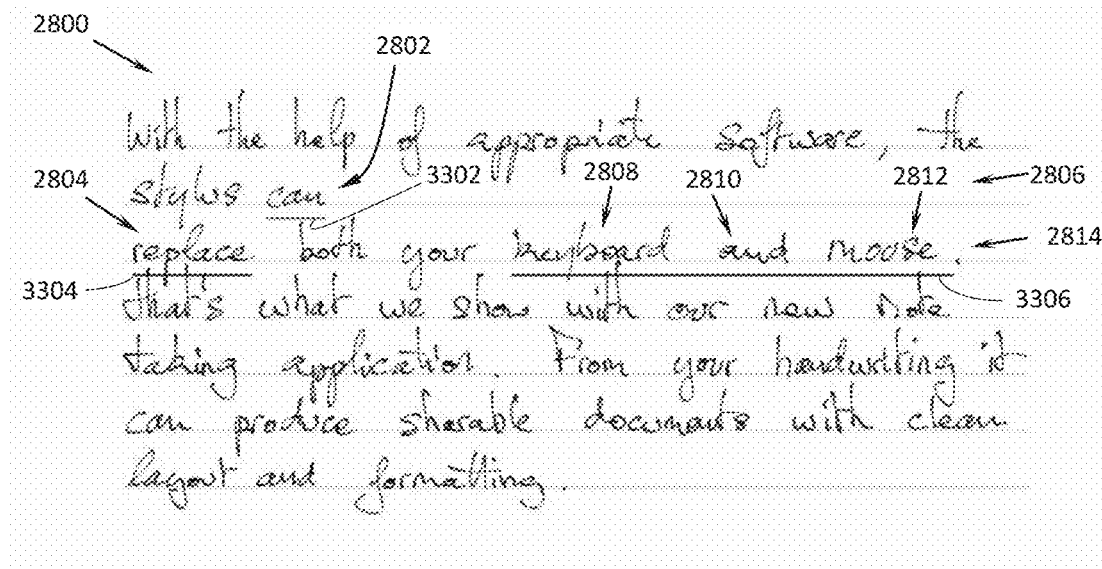
FIG. 34 shows the result of typesetting the paragraph of FIG. 28 with the additional input of FIG. 33B in accordance with the present system and method.

FIG. 33A shows the paragraph 2800 with the decoration 3200 of FIG. 32. An editing gesture 3300 is detected as input as a top-to-bottom vertical line in a single stroke in the displayed position shown. The editing stroke 3300 is detected by the HWR system 114 as passing between the words 2802 and 2804. Like the example of FIG. 31A, this relative location of the editing stroke 3300 to the (recognized) text 2800 and decoration 3200, e.g., in a space between words, results in a determination that the editing gesture 3300 is intended by the user to break or split the first line 2806 of the paragraph 2800 at the detected location into two lines. This recognition result is shown in FIG. 33B in which the word 2804 is moved to the second line 2814, with consequential movement of the remaining words of the first line 2806 onto the second line 2814 (including the words 2808 and 2810 and a (first) portion 3204a of the underline 3204) and reflow of the word 2812 on that line 2814. This reflow is shown to illustrate the alternative to the line break operation result of FIG. 31B. As can be seen the other parts of the paragraph 2800 remain the same.

This editing operation results in re-rendering of both of the underlines 3202 and 3204 as follows. The underline 3202 is segmented (for example by the segmenter of the HWR system 114) into a (first) segment 3302 and a (second)

segment 3304. The first segment 3302 contains the beautified digital ink of the underline 3202 to the left of the location at which the editing gesture 3300 crosses the underline 3202 contained to and beneath the word 2802 only. That is, the beautified digital ink of the underline 3202 from the right most character extent of the word 2802 to the location at which the editing gesture 3300 crosses the underline 3202 is omitted. This is a simpler process for the beautified digital ink than the 'raw' digital ink, as discussed above, as the beautified digital ink has an reasonably invariant rendering along the length of the underline, and so can be cut at an arbitrary position without loss of quality or meaning. The second segment 3304 contains the beautified digital ink of the underline 3202 to the right of the location at which the editing gesture 3300 crosses the underline 3202.

For the underline 3204, the first portion 3204*a* and the second portion 3204*b*, are joined on the line 2814 of the paragraph 2800 to form a new beautified digital ink underline 3306 of the combined length of the first and second portions 3204*a* and 3204*b* and relative position to the words 2808, 2810 and 2812. This is a simpler process for the beautified digital ink than it would be for the 'raw' digital ink, as the beautified digital ink has an reasonably invariant rendering along the length of the underline, and so can be joined at an arbitrary position without loss of quality or meaning, whereas the underline portions 2904*a* and 2904*b* of the 'raw' digital ink underline 2904 may require significant adjustment to allow joining, which may not be suitably applied in a general fashion.

As can be seen, the resultant display in FIG. 33B retains clear indication of the original decorations on the content. FIG. 34 shows the result of typesetting the paragraph 2800 with the decoration 3300 of FIG. 33B into a typeset paragraph 3400. As can be seen, the application 112 causes conversion of the beautified digital ink underlines 3302, 3304 and 3306 to a bold font for typeset ink versions of the associated words 2802, 2804, 2808, 2810 and 2812 of the paragraph 2800, in a manner similar to that of the example of FIG. 30. In this way, proper emphasis of the underlined words is retained in the typeset document thereby retaining the users' intent.

Figures 35A, 35B:
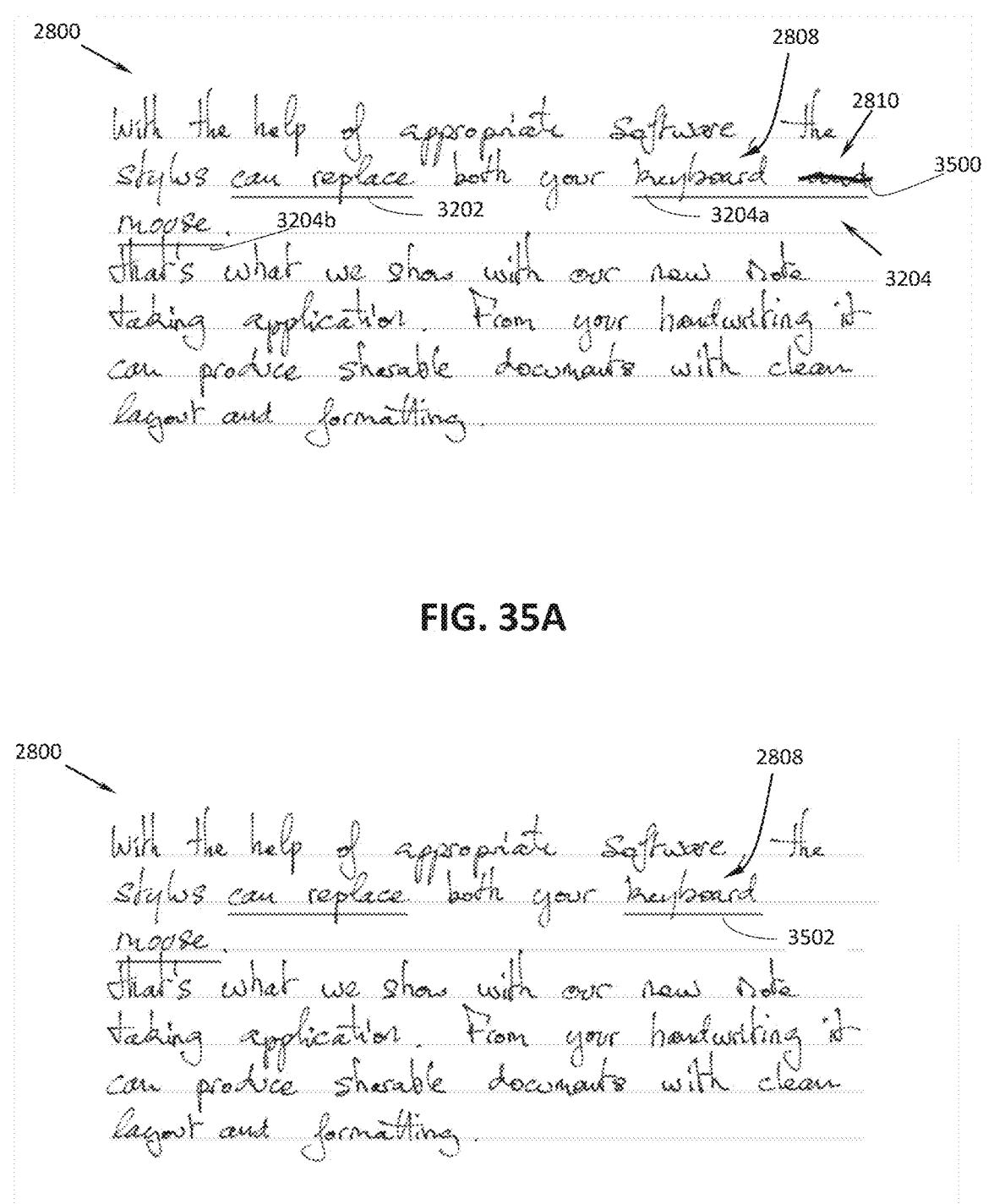

The provision of the beautified decorations can also assist in the sensible re-display of the decorated content upon other editing operations. FIG. 35A shows the paragraph 2800 with the decoration 3200 of FIG. 32. An editing gesture 3500 is detected as input as a left-to-right horizontal line in a single stroke in the displayed position shown. The editing stroke 3500 is detected by the HWR system 114 as passing (substantially) on or over the (entire) word 2810. Like the example of FIG. 20B, this relative location of the editing stroke 3500 to the (recognized) text 2800 and decoration 3200, e.g., over a word, results in a determination that the editing gesture 3500 is intended by the user to delete the word 2810 from the paragraph 2800. This recognition result is shown in FIG. 35B in which the word 2810 is omitted.

This editing operation results in re-rendering of the underline 3204 as follows. The underline portion 3204*a*, which is beneath the word 2810 in FIG. 35A, is segmented (for example by the segmenter of the HWR system 114) into a segment 3502 which contains the beautified digital ink of the underline 3204 contained to and beneath the word 2808 only. That is, the beautified digital ink of the underline 3204 from the right most character extent of the word 2808 is omitted. As can be seen the other parts of the paragraph 2800 remain the same. This is a simpler process for the beautified digital ink than the 'raw' digital ink, for at least the reasons discussed above. In the alternative, the whole of the underline portion 3204*a* may be retained if it is considered that the deletion operation was intended by the user for the insertion of new content in place thereof, which would retain the underlining.

Figures 35C, 35D:
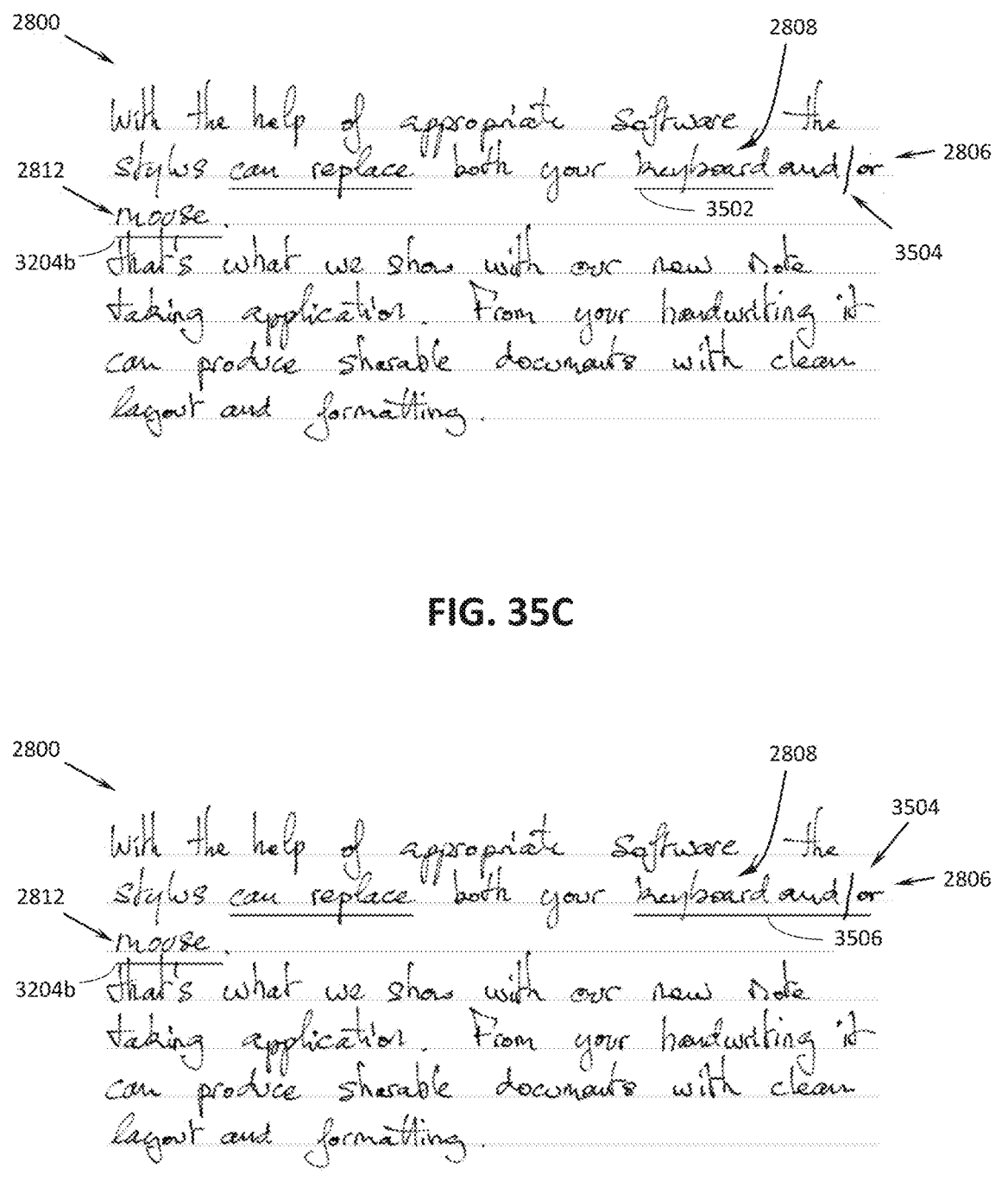

Further, FIG. 35C shows the paragraph 2800 with the modified decoration 3200 of FIG. 35B. The input of further handwritten content is detected as input to the right of the (decorated) word 2808 on the line 2806 of the paragraph 2800, and is displayed as digital ink content 3504 having been recognized by the HWR system 114 as the words "and/or". As the new content is detected as positioned between the decorated words 2808 and 2812, this editing operation results in re-rendering of the underline 3504 as follows.

The underline 3504, which is beneath the word 2808 in FIG. 35C, is extended from its rightmost extent to the rightmost extent underneath the added content 3504 so as to form a new beautified digital ink underline 3506, as shown in FIG. 35D. As can be seen the other parts of the paragraph 2800 remain the same. This is a simpler process for the beautified digital ink than the 'raw' digital ink, for at least the reasons discussed above. In the alternative, the underlining may be retained without extension underneath the new content, whereby if the intent of the user was to have the new content similarly underlined, new decoration input could be made, at which point the application 112 would likely join the new underlining with the underline 3504 to form the new underline 3506.

The above-described decoration examples are in relation to a relative simple form of decoration, namely underlining, with a single line in a single stroke. As discussed earlier, more complex forms of decoration are possible, including two-dimensional decoration such as circles, ellipses, boxes, which surround or are proximate the handwritten content.

FIG. 36 shows a single line paragraph 3600 of several words, "Break" 3602, "a" 3604 and "line" 3606, as defined by the spaces therebetween, and a period 3607 after the word 3606, similar to FIG. 6A. However, unlike FIG. 6A, a hand-drawn or -written decoration 3608 is detected by the HWR system 114 as located around the words 3602, 3604 and 3606, and the period 3607, is recognized as an ellipse and rendered in 'raw' digital ink, for example. FIG. 37A shows an editing gesture 3700 detected as input as a top-to-bottom vertical line in a single stroke in the displayed position shown. The editing stroke 3700 is detected by the HWR system 114 as passing between the words 3602 and 3604. Like the example of FIG. 6, this relative location of the editing stroke 3700 to the (recognized) text 3600, e.g., in a space between words, provides one of the above-described characteristics of the editing gesture 3700 whereas the top-to-bottom writing direction provides another characteristic.

Consideration of these characteristics alone may result in a determination that the editing gesture 3700 is intended by the user to break or split the single line of the paragraph 3600 at the detected location into two lines. This recognition result is shown in FIG. 37B in which the paragraph 3600 has been broken into two lines 3600*a* and 3600*b* of text with the word 3602 on the original (first) line 410 of the paragraph 3600 as the line 3600*a* and the words 3604 and 3606 and period 3607 on the next (second) line 410 directly beneath the first line 410 of the paragraph 3600 as the line 3600*b* having a space between the word 3602 and the word 3604. As can be seen, the features of the paragraph 3600 are otherwise retained. As described above in relation to FIG. 6, the consideration of additional characteristics, such as the vertical extent of the editing stroke 3700 in comparison to the input environment of the page 400 and/or combined characteristics of the proximate objects may be further used by the present system and method to further verify such a recognition result. In any case, since the single line is split into two lines editing of the associated ellipse 3608 is also required so that the decoration continues to surround all of the (previously surrounded) content. This is shown in FIG. 37B in which the ellipse is re-sized and/or scaled into a new 'raw' digital ink decoration 3702 to surround the edited or re-displayed content of the paragraph 3600.

As can be seen, the resultant display of the decoration 3702 may not be completely satisfactory to the user, as it is quite different to the original decoration 3608. In the present example, this may not be overly problematic, but it can be understood that situations may arise when the re-sized decoration is not satisfactorily displayed, examples of which are described later. It is possible to configure the re-sizing or scaling of the decoration so that the resultant scaled digital ink is not too small or too large, or emphasizes imperfections in the handwriting, as discussed earlier with the incorporated by reference U.S. patent application Ser. No. 14/955,174 titled "System and Method for Handwritten Diagram Connectors".

FIG. 38 shows the result of typesetting the paragraph 3600 with the decoration 3702 of FIG. 37B into a typeset paragraph 3800. As can be seen, the application 112 causes conversion of the digital ink ellipse 3702 to a bold font for typeset ink versions of the associated content 3602 to 3607 of the paragraph 3600. In this way, proper emphasis of the decorated (circled) content is retained in the typeset document thereby retaining the users' intent. It is understood the styling of bold font is only an example, and font changes or other fontification or styling can be provided, as discussed later. Further, different decorations may be used to apply different styling (discussed later). Such typesetting of input decorations or style changes may be settable via the UI of the application 112.

Figure 39:
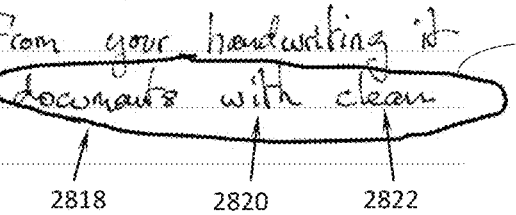
FIG. 39 shows another example of the paragraph of FIG. 28 with additional handwritten content input and rendered as digital ink in accordance with the present system and method.

FIG. 39 shows the paragraph 2800 of FIG. 28 with additional handwritten content input and rendered as digital ink 3900. The additional content 3900 includes a ellipse written to surround plural words, "documents" 2818, "with" 2820, and "clean" 2822 on a (first) line 2824 of the paragraph 2800. The additional content 3900 may be treated as content by the HWR system 114 through recognition of the content being a non-text element, e.g., an ellipse, with respect to the recognized text of the paragraph 2800. However, as discussed above the present system and method provides a mechanism for such "content" to be considered as further gestures for editing, such as the styling of the decorated content to be different than the styling of the non-decorated content in the typeset (or beautified) version of the content.

Figure 40A:
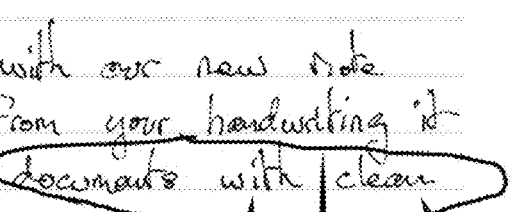
FIGS. 40A-40C show another example of the paragraph of FIG. 28 with additional handwritten content input and rendered as digital ink in accordance with the present system and method.
Figure 40B:
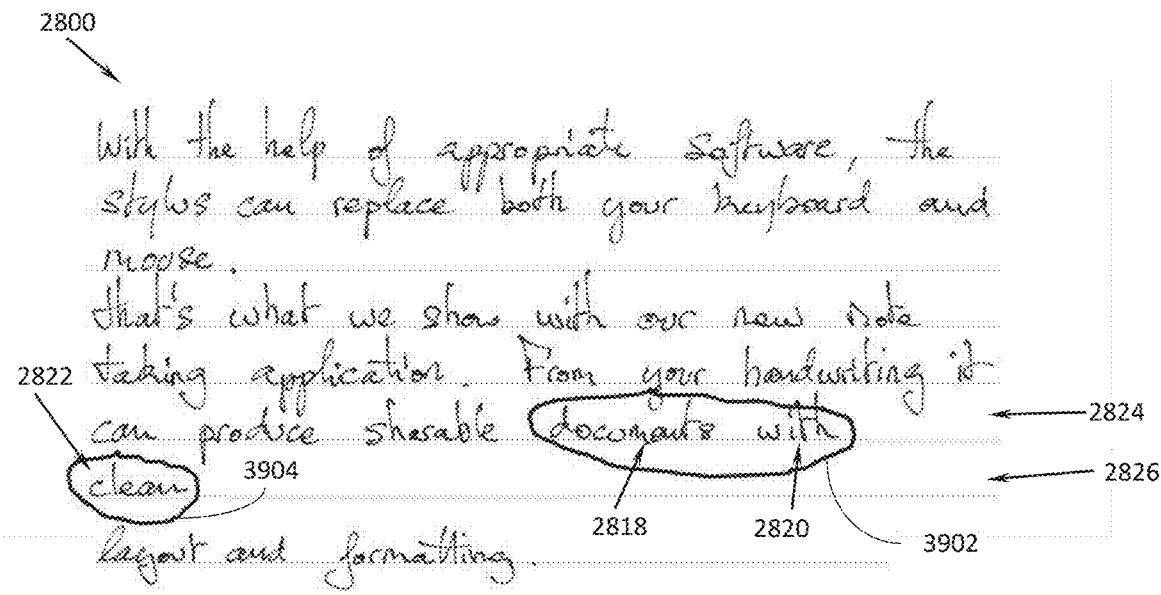
Figure 40C:
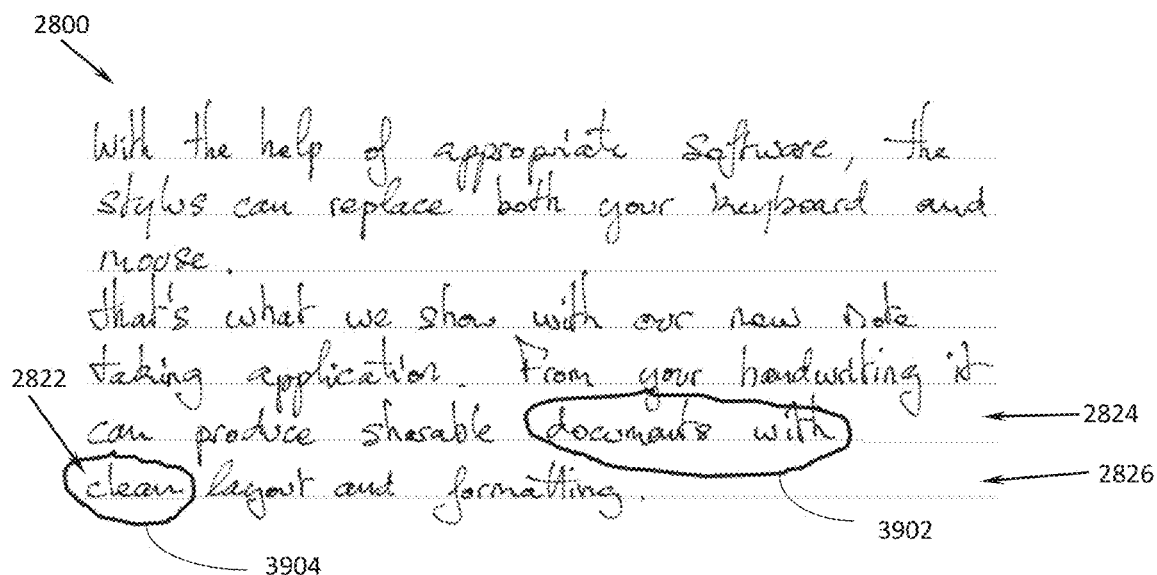

FIG. 40A shows the paragraph 2800 with the decoration 3900 of FIG. 39. An editing gesture 4000 is detected as input as a top-to-bottom vertical line in a single stroke in the displayed position shown. The editing stroke 4000 is detected by the HWR system 114 as passing between the words 2820 and 2822. Like the example of FIG. 31, this relative location of the editing stroke 4000 to the (recognized) text 2800 and decoration 3900, e.g., in a space between words, results in a determination that the editing gesture 4000 is intended by the user to break or split the first line 2824 of the paragraph 2800 at the detected location into two lines. This recognition result is shown in FIG. 40B in which the word 2822 is moved to a (second) line 2826, with consequential movement of the content on the second line 2826 to a subsequent line 410. In this way, a line break is provided after the moved word 2822 on the line 2826. Alternatively, the recognition result as shown in FIG. 40C may be performed in which the word 2822 is moved onto the second line 2826, with consequential reflow of the content on the second line 2826. In either case, since the words 2818, 2820 and 2822 are associated with the ellipse 3900 editing of the decoration 3900 is also required so that the decoration continues to surround all of the (previously surrounded) content. This is also shown in FIGS. 40B and 40C, where the ellipse is duplicated and re-sized and/or scaled into a new 'raw' digital ink decoration 3902 to surround the words 2818 and 2820 of the paragraph 2800 and a new 'raw' digital ink decoration 3904 to surround the word 2822 of the paragraph 2800.

As can be seen, the resultant display of the (split) decoration 3902 and 3904 may not be completely satisfactory to the user, as it is quite different to the original decoration 3900, such as it not being clear that all of the circled content is to be treated the same for subsequent styling, for example. Accordingly, as with the one-dimensional decorations described above, e.g., underlines, the two-dimensional decorations may also be beautified by the application 112 and/or HWR system 114 determining extremum, average and/or mean characteristics of the digital ink and applying smoothing and normalization similar to the preprocessing 116 of the HWR system 114.

Figure 41:
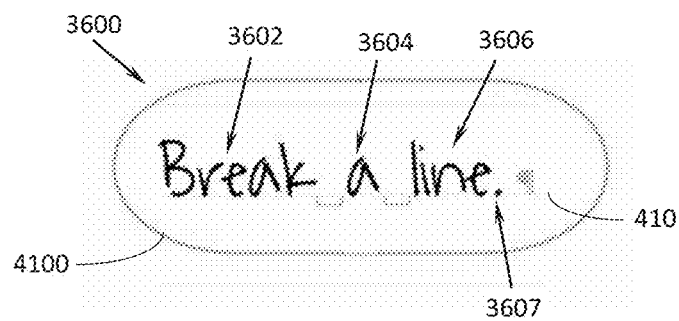
FIG. 41 shows another example of an editing gesture relating to breaking a line in accordance with the present system and method.
Figure 42A:
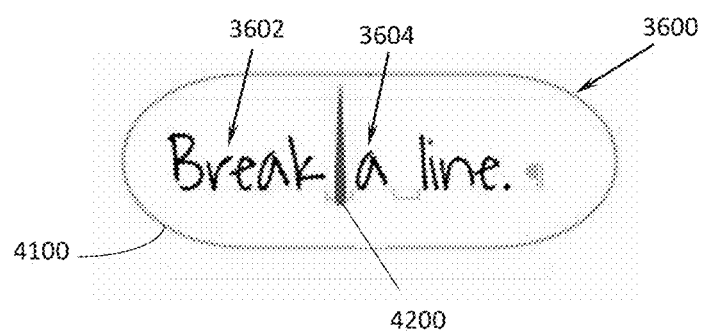
FIGS. 42A and 42B shows another example of an editing gesture relating to breaking a line in accordance with the present system and method.

FIG. 41 shows the single line paragraph 3600 of FIG. 36. However, unlike FIG. 36, a beautified digital ink version of the hand-drawn or -written decoration 3608 is rendered by the application 112 and/or the HWR system 114 into a 'near' typeset ellipse 4100 located around the words 3602, 3604 and 3606, and the period 3607. FIG. 42A shows an editing gesture 4200 detected as input as a top-to-bottom vertical line in a single stroke in the displayed position shown. The editing stroke 4200 is detected by the HWR system 114 as passing between the words 3602 and 3604. Like the example of FIG. 37A, this relative location of the editing stroke 4200 to the (recognized) text 3600, e.g., in a space between words, provides one of the above-described characteristics of the editing gesture 4200 whereas the top-to-bottom writing direction provides another characteristic.

Figure 42B:
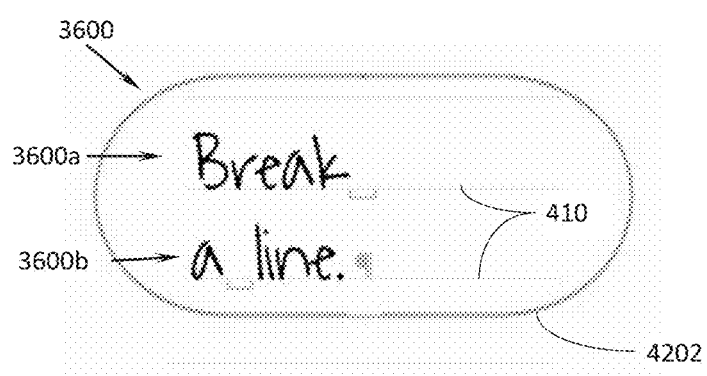

Consideration of these characteristics alone may result in a determination that the editing gesture 4200 is intended by the user to break or split the single line of the paragraph 3600 at the detected location into two lines. This recognition result is shown in FIG. 42B in which the paragraph 3600 has been broken into two lines 3600a and 3600b of text with the word 3602 on the original (first) line 410 of the paragraph 3600 as the line 3600a and the words 3604 and 3606 and period 3607 on the next (second) line 410 directly beneath the first line 410 of the paragraph 3600 as the line 3600b having a space between the word 3602 and the word 3604. As can be seen, the features of the paragraph 3600 are otherwise retained. As described above in relation to FIG. 37, the consideration of additional characteristics, such as the vertical extent of the editing stroke 4200 in comparison to the input environment of the page 400 and/or combined characteristics of the proximate objects may be further used by the present system and method to further verify such a recognition result. In any case, since the single line is split into two lines editing of the associated ellipse 4100 is also required so that the decoration continues to surround all of the (previously surrounded) content. This is shown in FIG. 42B in which the ellipse is re-sized and/or scaled into a new beautified decoration 4202 to surround the edited or re-displayed content of the paragraph 3600. As can be seen, the beautified decoration 4202 is not resized to surround the content only, but retains the original size. This does not have to be done however, and resizing can occur. The non-resizing can assist however for the subsequent inclusion of further input into the decorated portion if this is considered the intent of the user for the splitting operation, for example.

Figures 43, 44:
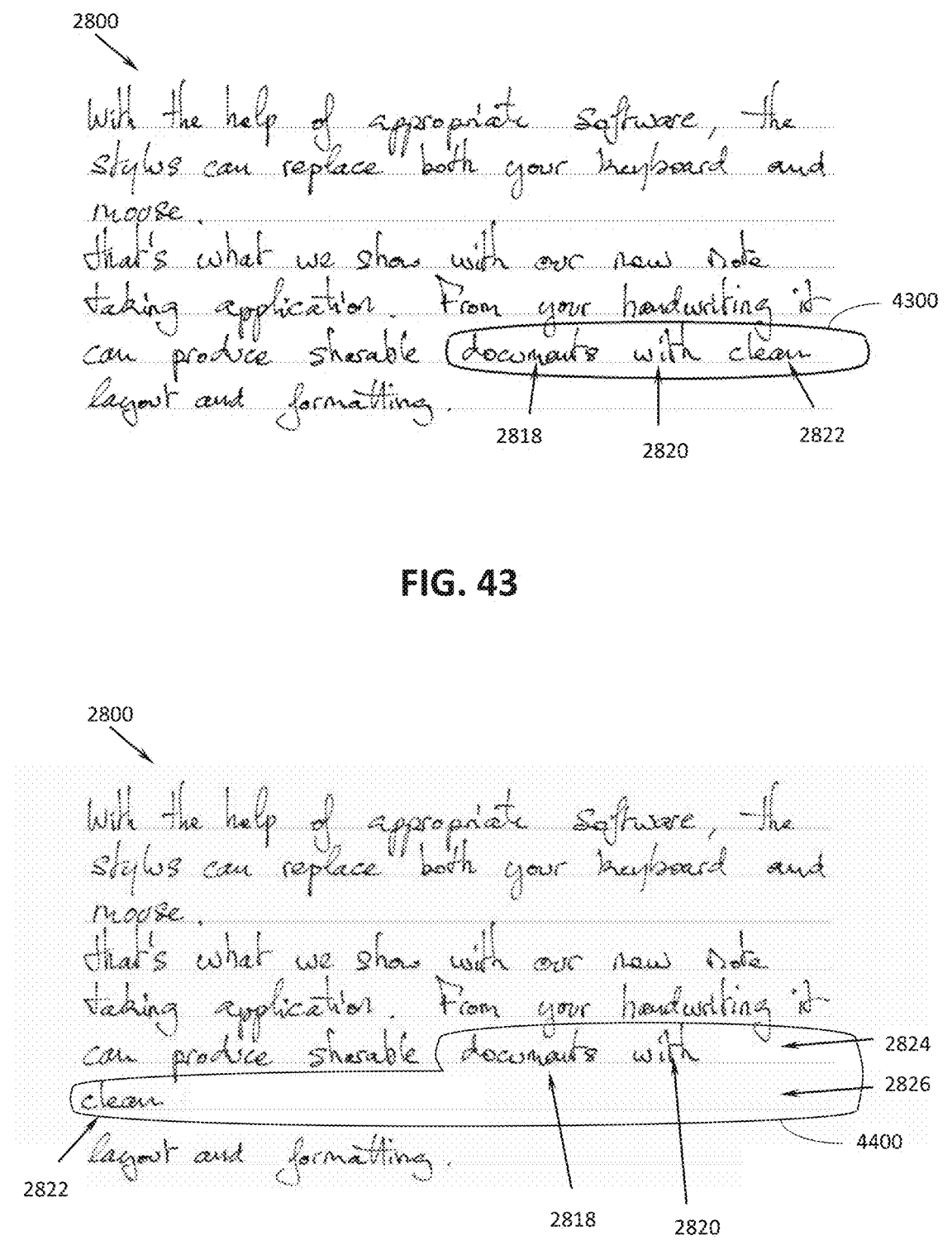

The provision of such beautified two-dimensional decorations can assist in the sensible re-display of the content upon an editing operation. For example, FIG. 43 shows the content of FIG. 39 but with the digital ink ellipse 3900 rendered as a beautified digital ink ellipse 4300 surrounding the words 2818, 2820 and 2822 on the first line 2824 of the paragraph 2800. FIG. 44 shows the recognition result of FIG. 40B but with the duplicated and re-sized and/or scaled 'raw' digital ink decorations 3902 and 3904 rendered as a beautified digital ink ellipse 4400 surrounding the words 2818, 2820 and 2822 on the first and second lines 2824 and 2826 of the paragraph 2800. In this way, the line break provided after the moved word 2822 on the line 2826 and the 'extended' beautified digital ink decoration 4400 retains clarity that all of the circled content is to be treated the same for subsequent styling, for example.

Figure 45A:
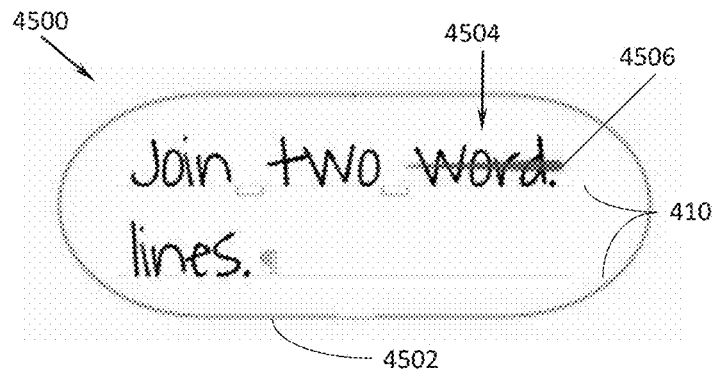
FIGS. 45A and 45B shows another example of an editing gesture relating to joining two lines in accordance with the present system and method.
Figure 45B:
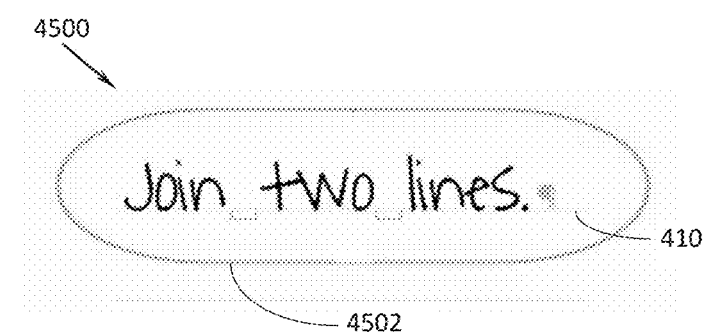

Similar editing operations on beautified decorations can be carried out to reduce the size of the decoration, rather than extend. For example, FIG. 45A shows a multi-line paragraph 4500 surrounded by a beautified decoration 4502 and for which a word 4504 is deleted by a detected editing gesture 4506. The recognition result of the deletion is shown in FIG. 45B in which the word 4504 is omitted with consequential reflow of the downstream content such that the paragraph 4500 becomes a single line paragraph and the beautified decoration 4502 is reduced in size to only surround the content of the now single line paragraph 4500.

Figure 46:
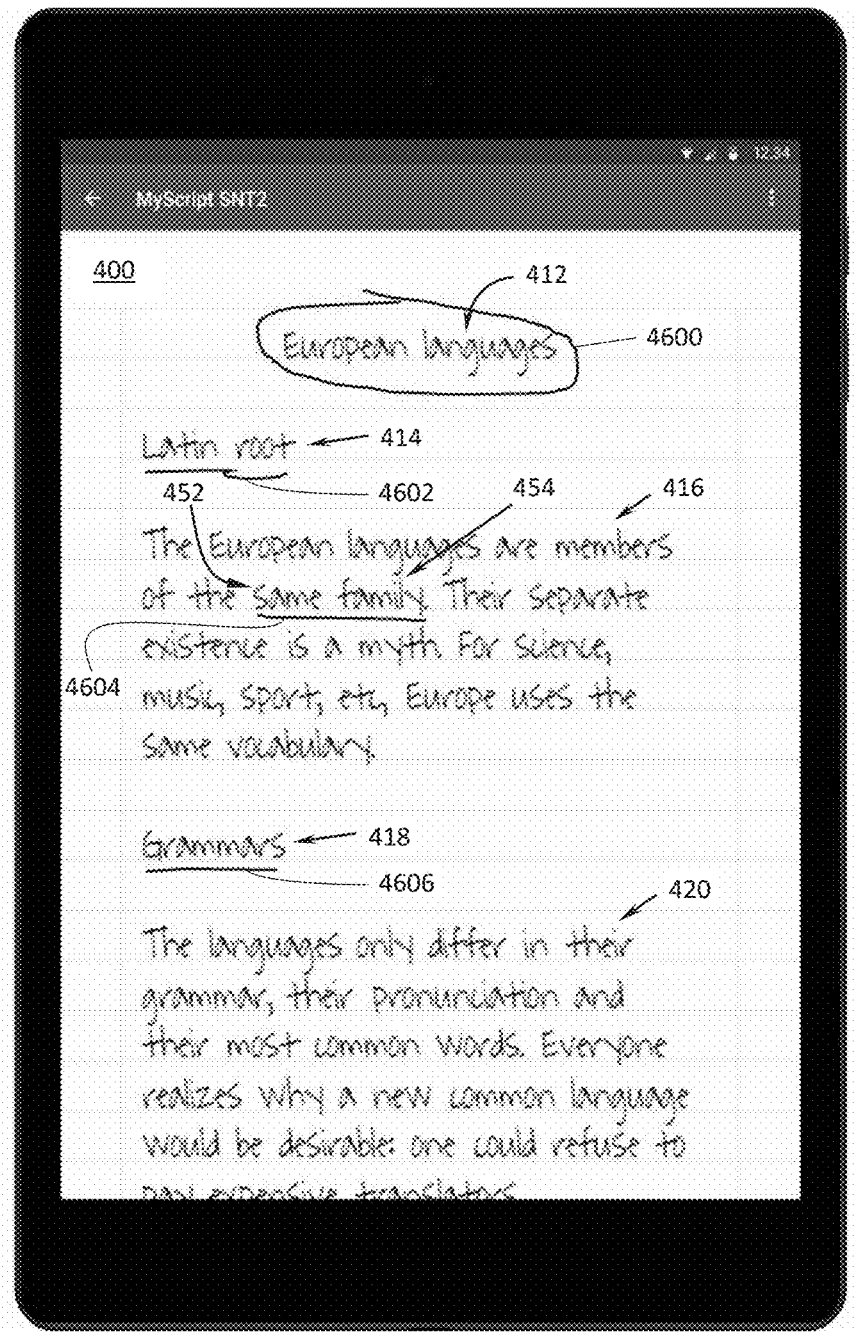
FIG. 46 shows a schematic view of an example visual rendering of a scroll page on a portion of an input surface of the computing device that includes additional handwritten content input and rendered as digital ink in accordance with the present system and method.
Figure 47:
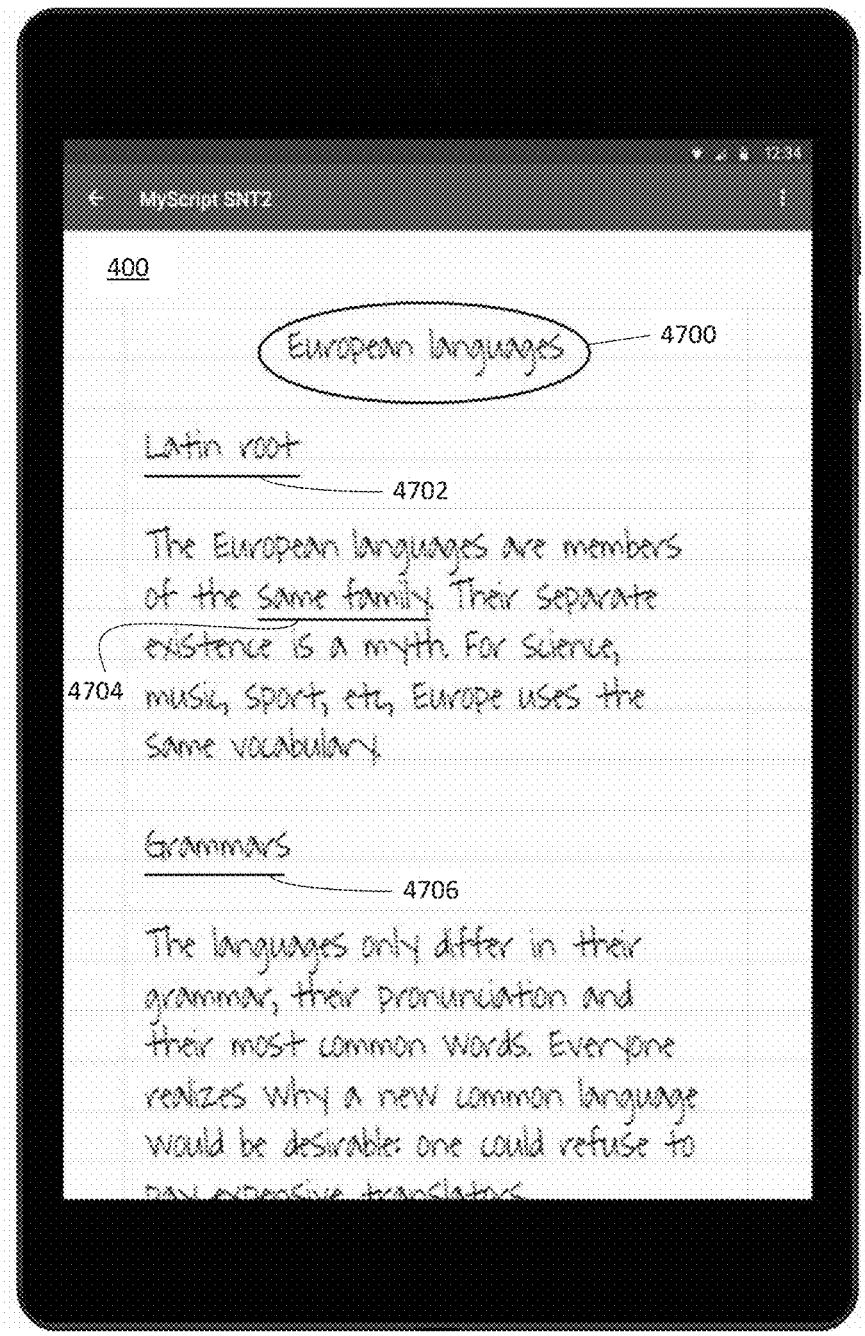
FIG. 47 shows a schematic view of an example visual rendering of a scroll page on a portion of an input surface of the computing device that the result of the typesetting of FIG. 46 in accordance with the present system and method.

FIG. 46 shows an example decoration of the example input of FIG. 4. In FIG. 46, further input handwriting is detected with the resultant display of the heading 412 surrounded by a 'raw' digital ink ellipse 4600, the heading 414 underlined by a 'raw' digital ink underline 4602, words 452 and 454 of the paragraph 416 underlined by a 'raw' digital ink underline 4604, and the heading 418 underlined by a 'raw' digital ink underline 4606. FIG. 47 shows the example decoration of FIG. 46 rendered as beautified digital ink. That is, in FIG. 47, the 'raw' digital ink ellipse 4600 is rendered as a beautified digital ink ellipse 4700, the 'raw' digital ink underline 4602 is rendered as a beautified digital ink underline 4702, the 'raw' digital ink underline 4604 is rendered as a beautified digital ink underline 4704, and the 'raw' digital ink underline 4606 is rendered as a beautified digital ink underline 4706, with the beautified forms having the substantially same extents as the non-beautified forms.

Figure 48:
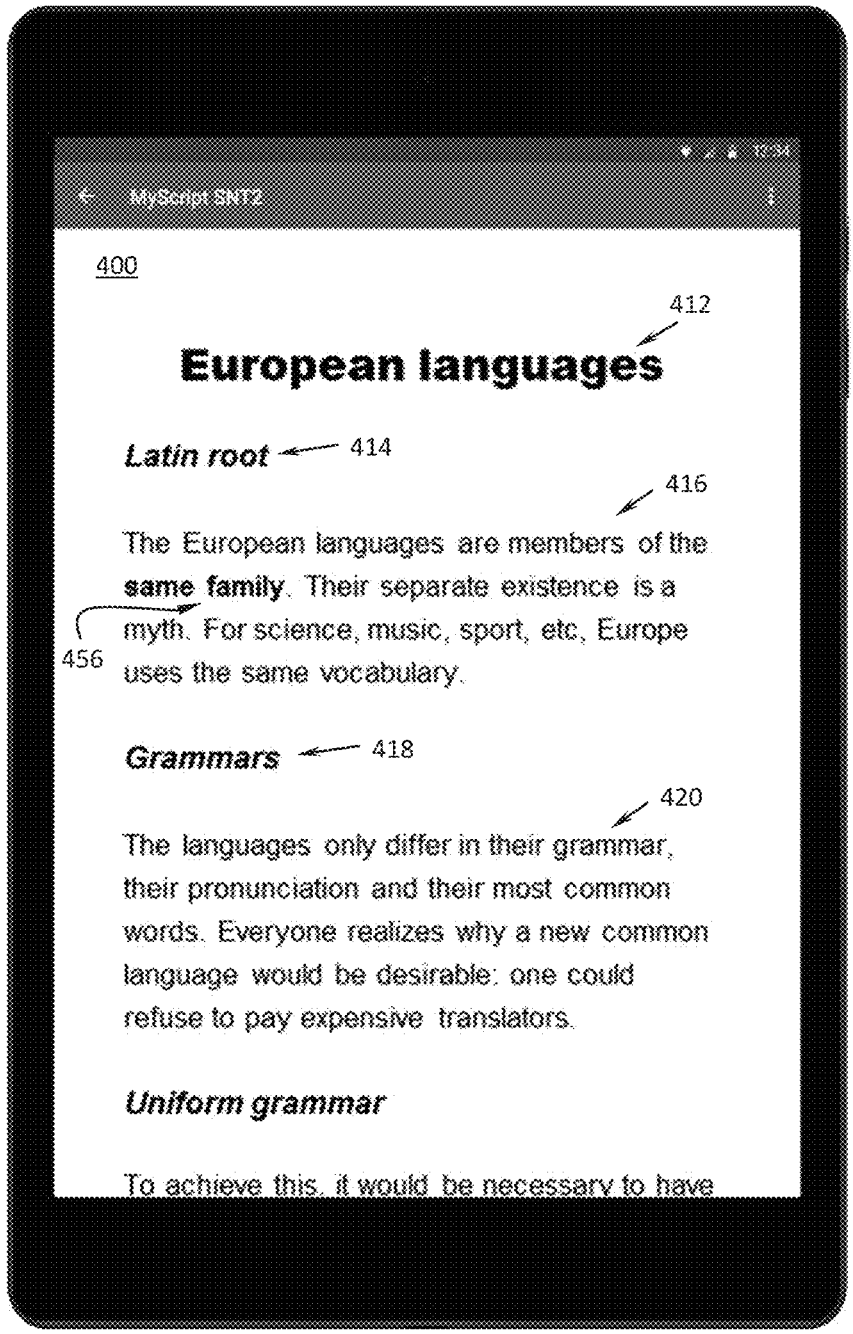
FIG. 48 shows a schematic view of an example visual rendering of a scroll page on a portion of an input surface of the computing device that the result of the typesetting of FIGS. 45 and 46 in accordance with the present system and method.

As discussed earlier, such decorations may be considered by the application and/or HWR system 114, as indicating certain styling changes when the digital ink content is converted to typeset ink. This styling application is performed irrespective of the display of raw or beautified digital ink prior to the conversion. FIG. 48 shows the content of FIGS. 46 and 47 after typesetting. This can be performed for example in response to detection of a gesture, such as a single- or multi-point gesture, e.g., a tap or double tap, in a specified location or any location of the page 400 and/or the interface surface 104 of the device 100. As can be seen, in response to the different decorations in the different content areas of the page 400, the typesetted style is different for different levels of the content. For example, the heading 412 is rendered in large (compared to other sections of the content) and bold font to provide a document or section heading in response to the circle decoration, the headings 414 and 418 are rendered in smaller (compared to section heading 412) yet larger (compared to other sections of the content) and italic font to provide section or sub-section headings in response to the underline decoration for the isolated single line paragraphs represented by the headings 414 and 418, and the underlined content 452 and 454 of the paragraph 416 is rendered in bold font in response to the underline decoration for body paragraph content. These applied styles are only examples, and other styling types are possible, such as further hierarchical heading styles, coloring of text and/or background, etc.

Since different decoration types may be provided for different typesetting outcomes, such as different stylings, and since the present system and method is directed to providing as much interaction as possible with the content using handwritten input of content and gestures, the ability to change or edit the decorations themselves may be provided through further handwritten input. For example, overwriting or appending a decoration with a different decoration changes the original decoration, e.g., an underline decoration to apply a header 3 style to a paragraph is appended with a second underline to create a double underline decoration to apply header 2 style. For example, overwriting or appending a decoration with a different decoration cancels all decoration, e.g., an underline from left to right provides a decoration and overwriting with an underline from right to left cancels the decoration, like a "backspace". For example, overwriting or appending a decoration with an editing gesture changes or deletes the decoration, e.g., a scratch-out (substantially or partially) over a decoration removes the decoration, but not the content associated therewith.

The present system and method provide an application which allows users, such as students, academic and working professionals, to take handwritten notes, such as during lectures, meetings and brainstorming sessions, on their computing devices in a meaningful and shareable format akin to word processed documents. The present system and method further allow natural writing to be input since the writing is made on (ruled) lines, and paragraphs and other layout elements are respected responsive to orientation (i.e., portrait or landscape) and device display capacity. Further interaction with the handwritten or typeset text, or non-text content, created in a note, such as editing the content, manipulating the layout of the notes, or converting or adding the notes into a document, can be performed directly within the application itself without the need to import the note into a separate document processing application. As such, the original layout of the handwritten notes is maintained, as is the actual input handwriting itself, the digital ink. Accordingly, annotations, decorations, special layout, etc. is maintained for easy comprehension of the notes taken.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for editing digital documents on computing devices, each computing device comprising a processor and at least one non-transitory computer readable medium for recognizing handwriting input under control of the processor, the processor configured to:
  process a handwriting input, wherein the handwriting input can represent handwriting content to be added to displayed text of previously processed handwriting content or an editing gesture for enacting control on the displayed text of the previously processed handwriting content;
  cause display of, on a display interface of a computing device, first digital ink in accordance with document content;
  determine whether one or more strokes of the handwriting input correspond to i) the handwriting content to be added to the displayed text of the previously processed handwriting content or ii) one or more editing gestures for enacting control on the displayed text of the previously processed handwriting content by 1) determining characteristics of the handwriting input, 2) determining context of the handwriting input by evaluating a location of the one or more strokes of the handwriting input relative to the displayed text of the previously processed handwriting content, 3) comparing geometric features of the one or more strokes of the handwriting input with respect to the displayed text of the previously processed handwriting content, and 4) considering a language of the displayed text of the previously processed handwriting content; and
  cause display of, on the display interface, second digital ink in accordance with the handwriting input.

2. The system of claim 1, wherein the second digital ink is different than the first digital ink.

3. The system of claim 1, wherein the second digital ink is a normalized version of the first digital ink.

4. The system of claim 1, wherein the processor is configured to cause re-display of, on the display interface, the document content as a third digital ink based on the detected editing gestures.

5. The system of claim 4, wherein the third digital ink is different than the first and second digital ink.

6. The system of claim 5, wherein the third digital ink is typeset version of the first digital ink.

7. A method for editing digital documents on computing devices, each computing device comprising a processor and at least one non-transitory computer readable medium for recognizing handwriting input under control of the processor, the method comprising:
  processing a handwriting input, wherein the handwriting input can represent handwriting content or an editing gesture for enacting control on previously processed handwriting content;
  displaying, on a display interface of a computing device, first digital ink in accordance with document content;
  determining whether one or more strokes of the handwriting input correspond to i) the handwriting content to be added to the displayed text of the previously processed handwriting content or ii) one or more editing gestures for enacting control on the displayed text of the previously processed handwriting content by 1) determining characteristics of the handwriting input, 2) determining context of the handwriting input by evaluating a location of the one or more strokes of the handwriting input relative to the displayed text of the previously processed handwriting content, 3) comparing geometric features of the one or more strokes of the handwriting input with respect to the displayed text of the previously processed handwriting content, and 4) considering a language of the displayed text of the previously processed handwriting content; and
  displaying, on the display interface, second digital ink in accordance with the handwriting input.

8. The method of claim 7, wherein the second digital ink is different than the first digital ink.

9. The method of claim 7, wherein the second digital ink is a normalized version of the first digital ink.

10. The method of claim 7, comprising re-displaying, on the display interface, the document content as a third digital ink based on the detected editing gestures.

11. The method of claim 10, wherein the third digital ink is different than the first and second digital ink.

12. The method of claim 11, wherein the third digital ink is typeset version of the first digital ink.

13. A non-transitory computer readable medium having a computer readable program code embodied therein, said computer readable program code adapted to be executed to implement a method for recognizing input of editing handwriting to a computing device, the computing device comprising a processor and at least one system non-transitory computer readable medium for recognizing the input under control of the processor, the method comprising:
  processing a handwriting input, wherein the handwriting input can represent handwriting content or an editing gesture for enacting control on previously processed handwriting content;
  displaying, on a display interface of a computing device, first digital ink in accordance with document content;
  determining whether one or more strokes of the handwriting input correspond to i) the handwriting content to be added to the displayed text of the previously processed handwriting content or ii) one or more editing gestures for enacting control on the displayed text of the previously processed handwriting content by 1) determining characteristics of the handwriting input, 2) determining context of the handwriting input by evaluating a location of the one or more strokes of the handwriting input relative to the displayed text of the previously processed handwriting content, 3) comparing geometric features of the one or more strokes of the handwriting input with respect to the displayed text of the previously processed handwriting content, and 4) considering a language of the displayed text of the previously processed handwriting content; and
  displaying, on the display interface, second digital ink in accordance with the handwriting input.

14. The non-transitory computer readable medium of claim 13, wherein the second digital ink is different than the first digital ink.

15. The non-transitory computer readable medium of claim 13, wherein the second digital ink is a normalized version of the first digital ink.

16. The non-transitory computer readable medium of claim 13, comprising re-displaying, on the display interface, the document content as a third digital ink based on the detected editing gestures.

17. The non-transitory computer readable medium of claim 16, wherein the third digital ink is different than the first and second digital ink.

18. The non-transitory computer readable medium of claim 17, wherein the third digital ink is typeset version of the first digital ink.

19. The system of claim 1, wherein the editing gesture corresponding to a single multi-directional stroke including erasing two or more lines of text.

\* \* \* \* \*